(12) United States Patent
Hirose et al.

(10) Patent No.: US 8,951,672 B2
(45) Date of Patent: *Feb. 10, 2015

(54) ANODE, METHOD OF MANUFACTURING IT, BATTERY, AND METHOD OF MANUFACTURING IT

(75) Inventors: Takakazu Hirose, Fukushima (JP); Kenichi Kawase, Fukushima (JP); Hideki Nakai, Fukushima (JP); Rikako Imoto, Fukushima (JP); Nozomu Morita, Fukuoka (JP)

(73) Assignee: Sony Corporation, Tokyo (JP)

( * ) Notice: Subject to any disclaimer, the term of this patent is extended or adjusted under 35 U.S.C. 154(b) by 664 days.

This patent is subject to a terminal disclaimer.

(21) Appl. No.: 12/018,891

(22) Filed: Jan. 24, 2008

(65) Prior Publication Data

US 2008/0233478 A1    Sep. 25, 2008

(30) Foreign Application Priority Data

Jan. 30, 2007  (JP) ................................ 2007-019722
Mar. 28, 2007  (JP) ................................ 2007-083569
Nov. 28, 2007  (JP) ................................ 2007-307438

(51) Int. Cl.
*H01M 4/00* (2006.01)
*C25D 15/02* (2006.01)
(Continued)

(52) U.S. Cl.
CPC ............. *C25D 15/02* (2013.01); *H01M 4/0404* (2013.01); *H01M 4/0421* (2013.01);
(Continued)

(58) Field of Classification Search
CPC ... H01M 4/134; H01M 4/131; H01M 4/1391; H01M 4/485; H01M 4/525; H01M 4/58; H01M 4/1395; H01M 4/621; H01M 4/38; H01M 4/62; H01M 4/66; H01M 4/661; H01M 4/70; H01M 4/667; H01M 4/02; H01M 4/40; H01M 4/0404; H01M 4/0421; H01M 10/052; H01M 10/0431; H01M 10/36; H01M 10/40; H01M 10/0587; H01M 10/0525; H01M 10/0568; H01M 2004/027; Y02E 60/122; C25D 15/02; C25D 15/00

See application file for complete search history.

(56) References Cited

U.S. PATENT DOCUMENTS

2005/0153208 A1* 7/2005 Konishiike et al. ............ 429/245
2006/0083987 A1* 4/2006 Konishiike et al. ......... 429/218.1

(Continued)

FOREIGN PATENT DOCUMENTS

JP    2000-036323       2/2000
JP    2000-100429 A     4/2000

(Continued)

OTHER PUBLICATIONS

JP2006-155957—machine translation, Konishiike et al "Battery and its manufacturing method", publicatin date: Jun. 15, 2006.*

(Continued)

*Primary Examiner* — Melvin C Mayes
*Assistant Examiner* — Smita Patel
(74) *Attorney, Agent, or Firm* — Dentons US LLP

(57) ABSTRACT

A battery capable of improving the cycle characteristics and the swollenness characteristics is provided. The battery includes a cathode, an anode, and an electrolytic solution. The node has an anode current collector and an anode active material layer provided thereon, and the anode active material layer contains a plurality of anode active material particles having silicon, and a metal material having a metal element not being alloyed with an electrode reactant in a gap between the anode active material particles.

68 Claims, 20 Drawing Sheets

(51) Int. Cl.
*H01M 4/04* (2006.01)
*H01M 4/131* (2010.01)
*H01M 4/134* (2010.01)
*H01M 4/1391* (2010.01)
*H01M 4/1395* (2010.01)
*H01M 4/38* (2006.01)
*H01M 4/485* (2010.01)
*H01M 10/0525* (2010.01)
*H01M 10/0568* (2010.01)
*H01M 4/02* (2006.01)

(52) U.S. Cl.
CPC ............. *H01M 4/131* (2013.01); *H01M 4/134* (2013.01); *H01M 4/1391* (2013.01); *H01M 4/1395* (2013.01); *H01M 4/38* (2013.01); *H01M 4/485* (2013.01); *H01M 10/0525* (2013.01); *H01M 10/0568* (2013.01); *H01M 2004/027* (2013.01); *Y02E 60/122* (2013.01)
USPC ........ 429/220; 429/218.1; 429/221; 429/223; 429/229; 429/231.5

(56) References Cited

U.S. PATENT DOCUMENTS

2006/0124973 A1* 6/2006 Arai et al. ..................... 257/223
2006/0147800 A1* 7/2006 Sato et al. ................ 429/231.95

FOREIGN PATENT DOCUMENTS

| | | |
|---|---|---|
| JP | 2001-273892 | 10/2001 |
| JP | 2002-260637 | 9/2002 |
| JP | 2002-289177 | 10/2002 |
| JP | 2003-007291 | 1/2003 |
| JP | 2004-296105 A | 10/2004 |
| JP | 2004-349162 A | 12/2004 |
| JP | 2005-044672 A | 2/2005 |
| JP | 2005-197080 A | 7/2005 |
| JP | 2006-092928 | 4/2006 |
| JP | 2006-134891 | 5/2006 |
| JP | 2006-190514 | 7/2006 |
| JP | 2006-244813 A | 9/2006 |
| JP | 2006-253004 | 9/2006 |
| JP | 2006-338996 A | 12/2006 |

OTHER PUBLICATIONS

Japanese Patent Office Action corresponding to Japanese Serial No. P2007-019722 dated Jul. 22, 2009.
Japanese Patent Office, Office Action issued in Patent Application JP 2007-307438, on Nov. 4, 2009.

* cited by examiner

RELATED ART

US 8,951,672 B2

ANODE, METHOD OF MANUFACTURING IT, BATTERY, AND METHOD OF MANUFACTURING IT

CROSS REFERENCES TO RELATED APPLICATIONS

The present invention contains subject matter related to Japanese Patent Application JP 2007-019722 filed in the Japanese Patent Office on Jan. 30, 2007, Japanese Patent Application JP 2007-083569 filed in the Japanese Patent Office on Mar. 28, 2007, and Japanese Patent Application JP 2007-307438 filed in the Japanese Patent Office on Nov. 28, 2007, the entire contents of which being incorporated herein by references.

BACKGROUND OF THE INVENTION

1. Field of the Invention

The present invention relates to an anode having an anode current collector and an anode active material layer providing thereon, a method of manufacturing it, a battery including an anode, and a method of manufacturing it.

2. Description of the Related Art

In recent years, portable electronic devices such as combination cameras (videotape recorder), mobile phones, and notebook personal computers have been widely used, and it is strongly demanded to reduce their size and weight and to achieve their long life. Accordingly, as a power source for the portable electronic devices, a battery, in particular a lightweight secondary batter capable of providing a high energy density has been developed.

Specially, a secondary battery using insertion and extraction of lithium for charge and discharge reaction (so-called lithium ion secondary battery) is extremely prospective, since such a secondary battery can provide a higher energy density compared to a lead battery and a nickel cadmium battery.

The lithium ion secondary battery has an anode having a structure in which an anode active material layer containing an anode active material is provided on an anode current collector. As the anode active material, a carbon material has been widely used. However, in recent years, as the high performance and the multi functions of the portable electronic devices are developed, improving the battery capacity is further demanded. Thus, it has been considered to use silicon instead of the carbon material. Since the theoretical capacity of silicon (4199 mAh/g) is significantly higher than the theoretical capacity of graphite (372 mAh/g), it is prospected that the battery capacity is thereby highly improved.

However, when the anode active material layer is formed by depositing silicon as an anode active material with the use of vapor-phase deposition method, the binding characteristics are not sufficient. Thus, in this case, when charge and discharge are repeated, there is a possibility that the anode active material layer is largely expanded and shrunk to be pulverized. When the anode active material layer is pulverized, depending on the pulverization degree, an irreversible lithium oxide is excessively formed due to the increased surface area, and the current collectivity is lowered due to falling of the anode active material layer from the anode current collector. In the result, the cycle characteristics as important characteristics of secondary batteries are lowered.

Therefore, to improve the cycle characteristics even when silicon is used as an anode active material, various devices have been invented. Specifically, a technique in which the surface of an anode active material is covered with a metal such as iron, cobalt, nickel, zinc, and copper (for example, refer to Japanese Unexamined Patent Application Publication No. 2000-036323), a technique in which a metal element such as copper not being alloyed with lithium is diffused in an anode active material (for example, refer to Japanese Unexamined Patent Application Publication No. 2001-273892), a technique in which copper is dissolved in an anode active material (for example, refer to Japanese Unexamined Patent Application Publication No. 2002-289177) and the like have been proposed. In addition, as a related art, a sputtering device including two sputtering sources arranged so that each plasma region is overlaid on each other for using two types of elements as an anode active material is known (for example, refer to Japanese Unexamined Patent Application Publication No. 2003-007291).

SUMMARY OF THE INVENTION

The recent portable electronic devices increasingly tend to become small, and the high performance and the multi functions tend to be increasingly developed. Accordingly, there is a tendency that charge and discharge of the secondary battery are frequently repeated, and thus the cycle characteristics are easily lowered. In particular, in the lithium ion secondary battery in which silicon is used as an anode active material to improve the battery capacity, the anode active material layer is pulverized in charge and discharge as described above, and accordingly the cycle characteristics are easily lowered significantly. Thus, in this case, further improvement of the cycle characteristics of the secondary battery is aspired. In addition, in this case, there is a tendency that the lithium ion secondary battery with the high capacity is easily swollen through charge and discharge. Thus, it is important to improve not only the cycle characteristics but also the swollenness characteristics.

In view of the foregoing, in the invention, it is desirable to provide an anode capable of improving the cycle characteristics and the swollenness characteristics, a method of manufacturing it, a battery, and a method of manufacturing it.

According to an embodiment of the invention, there is provided an anode including an anode current collector and an anode active material layer provided thereon, in which the anode active material layer contains a plurality of anode active material particles having silicon, and a metal material having a metal element not being alloyed with an electrode reactant in a gap between the anode active material particles. According to an embodiment of the invention, there is provided a battery including a cathode, an anode, and an electrolytic solution, in which the anode has an anode current collector and an anode active material layer provided thereon, and the anode active material layer contains a plurality of anode active material particles having silicon and a metal material having a metal element not being alloyed with an electrode reactant in a gap between the anode active material particles.

According to an embodiment of the invention, there is provided a method of forming an anode having an anode current collector and an anode active material layer provided thereon. The method of forming an anode includes steps of forming a plurality of anode active material particles having silicon on the anode current collector, and forming a metal material having a metal element not being alloyed with an electrode reactant in a gap between the anode active material particles. Further, according to an embodiment of the invention, there is provided a method of manufacturing a battery including a cathode, an anode, and an electrolytic solution, and having in the anode an anode current collector and an anode active material layer provided thereon. The steps of manufacturing the anode include forming a plurality of anode active material particles having silicon on the anode current collector, and forming a metal material having a metal element not being alloyed with an electrode reactant in a gap between the anode active material particles.

According to the anode or the method of manufacturing it of the embodiments of the invention, after the plurality of anode active material particles having silicon are formed on the anode current collector, the metal material having a metal element not being alloyed with an electrode reactant is formed. Thus, the metal material intrudes into a gap between the anode active material particles. Thereby, the anode active material particles are bound through the metal material, and thus the anode active material layer is hardly pulverized and fallen. Accordingly, in the battery using the anode of the embodiment of the invention or the method of manufacturing it, the cycle characteristics and the swollenness characteristics can be improved. In this case, for example, if at least part of the exposed face of the anode active material particle is covered with the metal material, effects of a fibrous minute projection generated on the exposed face can be prevented. Further, for example, if the anode active material particle has a multilayer structure in the particle and the metal material exists in a gap in the particle, the anode active material layer is hardly pulverized and fallen as in the case that the metal material exists in the gap between the anode active material particles. Accordingly, the cycle characteristics and the swollenness characteristics can be further improved.

Other and further objects, features and advantages of the invention will appear more fully from the following description.

DETAILED DESCRIPTION OF THE PREFERRED EMBODIMENT

Figure 1:
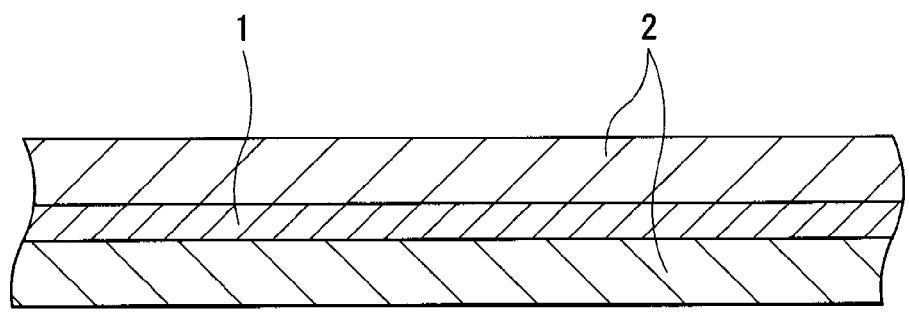
FIG. 1 is a cross section showing a structure of an anode according to an embodiment of the invention.

An embodiment of the invention will be hereinafter described in detail with reference to the drawing FIG. 1 shows a cross sectional structure of an anode according to an embodiment of the invention. The anode is used, for example, for an electrochemical device such as a battery. The anode has an anode current collector 1 having a pair of faces and an anode active material layer 2 provided thereon.

The anode current collector 1 is preferably made of a metal material having the favorable electrochemical stability, the favorable electric conductivity, and the favorable mechanical strength. As the metal material, for example, copper, nickel, stainless or the like can be cited. Specially, as the metal material, copper is preferable, since thereby high electric conductivity can be obtained.

In particular, as the metal material composing the anode current collector 1, a metal material containing one or more metal elements that do not form an intermetallic compound with an electrode reactant is preferable. If the metal material and the electrode reactant form the intermetallic compound, as the anode active material layer 2 is expanded and shrunk when the electrochemical device is operated (for example, when the battery is charged and discharged), a stress is thereby generated, and accordingly structural destruction occurs. In the result, current collectivity is lowered, and the anode active material layer 2 is easily separated. As the metal element, for example, copper, nickel, titanium, iron, chromium or the like can be cited.

The foregoing metal material preferably contains one or more metal elements being alloyed with the anode active material layer 2. Thereby, the contact characteristics between the anode current collector 1 and the anode active material layer 2 are improved, and thus the anode active material layer 2 is hardly separated from the anode current collector 1. As a metal element not forming an intermetallic compound with an electrode reactant and being alloyed with the anode active material layer 2, for example, copper, nickel, iron or the like can be cited in the case that an anode active material of the anode active material layer 2 contains silicon. Such a metal element is preferable in terms of the strength and the conductivity as well.

The anode current collector 1 may have a single layer structure or a multilayer structure. If the anode current collector 1 has the multilayer structure, for example, it is preferable that the layer contacting with the anode active material layer 2 is made of a metal material being alloyed with the anode active material layer 2, and layers not contacting with the anode active material layer 2 are made of other metal material.

The surface of the anode current collector 1 is preferably roughened. Thereby, due to the so-called anchor effect, the contact characteristics between the anode current collector 1 and the anode active material layer 2 are improved. In this case, it is enough that at least the surface of the anode current collector 1 opposed to the anode active material layer 2 is roughened. As a roughening method, for example, a method of forming particles by electrolytic treatment and the like can be cited. The electrolytic treatment is a method of providing irregularities by forming particles on the surface of the anode current collector 1 by electrolytic method in an electrolytic bath. A copper foil provided with the electrolytic treatment is generally called "electrolytic copper foil."

Ten point height of roughness profile Rz of the surface of the anode current collector 1 is preferably in the range from 1.5 μm to 6.5 μm. Thereby, the contact characteristics between the anode current collector 1 and the anode active material layer 2 are further improved.

The anode active material layer 2 contains a metal material containing a metal element not being alloyed with an electrode reactant, together with a plurality of anode active material particles as an anode active material capable of inserting and extracting the electrode reactant. When the anode active material layer 2 contains the metal material, for example, high binding characteristics can be thereby obtained even when the anode active material particle is formed by vapor-phase deposition method or the like, for example.

The plurality of anode active material particles have silicon as an element. Silicon has the high ability to insert and extract the electrode reactant, and thereby provides a high energy density. The anode active material particle may be the simple substance, an alloy, or a compound of silicon; or a material having one or more phases thereof at least in part. One thereof may be used singly, or two or more thereof may be used by mixing. In the invention, alloys also include an alloy containing one or more metal elements and one or more metalloid elements, in addition to an alloy including two or more metal elements. It is needless to say that the alloy in the invention may contain a nonmetallic element. The texture thereof may be a solid solution, a eutectic crystal (eutectic mixture), an intermetallic compound, or a texture in which two or more of the foregoing textures coexist.

As the alloy of silicon, for example, an alloy containing at least one selected from the group consisting of tin (Sn), nickel, copper, iron, cobalt, manganese (Mn), zinc, indium (In), silver (Ag), titanium, germanium (Ge), bismuth (Bi), antimony (Sb), and chromium as an element other than silicon can be cited As the compound of silicon, for example, a compound containing oxygen and carbon (C) as an element other than silicon can be cited. The compound of silicon may contain one or more of the elements described for the alloy of silicon, as an element other than silicon.

The anode active material particle is linked to the anode current collector 1. That is, the anode active material particle is grown from the surface of the anode current collector 1 in the thickness direction of the anode active material layer 2. In this case, it is preferable that the anode active material particle is formed by vapor-phase deposition method, and at least part of the interface between the anode current collector 1 and the anode active material layer 2 (anode active material particle) is alloyed. Specifically, at the interface thereof, the element of the anode current collector 1 may be diffused in the anode active material particle, or the element of the anode active material particle may be diffused in the anode current collector 1, or both elements may be diffused therein each other. Thereby, breakage due to expansion and shrinkage of the anode active material layer 2 in charge and discharge hardly occurs, and electron conductivity between the anode current collector 1 and the anode active material layer 2 is improved.

As the foregoing vapor-phase deposition method, for example, physical deposition method or chemical deposition method can be cited. More specifically, vacuum evaporation method, sputtering method, ion plating method, laser ablation method, thermal CVD (Chemical Vapor Deposition) method, plasma CVD method and the like can be cited.

The anode active material particle may have a single layer structure by being formed through a single film forming step. Otherwise, the anode active material particle may have a multilayer structure in the particle by being formed through a plurality of film forming steps. However, to prevent the anode current collector 1 from being damaged thermally when the anode active material particle is formed by evaporation method associated with high heat in film forming, the anode active material particle preferably has the multilayer structure. When film forming of the anode active material particle is divided into several steps (the anode active material particles are sequentially formed and layered), time that the anode current collector 1 is exposed at high heat is reduced compared to a case that the anode active material particle is formed by a single film forming step.

Further, the anode active material particle preferably contains oxygen, since thereby expansion and shrinkage of the anode active material layer 2 is prevented. In the anode active material layer 2, at least part of oxygen is preferably bonded to part of silicon. In this case, the bonding state may be in the form of silicon monoxide, silicon dioxide, or in the form of other metastable state.

The oxygen content in the anode active material particle is preferably in the range from 3 atomic % to 40 atomic %, since thereby higher effects can be obtained. More specifically, if the oxygen content is smaller than 3 atomic %, expansion and shrinkage of the anode active material layer 2 are not sufficiently prevented. Meanwhile, if the oxygen content is larger than 40 atomic %, the resistance is excessively increased. For example, when the anode is used together with an electrolytic solution in an electrochemical device, the anode active material layer 2 does not include a coat formed by decomposition of the electrolytic solution and the like. That is, when the oxygen content in the anode active material layer 2 is calculated, oxygen in such a coat described above is not included in the calculation.

The anode active material particle having oxygen can be formed by continuously introducing oxygen gas into a chamber when the anode active material particle is formed by vapor-phase deposition method. In particular, when a desired oxygen content is not obtained only by introducing the oxygen gas, a liquid (for example, moisture vapor or the like) may be introduced into the chamber as a supply source of oxygen.

The anode active material particle preferably further has at least one metal element selected from the group consisting of iron, cobalt, nickel, titanium, chromium, and molybdenum, since thereby expansion and shrinkage of the anode active material layer 2 can be prevented. The content of metal element in the anode active material particle can be voluntarily set. However, for example if the anode is used for a battery, an excessively high amount of the metal element is not practical, since in such a case, the thickness of the anode active material layer 2 should be increased to obtain a desired battery capacity, and thereby the anode active material layer 2 is easily separated from the anode current collector 1 or is easily broken.

The anode active material particle having the foregoing metal element can be formed by, for example, using an evaporation source mixed with the metal element or using multiple evaporation sources when the anode active material particle is formed by evaporation method as vapor-phase deposition method.

The anode active material preferably has an oxygen-containing region in which the anode active material particle further has oxygen in the thickness direction, and the oxygen content in the oxygen-containing region is larger than the oxygen content in the other regions. Thereby, expansion and shrinkage of the anode active material layer 2 can be prevented. It is possible that the regions other than the oxygen-containing region have oxygen, or do not have oxygen. It is needless to say that if the regions other than the oxygen-containing region have oxygen, the oxygen content thereof is lower than the oxygen content in the oxygen-containing region.

In this case, to further prevent expansion and shrinkage of the anode active material layer 2, the regions other than the oxygen-containing region preferably have oxygen. That is, the anode active material particle preferably includes a first oxygen-containing region (region having the lower oxygen content) and a second oxygen-containing region having the higher oxygen content (region having the higher oxygen content). In this case, it is preferable that the second oxygen-containing region is sandwiched between the first oxygen-containing regions. It is more preferable that the first oxygen-containing region and the second oxygen-containing region are alternately and repeatedly layered. Thereby, higher effects can be obtained. The oxygen content in the first oxygen-containing region is preferably small as much as possible. The oxygen content in the second oxygen-containing region is, for example, similar to the oxygen content in the case that the anode active material particle has oxygen described above.

The anode active material particle including the first oxygen-containing region and the second oxygen-containing region can be formed, for example, by intermittently introducing oxygen gas into a chamber, or changing the amount of the oxygen gas introduced into the chamber in case of forming the anode active material particle by vapor-phase deposition method. It is needless to say that if a desired oxygen content may not be obtained only by introducing the oxygen gas, liquid (for example, moisture vapor or the like) may be introduced into the chamber.

It is possible that the oxygen content of the first oxygen-containing region is clearly different from the oxygen content of the second oxygen-containing region, or the oxygen content of the first oxygen-containing region is not clearly different from the oxygen content of the second oxygen-containing region. In particular, when the introduction amount of the oxygen gas is continuously changed as described above, the oxygen content may be also continuously changed. When the introduction amount of the oxygen gas is intermittently changed, the first oxygen-containing region and the second oxygen-containing region become so-called "layer." Meanwhile, when the introduction amount of the oxygen gas is continuously changed, the first oxygen-containing region and the second oxygen-containing region become "lamellar state" rather than "layer." In the latter case, the oxygen content in the anode active material particle is distributed in a state of ups and downs. In this case, it is preferable that the oxygen content is gradually or continuously changed between the first oxygen-containing region and the second oxygen-containing region. If the oxygen content is changed drastically, the ion diffusion characteristics may be lowered, or the resistance may be increased.

The metal material contained together with the anode active material particle in the anode active material layer 2 contains the metal element not being alloyed with an electrode reactant, since thereby expansion and shrinkage of the anode active material layer 2 are prevented. Examples of the metal elements include, for example, at least one selected from the group consisting of iron, cobalt, nickel, zinc, copper, chromium, titanium, magnesium, and manganese. Specially, at least one selected from the group consisting of iron, cobalt, nickel, zinc, and copper is preferable, and cobalt is more preferable. It is needless to say that the metal material may contain a metal element other than the foregoing metal elements, as long as such other metal element is a metal element not being alloyed with the electrode reactant. In the invention, the metal material contained together with the anode active material particle in the anode active material layer 2 is a comprehensive term, and thus the metal material may be one of a simple substance, an alloy, and a compound, as long as the metal material has a metal element not being alloyed with the electrode reactant.

The foregoing metal material preferably has crystallinity, since thereby the resistance of the entire anode is lowered and the electrode reactant is easily inserted and extracted in the anode, rather than in the case that the metal material does not have crystallinity (amorphous). In addition, in this case, the electrode reactant is uniformly inserted and extracted in the initial operation of the electrochemical device (for example, initial charge of the battery), a local stress is not hardly generated in the anode, and therefore wrinkle is prevented from being generated. In this case, the half bandwidth $2\theta$ of the peak originated in (111) crystal plane of the metal material obtained by X-ray diffraction is preferably 20 degrees or less, since thereby higher effects can be obtained.

As described above, the metal material is provided in a gap between adjacent anode active material particles, in the case that the anode active material particle is grown from the surface of the anode current collector 1 in the thickness direction of the anode active material layer 2. Further, the metal material covers at least part of the exposed face of the anode active material particle, that is, at least part of the surface of the anode active material particle not adjacent to other anode active material particle. Furthermore, in the case where the anode active material particle has a multilayer structure in the particle, the metal material is provided in a gap in the particle.

Figure 2A:
FIGS. 2A and 2B are an SEM photograph showing a cross sectional structure of the anode shown in FIG. 1 and a schematic view thereof.
Figure 2B:
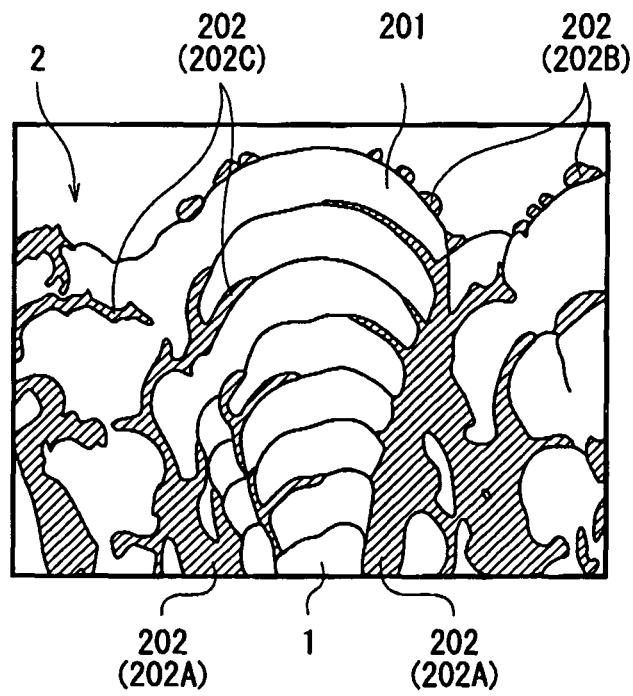

FIGS. 2A and 2B show a cross sectional structure of the anode. FIG. 2A is a photograph (secondary electron image) of a scanning electron microscope (SEM). FIG. 2B schematically shows the SEM image shown in FIG. 2A. In FIG. 2A, the non-hatched section in FIG. 2B is an anode active material particle 201, and the hatched section is a metal material 202. FIGS. 2A and 2B show a case that the anode active material particle 201 has the multilayer structure in the particle.

As shown in FIGS. 2A and 2B, when a protrusion (for example, a microparticle formed by electrolytic treatment) exists on the roughened surface of the anode current collector 1, the anode active material is deposited several times and layered over the surface of the anode current collector 1. Thereby, the plurality of anode active material particles 201 are gradually grown in the thickness direction for every projection described above, and arranged on the anode current collector 1. In this case, for example, the metal material 202 is provided in a gap between adjacent anode active material particles 201 (metal material 202A), the metal material 202 partly covers the exposed face of the anode active material particle 201 (metal material 202B), and the metal material 202 is provided in a gap in the anode active material particle 201 (metal material 202C). The metal material 202 including the metal materials 202A and 202C has a structure in which the metal material 202A functions as a trunk, and the plurality of metal materials 202C branch out from the trunk.

The metal material 202A intrudes into a gap between adjacent anode active material particles to improve the binding characteristics of the anode active material layer 2. More specifically, if the anode active material particle 201 is formed by vapor-phase deposition method or the like, the anode active material particles 201 are grown for every projection existing on the surface of the anode current collector 1 described above, and thus a gap is generated between the anode active material particles 201. The gap causes lowering of the binding characteristics of the anode active material layer 2. Therefore, to improve the binding characteristics, the metal material 202A fills in the foregoing gap. In this case, it is enough that part of the gap is filled therewith, but the larger filling amount is preferable, since thereby the binding characteristics of the anode active material layer 2 are further improved. The filling amount of the metal material 202A is preferably 20% or more, more preferably 40% or more, and much more preferably 80% or more.

The metal material 202B covers the projection to prevent a fibrous minute projection (not shown) generated on the exposed face of the uppermost layer in the anode active material particle 201 from adversely affect the performance of the electrochemical device. More specifically, if the anode active material particle 201 is formed by vapor-phase deposition method or the like, the fibrous minute projections are generated on the surface thereof, and thus a void is generated between the projections. The void causes increase of the surface area of the anode active material, and accordingly an irreversible coat formed on the surface is also increased, possibly resulting in lowering of progression of the electrode reaction. Therefore, to avoid the lowering of progression of the electrode reaction, the foregoing void is filled with the metal material 202B. In this case, it is enough at minimum that part of the void is filled therewith, but the larger filling amount is preferable, since thereby the lowering of progression of the electrode reaction is further prevented. In FIGS. 2A and 2B, the metal material 202B is dotted on the uppermost surface of the anode active material particle 201, which means that the foregoing minute projection exists in the location where the metal material 202B is dotted. It is needless to say that the metal material 202B is not necessarily always dotted on the surface of the anode active material particle 201, but may cover the entire surface.

The metal material 202C intrudes into a gap in the anode active material particle 201 to improve the biding characteristics of the anode active material layer 2. More specifically, in the case where the anode active material particle 201 has a multilayer structure, a gap is generated between each layer. The gap may cause lowering of the biding characteristics of the anode active material layer 2 as well as the foregoing gap between adjacent anode active material particles 201 may do. Therefore, to improve the biding characteristics, the foregoing gap is filled with the metal material 202C. In this case, it is enough at minimum that part of the gap is filled therewith, but the larger filling amount is preferable, since thereby the binding characteristics of the anode active material layer 2 are further improved.

In particular, the metal material 202C has a function similar to that of the metal material 202B. More specifically, if the anode active material is deposited several times and thereby layered, the foregoing minute projection is generated on the surface thereof every deposition. Therefore, the metal material 202C fills in not only the gap in the anode active material particle 201, but also the foregoing minute void.

The metal material is formed by, for example, at least one method selected from the group consisting of vapor-phase deposition method and liquid-phase deposition method. Specially, the metal material is preferably formed by liquid-phase deposition method. Thereby, the gap described with reference to FIGS. 2A and 2B is easily filled with the metal material. In addition, in this case, the metal material easily fills in the void, and the crystallinity of the metal material is improved.

Examples of the foregoing vapor-phase deposition method include, for example, a method similar to that used in forming the anode active material particle. Examples of the liquid-phase deposition method include, for example, plating method such as electrolytic plating method and electroless plating method. Specially, as the liquid-phase deposition method, electrolytic plating method is more preferable than electroless plating method. Thereby, the metal material more easily fills in the gap and the void, and the crystallinity of the metal material is more improved.

The ratio (molar ratio) $M2/M1$ between the number of moles $M1$ per unit area of the anode active material particle and the number of moles $M2$ per unit area of the metal material is preferably in the range from 1/15 to 7/1. The ratio of the atomicity occupied by the metal material (occupancy of the metal material) on the surface of the anode is preferably in the range from 2 atomic % to 82 atomic %, and more preferably in the range from 2.3 atomic % to 82 atomic %. Thereby, expansion and shrinkage of the anode active material layer 2 are prevented. The occupancy of the metal material can be measured by, for example, analyzing element of the anode surface with the use of, for example, energy dispersive X-ray fluorescence spectroscopy (EDX).

In particular, it is preferable that the metal material further has oxygen as an element, since thereby expansion and shrinkage of the anode active material layer 2 are prevented. The oxygen content in the metal material is preferably in the range from 1.5 atomic % to 30 atomic %, since thereby higher effects can be obtained. More specifically, if the oxygen content is smaller than 1.5 atomic %, expansion and shrinkage of the anode active material layer 2 are not sufficiently prevented. Meanwhile, if the oxygen content is larger than 30 atomic %, the resistance is excessively increased. The metal material having oxygen can be formed, for example, by a procedure similar to that used in forming the anode active material particle having oxygen.

Figure 3A:
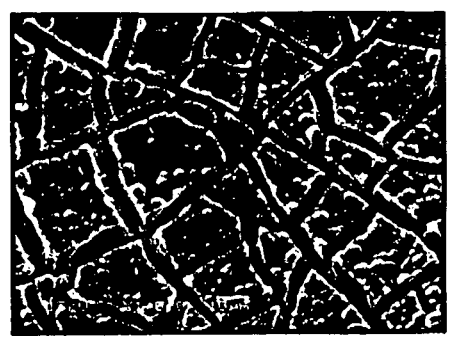
FIGS. 3A and 3B are an SEM photograph showing a particle structure of the surface of an anode active material layer shown in FIG. 1 and a schematic view thereof.
Figure 3B:
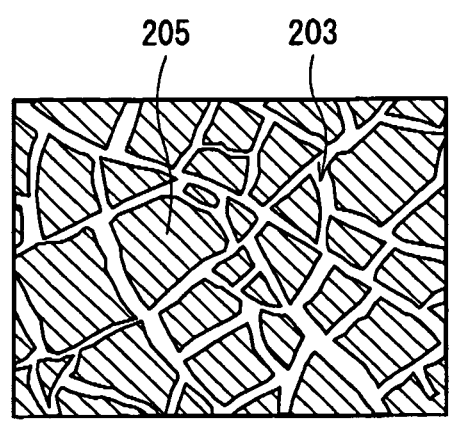
Figure 4A:
FIGS. 4A and 4B are an SEM photograph showing a cross sectional structure of the anode active material layer shown in FIGS. 3A and 3B and a schematic view thereof.
Figure 4B:
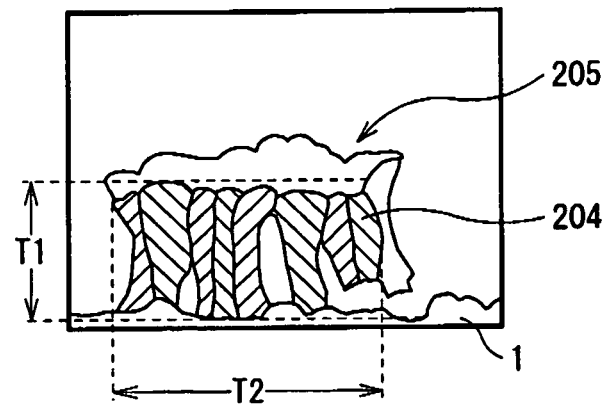
Figure 5A:
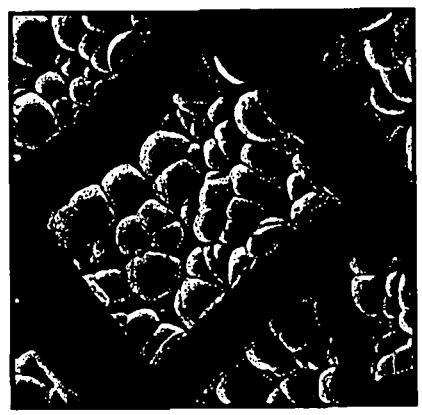
FIGS. 5A and 5B are an SIM photograph showing an enlarged part of the surface of the anode active material layer shown in FIGS. 3A and 3B and a schematic view thereof.
Figure 5B:
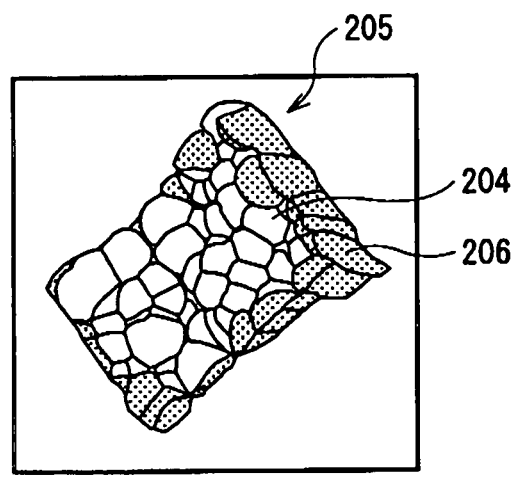

FIGS. 3A and 3B show a particle structure of the surface of the anode active material layer 2. FIG. 3A is an SEM photograph. FIG. 3B schematically shows the SEM image shown in FIG. 3A. FIGS. 4A and 4B show a cross section of the anode active material layer 2 shown in FIGS. 3A and 3B. FIG. 4A is an SEM photograph. FIG. 4B schematically shows the SEM image shown in FIG. 4A. FIGS. 5A and 5B show an expanded part of the particle structure shown in FIGS. 3A and 3B. FIG. 5A is a scanning ion microscope (SIM) photograph. FIG. 5B schematically shows the SIM image shown in FIG. 5A. FIG. 3A to FIG. 5B show a case in which the anode active material particle has a single layer structure.

In FIG. 3A, the hatched section in FIG. 3B is a secondary particle 205, and a particulate matter shown therein is a primary particle. In FIG. 4A, the hatched section in FIG. 4B is a primary particle 204 (anode active material particle of the single layer structure).

As shown in FIG. 3A to FIG. 5B, the secondary particle 205 is separated in the in-plane direction of the anode active material layer 2 by a groove 203 with the depth in the thickness direction of the anode active material layer 2. As shown in FIG. 4A to FIG. 5B, each primary particle 204 is not simply adjacent to each other, but at least part of each primary particle 204 is jointed to each other to form the secondary particle 205, and the groove 203 almost reaches the anode current collector 1. The depth and the width of the groove 203 are, for example 5 μm or more and 1 μm or more, respectively. The groove 203 is formed by electrode reaction (charge and discharge reaction in the case that the anode is used for a battery). The groove 203 is not split along the primary particle 204, but is relatively in the shape of a straight line. Thereby, as shown in FIGS. 3A, 3B, 5A, and 5B, part of the primary particle 204 becomes a split particle 206 that is split by the groove 203. In FIG. 5A, the meshed section in FIG. 5B is the split particle 206.

The number of the split particles 206 is preferably ten or more on the average per each secondary particle 205 in adjacent five or more secondary particles 205. If the primary particles 204 are jointed with a certain level of contact characteristics to form the secondary particle 205 with a certain level or more of size, a stress due to expansion and shrinkage of the anode active material layer 2 in charge and discharge is relaxed. It is enough that the average number of the split particles 206 is satisfied in the central portion of the anode. At the circumferential portion of the anode, current concentration easily occurs, and generation of the groove 203 easily varies.

Further, as the secondary particles 205, the number ratio of the secondary particles in which length T2 in the direction perpendicular to length T1 in the thickness direction is longer than the length T1 is preferably about 50% or more out of continuous ten secondary particle 205 in the cross section in the thickness direction shown in FIG. 4B. Thereby, the stress due to expansion and shrinkage of the anode active material layer 2 is more relaxed. It is enough that the number ratio is satisfied in the central portion of the anode, as well as the foregoing number of split particles 206 is. For the length T1 in the thickness direction and the length T2 in the direction perpendicular to the length T1, the maximum value in the cross section for every secondary particle 205 is measured.

For example, these particle structures may be observed with the use of an SEM as shown in FIG. 3A and FIG. 4A, or may be observed with an SIM as shown in FIG. 5A. A cross section to be observed is preferably cut out by focused ion beam (FIB), a microtome or the like.

Figure 6:
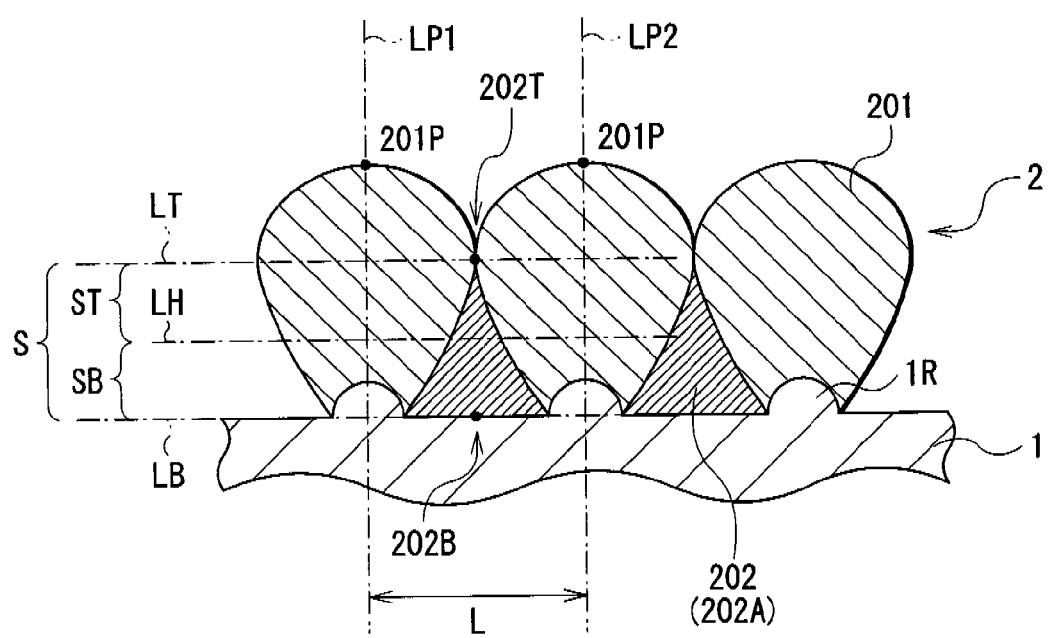
FIG. 6 is a cross section schematically showing the cross sectional structure of the anode shown in FIG. 1 and FIGS. 2A and 2B.

FIG. 6 schematically shows the cross sectional structure of the anode shown in FIG. 1, FIG. 2A, and FIG. 2B. FIG. 6 shows a case that the anode active material particle 201 has a single layer structure.

As shown in FIG. 6, in the anode active material layer 2, the plurality of anode active material particles 201 are grown for every projection 1R of the anode current collector 1, and arranged on the anode current collector 1. The anode active material layer 2 contains the metal material 202 (202A) in a gap between the anode active material particles 201.

If the anode active material layer 2 contains the metal material 202 together with the anode active material particle 201, the metal material 202 may be distributed in any fashion in the anode active material layer 2. However, specially, a great deal of the metal material 202 preferably exists on the side close to the anode current collector 1. More specifically, under the conditions that in a cross section of the anode active material layer 2 along the arrangement direction of the plurality of anode active material particles 201, the existence region of the metal material 202 that exists in a gap between given two anode active material particles 201 is regarded as given region S, the ratio of the area occupied by the metal material 202 in lower region SB when the region S is vertically divided in half is preferably 60% or more, and more preferably 70% or more. The reason thereof is as follows. That is, most of the metal material 202 exists inside the anode active material layer 2 (side close to the anode current collector 1). Thus, in this way, while the binding characteristics of the anode active material particle is secured, troubles generated in the case where most of the metal material 202 exists in the vicinity of the surface of the anode active material layer 2 (side far from the anode current collector 1), for example, electrode hardening, short circuit and the like can be prevented. In particular, if the metal material 202 is formed by using plating method, the metal material 202 is prevented from being segregated (being excessively formed) on the surface of the anode active material particle 201. Therefore, short circuit caused by the segregation can be prevented. The ratio of the area occupied by the metal material 202 in the lower region SB can be determined, for example, by observing a cross section of the anode with the use of an SEM.

The foregoing "region S" means the region surrounded by two straight lines LP1 and LP2 that extend in the direction crossing the surface of the anode current collector 1 and pass through apexes 201P of two adjacent anode active material particles 201; and two straight lines LT and LB that extend in the direction along the surface of the anode current collector 1 and pass through upper end point 202T and lower end point 202B of the metal material 202, where the surface of the anode current collector 1 is regarded as an approximately flat face. "Lower region SB" means the region surrounded by four straight lines LP1, LP2, LH, and LB, where the region S is vertically divided in half (upper region ST and lower region SB) by straight line LH. For confirmation, "upper" means the side far from the anode current collector 1, and "lower" means the side close to the anode current collector 1. Accordingly, "ratio of the area occupied by the metal material 202 in the lower region SB" is a value (%) expressed as (area occupied by the metal material 202 in the lower region SB/area occupied by the metal material 202 in the region S)×100.

When the region S is determined, as long as two adjacent anode active material particles 201 are combined, any combination of given anode active material particles 201 can be selected out of a plurality of combinations of the anode active material particles 201 existing in the anode active material layer 2. However, the region S is preferably determined in a location where the anode active material particles 201 are regularly arranged to some extent. More specifically, the region S is preferably determined in a location where distance L between the apexes 201P of two adjacent anode active material particles 201 is from 1 μm to 30 μm. Thereby, the region S is determined with favorable reproducibility, and the ratio of the area occupied by the metal material 202 in the lower region SB can be calculated with favorable reproducibility.

In FIG. 6, the description has been given of only the case that the anode active material particle 201 has a single layer structure. Thus, in this case, the metal material 202 contains only the metal material 202A, and the straight lines LT and LB are determined by the upper end point and the lower end point of the metal material 202A. Meanwhile, in the case where the anode active material particle 201 has a multilayer structure, the metal material 202 contains the metal materials 202A and 202C. Thus, the straight lines LT and LB are determined by the upper end point and the lower end point of an aggregate including the metal materials 202A and 202C. As described above, when the region S is determined, attention is focused on the metal materials 202A and 202C located between the anode active material particles 201 and located in the particle, and attention is not focused on the metal material 202B located on the uppermost surface of the anode active material particle 201.

If the ratio of the area occupied by the metal material 202 in the lower region SB is in the foregoing range, the ratio (molar ratio) M2/M1 between the number of moles M1 per unit area of the anode active material particle 201 and the number of moles M2 per unit area of the metal material 202 is preferably in the range from 1/100 to 1/1, and more preferably in the range from 1/50 to 1/2. If the ratio of the area occupied by the metal material 202 in the lower region SB is in the foregoing range, the amount of the metal material 202 is corrected, and thus while the binding characteristics of the anode active material particle 201 is secured, electrode hardening, short circuit and the like are prevented.

The anode is formed, for example, by the following procedure.

First, the anode current collector 1 is prepared. If necessary, the surface of the anode current collector 1 is provided with roughening processing. After that, the plurality of anode active material particles having silicon are formed on the anode current collector 1 by using vapor-phase deposition method or the like. In this case, the anode active material particle may be formed into a single layer structure through a single film forming step. Otherwise, the anode active material particle may be formed into a multilayer structure through a plurality of film forming steps. After that, the metal material that has a metal element not being alloyed with the electrode reactant is formed by liquid-phase deposition method or the like. Thereby, the metal material intrudes into a gap between adjacent anode active material particles, and thus the anode active material layer 2 is formed. In this case, for example, at least part of the exposed face of the anode active material particle is covered with the metal material. Meanwhile, for example, if the anode active material particle is formed into the multilayer structure, the metal material intrudes into a gap in the anode active material particle.

In case of forming the metal material, the formation range of the metal material is preferably adjusted so that the ratio of the area occupied by the metal material in the lower region SB shown in FIG. 6 is 60% or more. The ratio of the area of the metal material can be controlled by, for example, adjusting the current density when the metal material is formed by using electrolytic plating method. More specifically, if the current density is lowered, the plating film is densely grown from the surface of the anode current collector 1, and thus the ratio of the area of the metal material in the lower region SB is increased. Meanwhile, if the current density is increased, the plating film is not densely grown but locally grown along the surface of the anode active material particle, and thus the ratio of the area of the metal material in the lower region SB is decreased.

After that, the anode is preferably heated (so-called annealed), since thereby crystallization of the metal material proceeds, and thus the crystallinity is increased. Temperature, time and the like in annealing can be freely set according to the conditions such as the crystallinity of the metal material. However, notice should be taken that if the annealing temperatures are excessively high, alloying in the interface between the anode current collector 1 and the anode active material particle may possibly proceed excessively.

In particular, necessity of annealing in the case that the metal material is formed by liquid-phase deposition method will be explained as follows. That is, if the electrolytic plating method is used, sufficient crystallinity can be obtained without annealing, but the crystallinity is more improved with annealing. Meanwhile, if the electroless plating method is used, sufficient crystallinity may not be possibly obtained without annealing, but in that case, sufficient crystallinity can be obtained with annealing.

According to the anode and the method of manufacturing it, after the anode active material particle having silicon is formed on the anode current collector 1, the metal material having a metal element not being alloyed with the electrode reactant is formed. Therefore, the metal material intrudes into a gap between adjacent anode active material particles. Thereby, the anode active material particles are bound through the metal material, and thus the anode active material layer 2 is hardly pulverized and fallen. Accordingly, in the electrochemical device using the anode, the cycle characteristics can be improved. Further, since the electrochemical device is hardly swollen in operation, not only the cycle characteristics but also the swollenness characteristics can be improved.

In particular, when the metal material covers at least part of the exposed face of the anode active material particle, adverse effect due to the fibrous minute projection generated on the exposed face is prevented. Further, when the anode active material particle has a multilayer structure in the particle, and the metal material intrudes into a gap in the particle, the anode active material layer 2 is hardly pulverized and fallen and the electrochemical device is hardly swollen, similarly to the case that the metal material intrudes into the gap between the adjacent anode active material particles. Therefore, in this case, the cycle characteristics and the swollenness characteristics can be more improved.

Further, if the molar ratio M2/M1 between the anode active material particle and the metal material is in the range from 1/15 to 7/1, or the ratio of the atomicity occupied by the metal material on the surface of the anode active material layer 2 is in the range from 2 atomic % to 82 atomic %, higher effects can be obtained.

If the anode active material particle further has oxygen and the oxygen content in the anode active material is in the range from 3 atomic % to 40 atomic %, or when the anode active material particle further has at least one metal element selected from the group consisting of iron, cobalt, nickel, titanium, chromium, and molybdenum; or when the anode active material particle has the oxygen-containing region (region which has further oxygen and in which the oxygen content is higher than that of the other regions) in the thickness direction, or when the metal further has oxygen and the oxygen content in the metal material is in the range from 1.5 atomic % to 30 atomic %, higher effects can be obtained.

Further, when the anode active material layer 2 has ten or more split particles 206 on the average per each secondary particle 205 out of adjacent five or more secondary particles 205, the contact characteristics between the anode current collector 1 and the anode active material layer 2 are improved, and the contact characteristics between each primary particle 204 (anode active material particle) in the anode active material layer 2 are improved. Thereby, a stress due to expansion and shrinkage of the anode active material layer 2 is relaxed, and thereby the anode active material layer 2 is hardly pulverized and fallen. Accordingly, the cycle characteristics can be more improved. In this case, when as the secondary particles 205, the number ratio of the secondary particles in which the length in the direction perpendicular to the length in the thickness direction is longer than the length in the thickness direction is 50% or more out of continuous ten secondary particles 205 in a cross section in the thickness direction of the anode active material layer 2, higher effects can be obtained.

Further, when the metal material has the crystallinity, the resistance of the entire anode is lowered, the electrode reactant is easily inserted and extracted, and wrinkles are hardly generated in the anode. In the result, higher effects can be obtained. In this case, if the half bandwidth 2θ of the peak originated in (111) crystal plane of the metal material obtained by X-ray diffraction is 20 degrees or less, the cycle characteristics can be more improved.

Further, when the metal material is formed by liquid-phase deposition method, the metal material easily intrudes into a gap between adjacent anode active material particles and a gap in the anode active material particle, the metal material easily fills in a void between the fibrous minute projections, and the crystallinity of the metal material is improved. In the result, in this case, higher effects can be obtained. In this case, when the anode is annealed after the metal material is formed, the crystallinity of the metal material is improved, and thus higher effects can be obtained.

Further, in the case that the plurality of anode active material particles are arranged on the anode current collector 1, the cycle characteristics can be more improved and troubles such as electrode hardening and short circuit can be prevented, when the ratio of the area occupied by the metal material in the lower region SB shown in FIG. 6 is 60% or more, and more preferably 70% or more in a cross section of the anode active material layer 2 along the arrangement direction of the plurality of anode active material particles. In this case, when the molar ratio M2/M1 between the anode active material particle and the metal material is in the range from 1/100 to 1/1, and more preferably in the range from 1/50 to 1/2, higher effects can be obtained.

Further, when the surface of the anode current collector 1 opposed to the anode active material layer 2 is roughened by the microparticle formed by electrolytic treatment, the contact characteristics between the anode current collector 1 and the anode active material layer 2 can be improved. In this case, when ten point height of roughness profile Rz of the surface of the anode current collector 1 is in the range from 1.5 µm to 6.5 µm, higher effects can be obtained.

A description will be hereinafter given of a usage example of the foregoing anode. As an example of the electrochemical devices, batteries are herein taken. The anode is used for the batteries as follows.

First Battery

Figure 7:
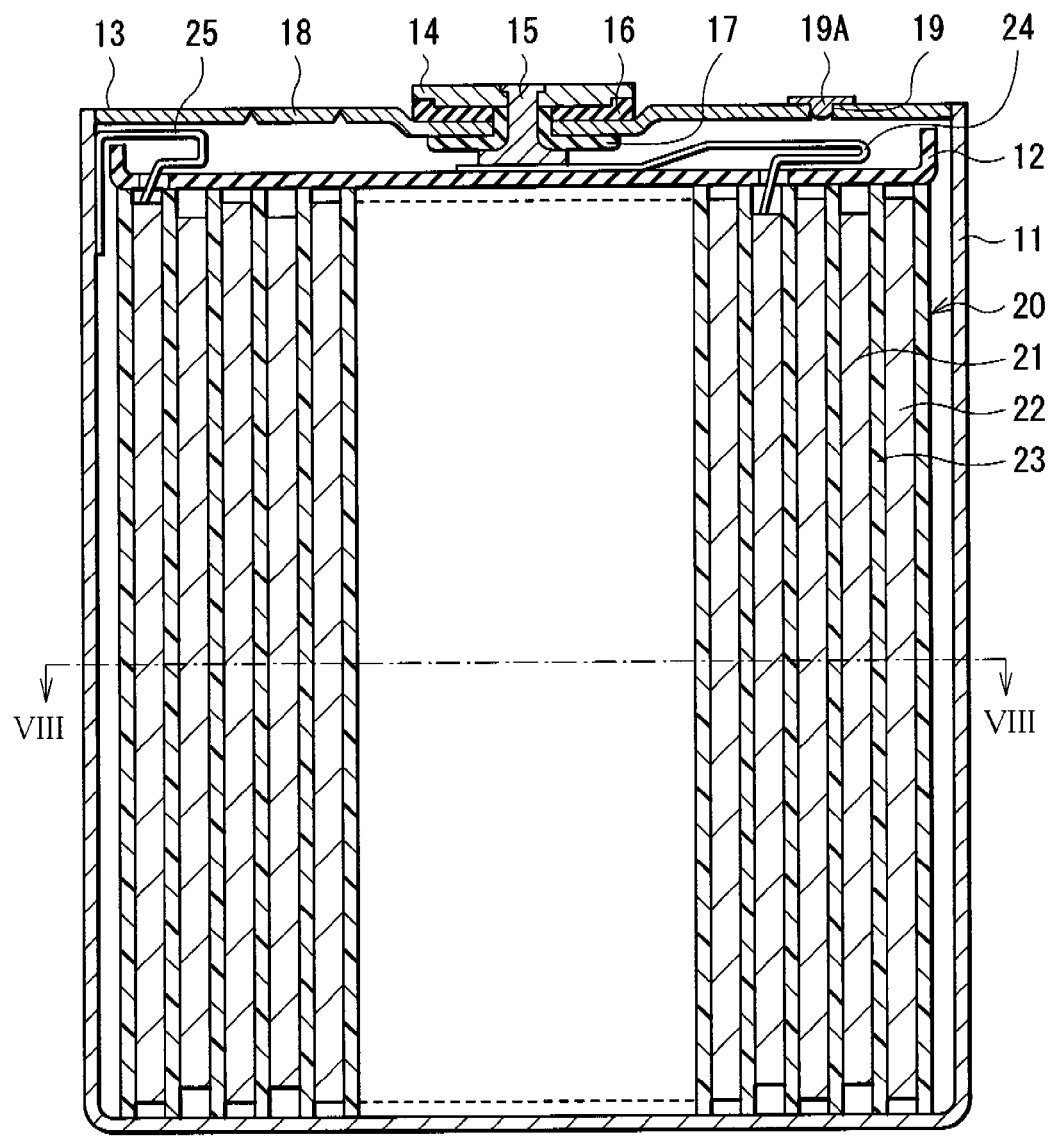
FIG. 7 is a cross section showing a structure of a first battery including the anode according to the embodiment of the invention.
Figure 8:
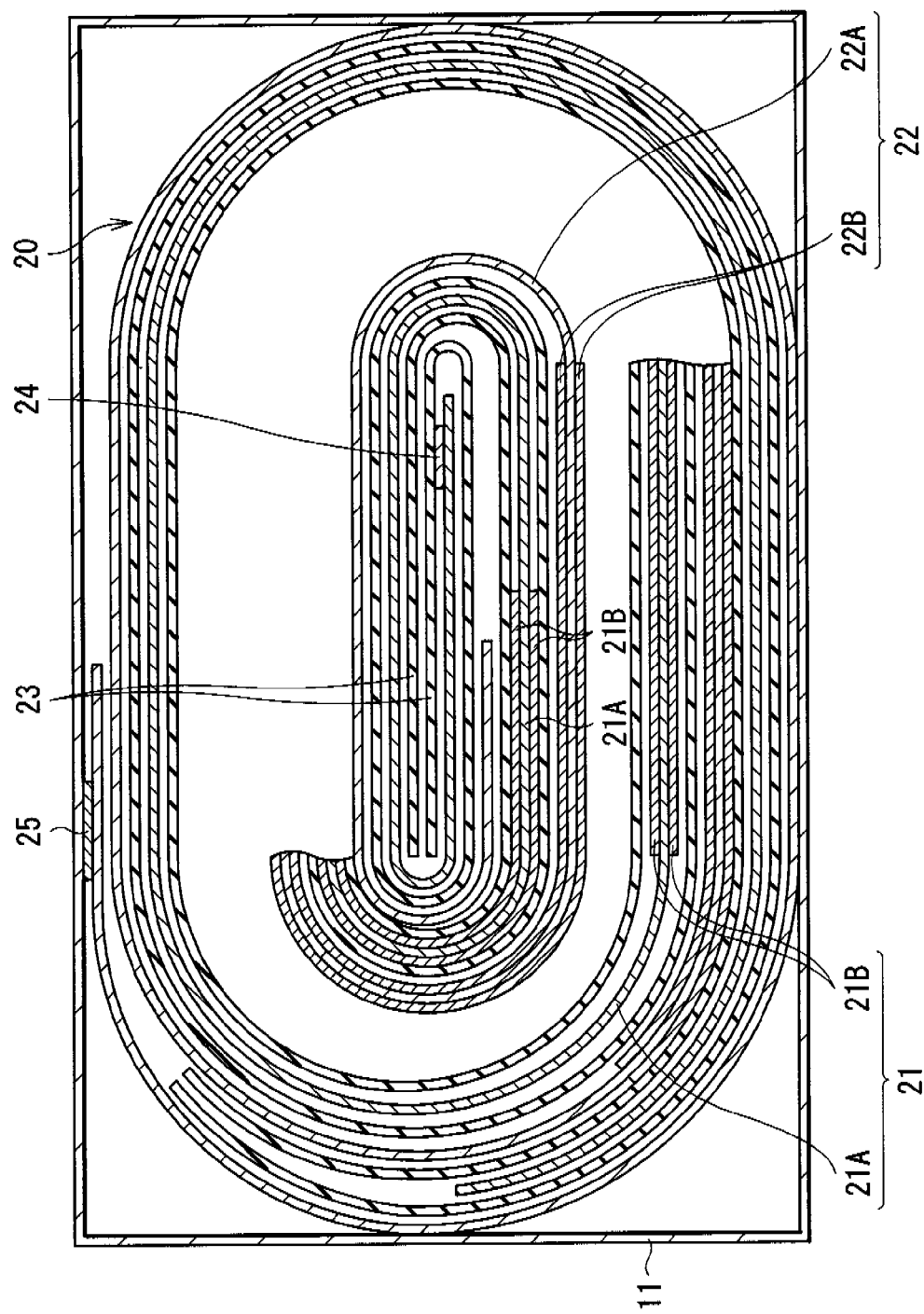
FIG. 8 is a cross section taken along line VIII-VIII of the first battery shown in FIG. 7.

FIG. 7 and FIG. 8 show a cross sectional structure of a first battery. FIG. 8 shows a cross section taken along line VIII-VIII shown in FIG. 7. The battery herein described is, for example, a lithium ion secondary battery in which the capacity of an anode 22 is expressed as the capacity component based on insertion and extraction of lithium as an electrode reactant.

The secondary battery contains a battery element 20 having a flat spirally wound structure inside a battery can 11.

The battery can 11 is, for example, a square package member. As shown in FIG. 8, the square package member has a shape with the cross section in the longitudinal direction of a rectangle or an approximate rectangle (including curved lines in part). The battery can 11 structures not only a square battery in the shape of a rectangle, but also a square battery in the shape of an oval. That is, the square package member means a rectangle vessel-like member with the bottom or an oval vessel-like member with the bottom, which respectively has an opening in the shape of a rectangle or in the shape of an approximate rectangle (oval shape) formed by connecting circular arcs by straight lines. FIG. 8 shows a case that the battery can 11 has a rectangular cross sectional shape. The battery structure including the battery can 11 is the so-called square structure.

The battery can 11 is made of, for example, a metal material containing iron, aluminum (Al), or an alloy thereof. The battery can 11 also has a function as an anode terminal. In this case, to prevent the secondary battery from being swollen by using the rigidity (hardly deformable characteristics) of the battery can 11 when charged and discharged, the battery can 11 is preferably made of rigid iron than aluminum. If the battery can 11 is made of iron, for example, the iron may be plated by nickel (Ni) or the like.

The battery can 11 also has a hollow structure in which one end of the battery can 11 is closed and the other end thereof is opened. At the open end of the battery can 11, an insulating plate 12 and a battery cover 13 are attached, and thereby inside of the battery can 11 is hermetically closed. The insulating plate 12 is located between the battery element 20 and the battery cover 13, is arranged perpendicular to the spirally wound circumferential face of the battery element 20, and is made of, for example, polypropylene or the like. The battery cover 13 is, for example, made of a material similar to that of the battery can 11, and also has a function as an anode terminal as the battery can 11 does.

Outside of the battery cover 13, a terminal plate 14 as a cathode terminal is arranged. The terminal plate 14 is electrically insulated from the battery cover 13 with an insulating case 16 in between. The insulating case 16 is made of, for example, polybutylene terephthalate or the like. In the approximate center of the battery cover 13, a through-hole is provided. A cathode pin 15 is inserted in the through-hole so that the cathode pin is electrically connected to the terminal plate 14, and is electrically insulated from the battery cover 13 with a gasket 17 in between. The gasket 17 is made of, for example, an insulating material, and the surface thereof is coated with asphalt.

In the vicinity of the rim of the battery cover 13, a splitting valve 18 and an injection hole 19 are provided. The splitting valve 18 is electrically connected to the battery cover 13. If the internal pressure of the battery becomes a certain level or more by internal short circuit, external heating or the like, the splitting valve 18 is departed from the battery cover 13 to release the internal pressure. The injection hole 19 is sealed by a sealing member 19A made of, for example, a stainless steel ball.

In the battery element 20, a cathode 21 and an anode 22 are layered with a separator 23 in between, and are spirally wound. The battery element 20 is flat according to the shape of the battery can 11. A cathode lead 24 made of a metal material such as aluminum is attached to an end of the cathode 21 (for example, the internal end thereof). An anode lead 25 made of a metal material such as nickel is attached to an end of the anode 22 (for example, the outer end thereof). The cathode lead 24 is electrically connected to the terminal plate 14 by being welded to an end of the cathode pin 15. The anode lead 25 is welded and electrically connected to the battery can 11.

In the cathode 21, for example, a cathode active material layer 21B is provided on the both faces of a strip-shaped cathode current collector 21A. The cathode current collector 21A is made of, for example, a metal material such as aluminum, nickel, and stainless. The cathode active material layer 21B contains a cathode active material, and if necessary, may also contain a binder, a conductive material and the like.

The cathode active material contains one or more cathode materials capable of inserting and extracting lithium as an electrode reactant. As the cathode material, for example, a lithium complex oxide such as lithium cobalt oxide, lithium nickel oxide, a solid solution containing them ($Li(Ni_xCo_yMn_z)O_2$, values of x, y, and z are respectively expressed as $0<x<1$, $0<y<1$, $0<z<1$, and $x+y+z=1$), lithium manganese oxide having a spinel structure ($LiMn_2O_4$), and a solid solution thereof ($Li(Mn_{2-v}Ni_v)O_4$, a value of v is expressed as $v<2$). Further, as the cathode material, for example, a phosphate compound having an olivine structure such as lithium iron phosphate ($LiFePO_4$) can be cited. Thereby, a high energy density can be obtained. In addition, as the cathode material, for example, an oxide such as titanium oxide, vanadium oxide, and manganese dioxide; a disulfide such as iron disulfide, titanium disulfide, and molybdenum sulfide; sulfur; a conductive polymer such as polyaniline and polythiophene can be cited.

The anode 22 has a structure similar to that of the foregoing anode. For example, in the anode 22, an anode active material layer 22B is provided on the both faces of a strip-shaped anode current collector 22A. The structures of the anode current collector 22A and the anode active material layer 22B are respectively similar to the structures of the anode current collector 1 and the anode active material layer 2 in the foregoing anode.

The separator 23 separates the cathode 21 from the anode 22, and passes ions as an electrode reactant while preventing current short circuit due to contact of the both electrodes. The separator 23 is made of, for example, a porous film made of a synthetic resin such as polytetrafluoroethylene, polypropylene, and polyethylene, or a ceramic porous film. The separator 23 may have a structure in which two or more porous films as the foregoing porous films are layered.

An electrolytic solution as a liquid electrolyte is impregnated in the separator 23. The electrolytic solution contains, for example, a solvent and an electrolyte salt dissolved therein.

The solvent contains, for example, one or more nonaqueous solvents such as an organic solvent. The nonaqueous solvents include, for example, an ester carbonate solvent such as ethylene carbonate, propylene carbonate, butylene carbonate, dimethyl carbonate, diethyl carbonate, ethyl methyl carbonate, and methyl propyl carbonate. Thereby, superior capacity characteristics, superior storage characteristics, and superior cycle characteristics are obtained. One thereof may be used singly, or two or more thereof may be used by mixing. Specially, as the solvent, a mixture of a high-viscosity solvent such as ethylene carbonate and propylene carbonate and a low-viscosity solvent such as dimethyl carbonate, ethyl methyl carbonate, and diethyl carbonate is preferable. Thereby, the dissociation property of the electrolyte salt and the ion mobility are improved, and thus higher effects can be obtained.

In particular, the solvent preferably contains halogenated ester carbonate such as chain ester carbonate having halogen as an element and cyclic ester carbonate having halogen as an element, since thereby a stable coat is formed on the surface of the anode 22, and thus the decomposition reaction of the electrolytic solution is prevented and the cycle characteristics are improved. As the halogenated ester carbonate, fluorinated ester carbonate is preferable, and difluoroethylene carbonate is preferable to monofluoroethylene carbonate, since thereby higher effects can be obtained. As monofluoroethylene carbonate, for example, 4-fluoro-1,3-dioxolane-2-one is cited. As difluoroethylene carbonate, for example, 4,5-difluoro-1,3-dioxolane-2-one is cited.

Further, the solvent preferably contains cyclic ester carbonate having an unsaturated bond, since thereby the cycle characteristics are improved. As the cyclic ester carbonate having an unsaturated bond, for example, vinylene carbonate, vinyl ethylene carbonate and the like can be cited.

Further, the solvent preferably contains sultone, since thereby the cycle characteristics are improved, and the secondary battery is prevented from being swollen. As the sultone, for example, 1,3-propene sultone or the like can be cited.

The electrolyte salt contains, for example, one or more light metal salts such as a lithium salt. As the lithium salt, for example, lithium hexafluorophosphate ($LiPF_6$), lithium perchlorate ($LiClO_4$), lithium hexafluoroarsenate ($LiAsF_6$) or the like is cited. Thereby, superior capacity characteristics, superior storage characteristics, and superior cycle characteristics are obtained. One thereof may be used singly, or two or more thereof may be used by mixing. Specially, as the electrolyte salt, lithium hexafluorophosphate is preferable, since the internal resistance is lowered, and thus higher effects can be obtained.

In particular, the electrolyte salt preferably contains a compound having boron and fluorine, since thereby the cycle characteristics are improved, and the secondary battery is prevented from being swollen. As the compound having boron and fluorine, for example, lithium tetrafluoroborate can be cited.

The content of the electrolyte salt in the solvent is, for example, in the range from 0.3 mol/kg to 3.0 mol/kg since thereby superior capacity characteristics can be obtained.

The secondary battery is manufactured, for example, by the following procedure.

First, the cathode 21 is formed. That is, a cathode active material, a binder, and an electrical conductor are mixed to prepare a cathode mixture, which is dispersed in an organic solvent to form paste cathode mixture slurry. Subsequently, the both faces of the cathode current collector 21A are uniformly coated with the cathode mixture slurry by using a doctor blade, a bar coater or the like, which is dried. Finally, the resultant is compression-molded by a rolling press machine or the like while being heated according to need to form the cathode active material layer 21B. In this case, the resultant may be compression molded over several times.

Then, the anode 22 is formed by forming the anode active material layer 22B on the both faces of the anode current collector 22A by the same procedure as that of forming the anode described above.

Next, the battery element 20 is formed. That is, the cathode lead 24 and the anode lead 25 are respectively attached to the cathode current collector 21A and the anode current collector 22A by welding or the like. Subsequently, the cathode 21 and the anode 22 are layered with the separator 23 in between, and spirally wound in the longitudinal direction. Finally, the resultant is formed in the flat shape, and thereby the battery element 20 is formed.

Finally, the secondary battery is assembled. That is, after the battery element 20 is contained in the battery can 11, the insulating plate 12 is arranged on the battery element 20. Subsequently, the cathode lead 24 and the anode lead 25 are respectively connected to the cathode pin 15 and the battery can 11 by welding or the like. After that, the battery cover 13 is fixed on the open end of the battery can 11 by laser welding or the like. Finally, the electrolyte solution is injected into the battery can 11 from the injection hole 19, and impregnated in the separator 23. After that, the injection hole 19 is sealed by the sealing member 19A. The secondary battery shown in FIG. 7 and FIG. 8 is thereby fabricated.

In the secondary battery, when charged, for example, lithium ions are extracted from the cathode 21, and are inserted in the anode 22 through the electrolytic solution impregnated in the separator 23. Meanwhile, when discharged, for example, lithium ions are extracted from the anode 22, and are inserted in the cathode 21 through the electrolytic solution impregnated in the separator 23.

According to the square secondary battery, since the anode 22 has the structure similar to that of the foregoing anode, the discharge capacity is hardly lowered even when charge and discharge are repeated, and the battery is hardly swollen in charge and discharge. Accordingly, the cycle characteristics and the swollenness characteristics can be improved. In this case, if the anode 22 contains silicon advantageous for obtaining a high capacity, the cycle characteristics are improved. Thus, higher effects can be thereby obtained compared to a case in which the anode contains other anode material such as a carbon material. In particular, even when the anode active material layer 22B contains the metal material, electrode hardening of the anode 22 is prevented. Therefore, when the battery element 20 is formed, the anode 22 can be spirally wound while the anode active material layer 22B is prevented from being split and fallen. Effects of the secondary battery other than the foregoing effects are similar to those of the foregoing anode.

Second Battery

Figure 9:
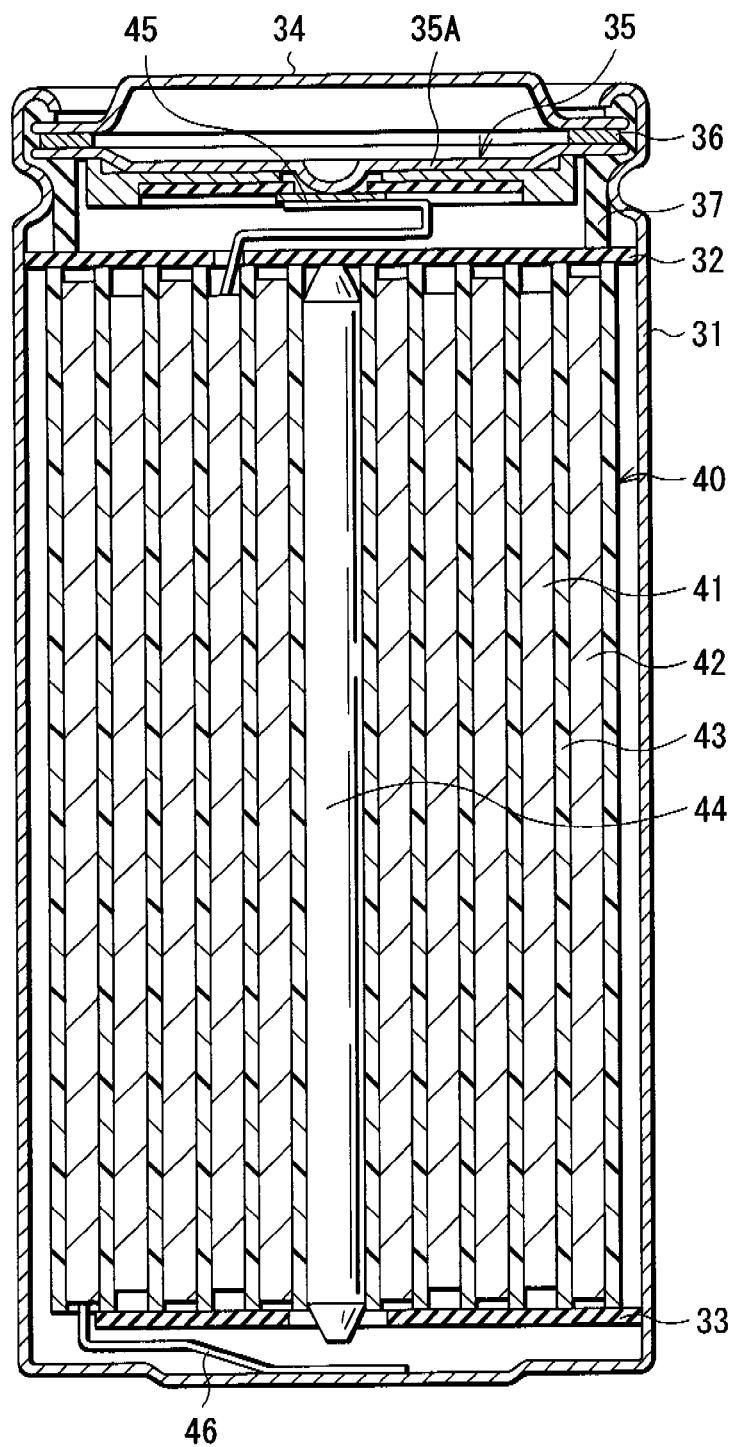
FIG. 9 is a cross section showing a structure of a second battery including the anode according to the embodiment of the invention.
Figure 10:
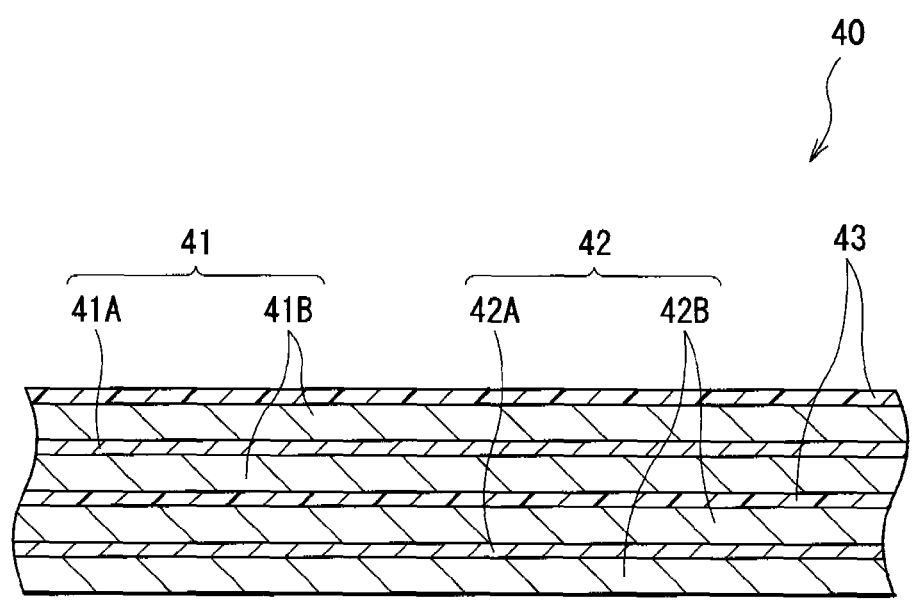
FIG. 10 is a cross section showing an enlarged part of a spirally wound electrode body shown in FIG. 9.

FIG. 9 and FIG. 10 show a cross sectional structure of a second battery. FIG. 10 shows an enlarged part of a spirally wound electrode body 40 shown in FIG. 9. The battery is a lithium ion secondary battery as the foregoing first battery. The second battery contains the spirally wound electrode body 40 in which a cathode 41 and an anode 42 are spirally wound with a separator 43 in between, and a pair of insulating plates 32 and 33 inside a battery can 31 in the shape of an approximately hollow cylinder. The battery structure including the battery can 31 is a so-called cylindrical secondary battery.

The battery can 31 is made of, for example, a metal material similar to that of the battery can 11 in the foregoing first battery. One end of the battery can 31 is closed, and the other end thereof is opened. The pair of insulating plates 32 and 33 is arranged to sandwich the spirally wound electrode body 40 in between and to extend perpendicularly to the spirally wound periphery face.

At the open end of the battery can 31, a battery cover 34, and a safety valve mechanism 35 and a PTC (Positive Temperature Coefficient) device 36 provided inside the battery cover 34 are attached by being caulked with a gasket 37. Inside of the battery can 31 is thereby hermetically sealed. The battery cover 34 is made of, for example, a material similar to that of the battery can 31. The safety valve mechanism 35 is electrically connected to the battery cover 34 through the PTC device 36. In the safety valve mechanism 35, if the internal pressure of the battery becomes a certain level or more by internal short circuit, external heating or the like, a disk plate 35A flips to cut the electric connection between the battery cover 34 and the spirally wound electrode body 40. If temperature rises, the PTC device 36 increases the resistance and thereby limits a current to prevent abnormal heat generation resulting from a large current. The gasket 37 is made of, for example, an insulating material and its surface is coated with asphalt.

For example, a center pin 44 is inserted in the center of the spirally wound electrode body 40. In the spirally wound electrode body 40, a cathode lead 45 made of a metal material such as aluminum is connected to the cathode 41, and an anode lead 46 made of a metal material such as nickel is connected to the anode 42. The cathode lead 45 is electrically connected to the battery cover 34 by being welded to the safety valve mechanism 35. The anode lead 46 is welded and thereby electrically connected to the battery can 31.

The cathode 41 has a structure in which, for example, a cathode active material layer 41B is provided on the both faces of a strip-shaped cathode current collector 41A. The anode 42 has a structure similar to that of the foregoing anode, for example, a structure in which an anode active material layer 42B is provided on the both faces of a strip-shaped anode current collector 42A. The structures of the cathode current collector 41A, the cathode active material layer 41B, the anode current collector 42A, the anode active material layer 42B, and the separator 43 and the composition of the electrolytic solution are respectively similar to the structures of the cathode current collector 21A, the cathode active material layer 21B, the anode current collector 22A, the anode active material layer 22B, and the separator 23, and the composition of the electrolytic solution in the foregoing first battery.

The secondary battery is manufactured, for example, as follows.

First, for example, the cathode 41 in which the cathode active material layer 41B is provided on the both faces of the cathode current collector 41A is formed and the anode 42 in which the anode active material layer 42B is provided on the both faces of the anode current collector 42A is formed by respective procedures similar to the procedures of forming the cathode 21 and the anode 22 in the foregoing first battery. Subsequently, the cathode lead 45 is attached to the cathode 41, and the anode lead 46 is attached to the anode 42. Subsequently, the cathode 41 and the anode 42 are spirally wound with the separator 43 in between, and thereby the spirally wound electrode body 40 is formed. The end of the cathode lead 45 is welded to the safety valve mechanism 35, and the end of the anode lead 46 is welded to the battery can 31. After that, the spirally wound electrode body 40 is sandwiched between the pair of insulating plates 32 and 33, and contained in the battery can 31. Subsequently, the electrolytic solution is injected into the battery can 31 and impregnated in the separator 43. Finally, at the open end of the battery can 31, the battery cover 34, the safety valve mechanism 35, and the PTC device 36 are fixed by being caulked with the gasket 37. The secondary battery shown in FIG. 9 and FIG. 10 is thereby fabricated.

In the secondary battery, when charged, for example, lithium ions are extracted from the cathode 41 and inserted in the anode 42 through the electrolytic solution. Meanwhile, when discharged, for example, lithium ions are extracted from the anode 42, and inserted in the cathode 41 through the electrolytic solution.

According to the cylindrical secondary battery, the anode 42 has the structure similar to that of the foregoing anode. Thus, the cycle characteristics and the swollenness characteristics can be improved. Effects of the secondary battery other than the foregoing effects are similar to those of the first battery.

Third Battery

Figure 11:
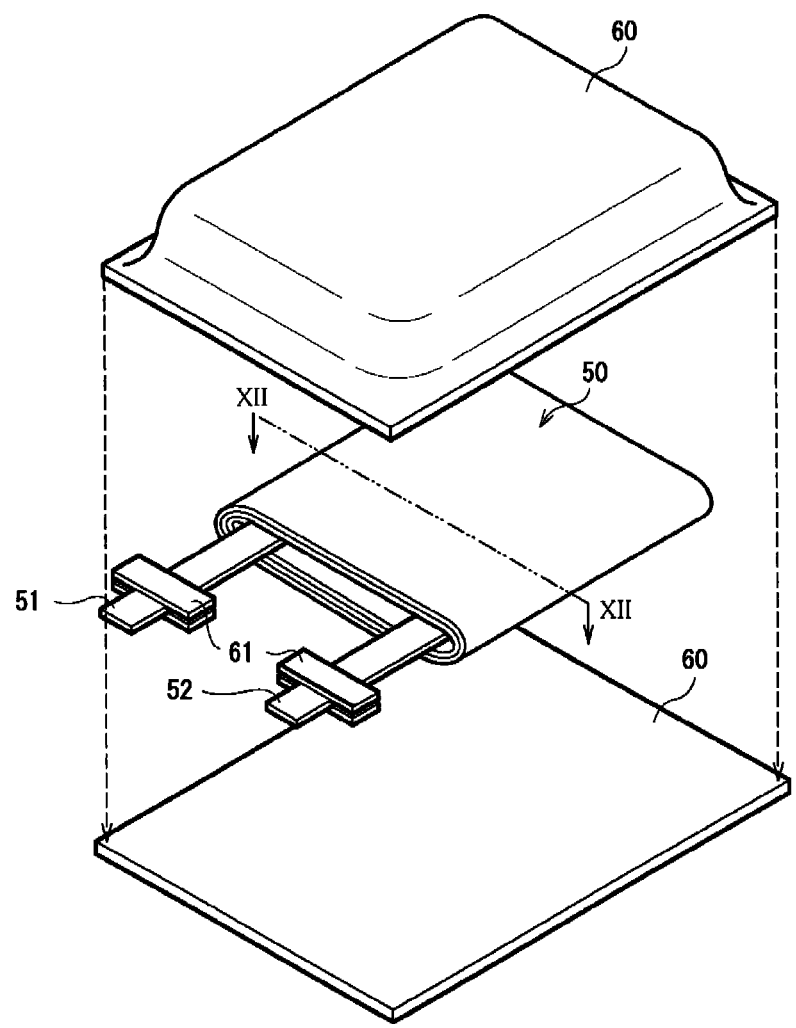
FIG. 11 is a cross section showing a structure of a third battery including the anode according to the embodiment of the invention.
Figure 12:
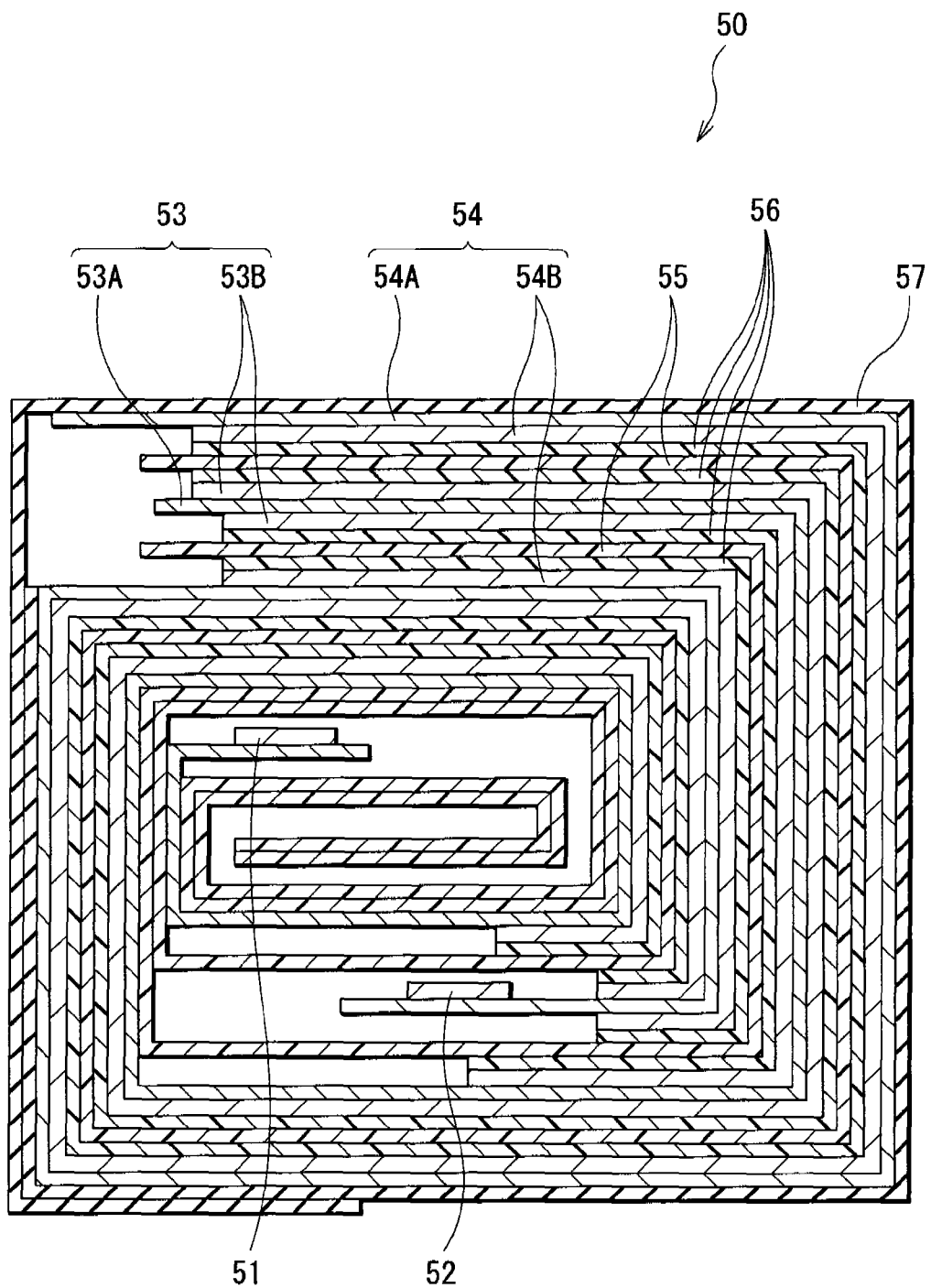
FIG. 12 is a cross section taken along line XII-XII of a spirally wound electrode body shown in FIG. 11.

FIG. 11 shows an exploded perspective structure of a third battery. FIG. 12 shows a cross section taken along line XII-XII shown in FIG. 11. In the battery, a spirally wound electrode body 50 on which a cathode lead 51 and an anode lead 52 are attached is contained in a film package member 60. The battery structure including the package member 60 is a so-called laminated film structure.

The cathode lead 51 and the anode lead 52 are respectively directed from inside to outside of the package member 60 in the same direction, for example. The cathode lead 51 is made of, for example, a metal material such as aluminum, and the anode lead 52 is made of, for example, a metal material such as copper, nickel, and stainless. The metal materials are in the shape of a thin plate or mesh.

The package member 60 is made of an aluminum laminated film in which, for example, a nylon film, an aluminum foil, and a polyethylene film are bonded together in this order. The package member 60 is arranged, for example, so that the polyethylene film and the spirally wound electrode body 50 are opposed to each other, and the respective outer edges of two pieces of rectangle aluminum laminated films are bonded to each other by fusion bonding or an adhesive.

An adhesive film 61 to protect from entering of outside air is inserted between the package member 60 and the cathode lead 51, the anode lead 52. The adhesive film 61 is made of a material having contact characteristics to the cathode lead 51 and the anode lead 52. Examples of such a material include, for example, a polyolefin resin such as polyethylene, polypropylene, modified polyethylene, and modified polypropylene.

The package member 60 may be made of a laminated film having other lamination structure, a polymer film such as polypropylene, or a metal film, instead of the foregoing aluminum laminated film.

In the spirally wound electrode body 50, a cathode 53 and the anode 54 are layered with a separator 55 and an electrolyte 56 in between and then spirally wound. The outermost periphery thereof is protected by a protective tape 57.

The cathode 53 has a structure in which, for example, a cathode active material layer 53B is provided on the both faces of a cathode current collector 53A having a pair of opposed faces. The anode 54 has a structure similar to that of the foregoing anode, for example, has a structure in which an anode active material layer 54B is provided on the both faces of a strip-shaped anode current collector 54A. The structures of the cathode current collector 53A, the cathode active material layer 53B, the anode current collector 54A, the anode active material layer 54B, and the separator 55 are respectively similar to those of the cathode current collector 21A, the cathode active material layer 21B, the anode current collector 22A, the anode active material layer 22B, and the separator 23 of the foregoing first battery.

The electrolyte 56 is a so-called gel electrolyte, containing an electrolytic solution and a polymer compound that holds the electrolytic solution. The gel electrolyte is preferable, since high ion conductivity (for example, 1 mS/cm or more at room temperature) can be obtained and liquid leakage of the battery is prevented. The electrolyte 56 is provided, for example, between the cathode 53 and the separator 55, and between the anode 54 and the separator 55.

As the polymer compound, for example, polyacrylonitrile, polyvinylidene fluoride, a copolymer of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethylmethacrylate, polyacrylic acid, polymethacrylic acid, styrene-butadiene rubber, nitrile-butadiene rubber, polystyrene, polycarbonate or the like can be cited. One of these polymer compounds may be used singly, or two or more thereof may be used by mixing. Specially, polyacrylonitrile, polyvinylidene fluoride, polyhexafluoropropylene, or polyethylene oxide is preferably used as the polymer compound, since thereby the electrochemical stability is obtained.

The composition of the electrolytic solution is similar to the composition of the electrolytic solution in the first battery. However, in this case, the solvent means a wide concept including not only the liquid solvent but also a solvent having ion conductivity capable of dissociating the electrolyte salt. Therefore, if the polymer compound having ion conductivity is used, the polymer compound is also included in the solvent.

Instead of the gel electrolyte 56 in which the electrolytic solution is held by the polymer compound, the electrolytic solution may be directly used. In this case, the electrolytic solution is impregnated in the separator 55.

The battery including the gel electrolyte 56 is manufactured, for example, as follows.

First, the cathode 53 in which the cathode active material layer 53B is provided on the both faces of the cathode current collector 53A is formed and the anode 54 in which the anode active material layer 54B is provided on the both faces of the anode current collector 54A is formed by respective procedures similar to the foregoing procedures of forming the cathode 21 and the anode 22 in the foregoing first battery. Subsequently, a precursor solution containing an electrolytic solution, a polymer compound, and a solvent is prepared. Then, the cathode 53 and the anode 54 are respectively coated with the precursor solution. After that, the solvent is volatilized to form the gel electrolyte 56. Subsequently, the cathode lead 51 is attached to the cathode current collector 53A, and the anode lead 52 is attached to the anode current collector 54A. Subsequently, the cathode 53 and the anode 54 formed with the electrolyte 56 are layered with the separator 55 in between to obtain a lamination. After that, the lamination is spirally wound in the longitudinal direction, the protective tape 57 is adhered to the outermost periphery thereof to form the spirally wound electrode body 50. Subsequently, for example, the spirally wound electrode body 50 is sandwiched between the package members 60, and outer edges of the package members 60 are contacted by thermal fusion bonding or the like to enclose the spirally wound electrode body 50. The adhesive film 61 is inserted between the cathode lead 51/the anode lead 52 and the package member 60. Thereby, the secondary battery shown in FIG. 11 and FIG. 12 is fabricated.

Otherwise, the foregoing battery may be manufactured as follows. First, the cathode lead 51 and the anode lead 52 are respectively attached on the cathode 53 and the anode 54. After that, the cathode 53 and the anode 54 are layered with the separator 55 in between and spirally wound. The protective tape 57 is adhered to the outermost periphery thereof, and a spirally wound body as a precursor of the spirally wound electrode body 50 is formed. Subsequently, the spirally wound body is sandwiched between the package members 60, the peripheral edges other than one side of the peripheral edges are contacted by thermal fusion-bonding or the like to obtain a pouched state, and the spirally wound body is contained in the pouched-like package member 60. Subsequently, a composition of matter for electrolyte containing the electrolytic solution, a monomer as a raw material for a polymer compound, a polymerization initiator, and if necessary other material such as a polymerization inhibitor is prepared, which is injected into the pouched-like package member 60. After that, the opening of the package member 60 is hermetically sealed by, for example, thermal fusion bonding or the like. Finally, the monomer is thermally polymerized to obtain a polymer compound. Thereby, the gel electrolyte 56 is formed. Consequently, the secondary battery shown in FIG. 11 and FIG. 12 is fabricated.

According to the laminated film secondary battery, the anode 54 has the structure similar to that of the foregoing anode. Thus, the cycle characteristics and the swollenness characteristics can be improved. Effects of the secondary battery other than the foregoing effects are similar to those of the first battery.

EXAMPLES

Specific examples of the invention will be described in detail.

Example 1-1

The laminated film secondary battery shown in FIG. 11 and FIG. 12 was fabricated by the following procedure. The secondary battery was fabricated as a lithium ion secondary battery in which the capacity of the anode 54 was expressed as the capacity component based on insertion and extraction of lithium.

First, the cathode 53 was formed. That is, lithium carbonate ($Li_2CO_3$) and cobalt carbonate ($CoCO_3$) were mixed at a molar ratio of 0.5:1. After that, the mixture was fired in the air at 900 deg C. for 5 hours. Thereby, lithium cobalt complex oxide ($LiCoO_2$) was obtained. Subsequently, 91 parts by weight of the lithium cobalt complex oxide as a cathode active material, 6 parts by weight of graphite as an electrical conductor, and 3 parts by weight of polyvinylidene fluoride as a binder were mixed to obtain a cathode mixture. After that, the cathode mixture was dispersed in N-methyl-2-pyrrolidone to obtain paste cathode mixture slurry. Finally, the both faces of the cathode current collector 53A made of a strip-shaped aluminum foil (being 12 μm thick) were uniformly coated with the cathode mixture slurry, which was dried. After that, the resultant was compression-molded by a roll pressing machine to form the cathode active material layer 53B. After that, the cathode lead 51 made of aluminum was welded to one end of the cathode current collector 53A.

Next, the anode 54 was formed. That is, the anode current collector 54A (thickness: 18 μm; ten point height roughness profile Rz: 3.5 μm) made of an electrolytic copper foil was prepared. After that, silicon as an anode active material was deposited on the both faces of the anode current collector 54A by electron beam evaporation method using a deflecting electron beam evaporation source while continuously introducing oxygen gas and if necessary introducing moisture vapor into a chamber, so that one side of the anode active material had the thickness of 6 μm. Thereby, the anode active material particle was formed into a single layer structure. Silicon with the purity of 99% was used as the evaporation source, the deposition rate was 10 nm/sec, and the oxygen content in the anode active material particle was 3 atomic %. Subsequently, a metal material was formed by depositing cobalt on the both faces of the anode current collector 54A by electrolytic plating method while supplying air to a plating bath, and thereby the anode active material layer 54B was formed. As a plating solution, cobalt plating solution made by Japan Pure Chemical Co., Ltd. was used, the current density was from 2 $A/dm^2$ to 5 $A/dm^2$, and the plating rate was 10 nm/sec. The oxygen content in the metal material was 5 atomic %, and the ratio (molar ratio) M2/M1 between the number of moles M1 per unit area of the anode active material particle and the number of moles M2 per unit area of the metal material was 1/50. The content of the metal material was measured by ICP (Inductively Coupled Plasma) emission spectrometry. For the formed anode 54, the cross section was exposed by FIB, and then local element analysis was performed by AES (Auger Electron Spectrometer). In the result, it was confirmed that the element of the anode current collector 54A and the element of the anode active material layer 54B were diffused into each other at the interface between the anode current collector 54A and the anode active material layer 54B, that is, alloying was confirmed. After that, the anode lead 52 made of nickel was welded to one end of the anode current collector 54A.

Next, the cathode 53, the three-layer polymer separator 55 (thickness: 23 μm) in which a porous polyethylene film is sandwiched between porous polypropylene films, the anode 54, and the foregoing polymer separator 55 were layered in this order. The resultant lamination was spirally wound in the longitudinal direction, the end section of the spirally wound body was fixed by the protective tape 57 made of an adhesive tape, and thereby a spirally wound body as a precursor of the spirally wound electrode body 50 was formed. Subsequently, the spirally wound body was sandwiched between the package members 60 made of a laminated film having three-layer structure (total thickness: 100 μm) in which nylon (being 30 μm thick), aluminum (being 40 μm thick), and non-stretch polypropylene (being 30 μm thick) were layered from the outside. After that, outer edges other than an edge of one side of the package members were thermally fusion-bonded to each other. Thereby, the spirally wound body was contained in the package members 60 in a pouched state. Subsequently, an electrolytic solution was injected through the opening of the package member 60, the electrolytic solution was impregnated in the separator 55, and thereby the spirally wound electrode body 50 was formed.

When the electrolytic solution was prepared, a mixed solvent of ethylene carbonate (EC) and diethyl carbonate (DEC) as a solvent was used, and lithium hexafluorophosphate ($LiPF_6$) was used as an electrolyte salt. The composition of the mixed solvent (EC:DEC) was 50:50 at a weight ratio. The concentration of the electrolyte salt was 1 mol/kg.

Finally, the opening of the package member 60 was thermally fusion bonded and sealed in the vacuum atmosphere. Thereby, the laminated film secondary battery was fabricated. For the secondary battery, the thickness of the cathode active material layer 53B was adjusted so that the charge and discharge capacity of the anode 54 was larger than the charge and discharge capacity of the cathode 53, and thereby lithium metal was not precipitated on the anode 54 during the charge and discharge.

Examples 1-2 to 1-15

A procedure was performed in the same manner as that of Example 1-1, except that the molar ratio M2/M1 was changed to 1/30 (Example 1-2), 1/20 (Example 1-3), 1/15 (Example 1-4), 1/10 (Example 1-5), 1/5 (Example 1-6), 1/2 (Example 1-7), 1/1 (Example 1-8), 2/1 (Example 1-9), 3/1 (Example 1-10), 4/1 (Example 1-11), 5/1 (Example 1-12), 6/1 (Example 1-13), 7/1 (Example 1-14), and 8/1 (Example 1-15), instead of 1/50.

Comparative Example 1

A procedure was performed in the same manner as that of Example 1-1, except that the metal material was not formed.

The cycle characteristics and the swollenness characteristics of the secondary batteries of Examples 1-1 to 1-15 and Comparative example 1 were examined, and the results shown in Table 1 were obtained. In this case, to examine the correlation between the amount of the metal material and the cycle characteristics, the atomicity ratio occupied by the metal material on the surface of the anode 54 was also examined.

In examining the cycle characteristics, a cycle test was performed by the following procedure, and thereby the discharge capacity retention ratio was obtained. First, to stabilize the battery state, after charge and discharge were performed 1 cycle in the atmosphere of 23 deg C., charge and discharge were performed again. Thereby, the discharge capacity at the second cycle was measured. Subsequently, the secondary battery was charged and discharged 99 cycles in the same atmosphere, and thereby the discharge capacity at the 101st cycle was measured. Finally, the discharge capacity retention ratio (%)=(discharge capacity at the 101st cycle/discharge capacity at the second cycle)×100 was calculated. The charge condition was as follows. That is, after charge was performed at the constant current density of 3 mA/cm² until the battery voltage reached 4.2 V, charge was continuously performed at the constant voltage of 4.2 V until the battery density reached 0.3 mA/cm². The discharge conditions were as follows. That is, discharge was performed at the constant current density of 3 mA/cm² until the battery voltage reached 2.5 V.

In examining the swollenness characteristics, the swollenness ratio was obtained by charging the secondary battery by the following procedure. First, to stabilize the battery state, after charge and discharge were performed 1 cycle in the atmosphere of 23 deg C., the thickness before charge at the second cycle was measured. Subsequently, charge was performed again in the same atmosphere. After that, the thickness after charge at the second cycle was measured. Finally, the swollenness ratio (%)=[(thickness after charge−thickness before charge)/thickness before charge]×100 was calculated. The charge condition was similar to that in the case that the cycle characteristics were examined.

To examine the atomicity ratio occupied by the metal material on the surface of the anode 54, element analysis was made for the surface of the anode 54 with the use of EDX, and thereby the occupancy (atomic %) of the metal material was measured.

The procedure and the conditions for examining the cycle characteristics, the swollenness characteristics and the like were similarly applied for evaluating the same characteristics of the following examples and comparative examples.

As shown in Tables 1, in Examples 1-1 to 1-15 in which the metal material was formed by electrolytic plating method, irrespective of the molar ration M2/M1, the discharge capacity retention ratio was higher and the swollenness ratio was smaller than those of Comparative example 1 in which the metal material was not formed. The results mean that the binding characteristics of the anode active material layer 54B were improved since the metal material was formed after the anode active material particle was formed. Accordingly, it was confirmed that in the secondary battery of the invention, the cycle characteristics and the swollenness characteristics were improved if the metal material having a metal element not being alloyed with the electrode reactant was contained together in the case that the anode active material layer 54B contained the plurality of anode active material particles having silicon.

In particular, in Examples 1-1 to 1-15, there was a tendency that as the molar ratio M2/M1 was increased, the occupancy of the metal material was increased, the discharge capacity retention ratio was increased and then decreased, and the swollenness ratio was lowered. In this case, if the molar ratio M2/M1 was smaller than 1/15 and the occupancy of the metal material was smaller than 2 atomic % (strictly, smaller than 2.3 atomic %), the discharge capacity retention ratio was largely decreased, and the swollenness ratio was largely increased. Further, if the molar ratio M2/M1 was larger than 7/1 and the occupancy of the metal material was larger than 82 atomic %, the discharge capacity retention ratio was largely decreased, though the swollenness ratio was not changed. Accordingly, it was confirmed that to further improve the cycle characteristics and the swollenness characteristics, the molar ratio M2/M1 was in the range from 1/15 to 7/1, and the atomicity ratio occupied by the metal material on the surface of the anode 54 was in the range from 2 atomic % to 82 atomic %, and more preferably in the range from 2.3 atomic % to 82 atomic %.

TABLE 1

Anode active material particle: silicon (electron beam evaporation method)
Ten point height of roughness profile Rz = 3.5 μm
Oxygen content in the anode active material particle = 3 atomic %
Oxygen content in the metal material = 5 atomic %

|  | Anode active material particle Number of layers (layer) | Metal material Type | Metal material Forming method | Molar ratio M2/M1 | Occupancy of metal material (atomic %) | Discharge capacity retention ratio (%) | Swollenness ratio (%) |
|---|---|---|---|---|---|---|---|
| Example 1-1 | 1 | Co | Electrolytic plating method | 1/50 | 0.5 | 55 | 19.6 |
| Example 1-2 |  |  |  | 1/30 | 1.1 | 60 | 17.5 |
| Example 1-3 |  |  |  | 1/20 | 1.8 | 65 | 14.6 |
| Example 1-4 |  |  |  | 1/15 | 2.3 | 80 | 9.6 |
| Example 1-5 |  |  |  | 1/10 | 4.3 | 83 | 6 |
| Example 1-6 |  |  |  | 1/5 | 6.8 | 84 | 4.2 |
| Example 1-7 |  |  |  | 1/2 | 9.1 | 85 | 3.5 |
| Example 1-8 |  |  |  | 1/1 | 12.1 | 85 | 3.3 |
| Example 1-9 |  |  |  | 2/1 | 22.4 | 84 | 3.2 |
| Example 1-10 |  |  |  | 3/1 | 32.6 | 83 | 3.2 |
| Example 1-11 |  |  |  | 4/1 | 37.5 | 83 | 3.1 |
| Example 1-12 |  |  |  | 5/1 | 43.1 | 82 | 3.1 |
| Example 1-13 |  |  |  | 6/1 | 62.5 | 81 | 3.1 |
| Example 1-14 |  |  |  | 7/1 | 82 | 80 | 3 |
| Example 1-15 |  |  |  | 8/1 | 95.5 | 74 | 3 |
| Comparative example 1 | 1 | — | — | — | — | 45 | 24.6 |

Examples 2-1 to 2-8

A procedure was performed in the same manner as that of Examples 1-4 to 1-11, except that the anode active material particle was formed into six-layer structure by depositing the anode active material 6 times to obtain the total thickness of 6 μm for one side. The deposition rate was 100 nm/sec.

Examples 2-9 to 2-12

A procedure was performed in the same manner as that of Example 2-4, except that an iron plating solution (Example 2-9), a nickel plating solution (Example 2-10), a zinc plating solution (Example 2-11), or a copper plating solution (Example 2-12) was used instead of the cobalt plating solution as a material for forming the metal material. The current density was from 2 A/dm² to 5 A/dm² in case of using the iron plating solution, was from 2 A/dm² to 10 A/dm² in case of using the nickel plating solution, was from 1 A/dm² to 3 A/dm² in case of using the zinc plating solution, and was from 2 A/dm² to 8 A/dm² in case of using the copper plating solution. The foregoing plating solutions are all made by Japan Pure Chemical Co., Ltd.

Examples 2-13 to 2-16

A procedure was performed in the same manner as that of Examples 2-9 to 20-12, except that the molar ratio M2/M1 was 1/1 instead of 1/2.

Comparative Example 2

A procedure was performed in the same manner as that of Examples 2-1 to 2-8, except that the metal material was not formed.

The cycle characteristics, the swollenness characteristics and the like of the secondary batteries of Examples 2-1 to 2-16 and Comparative example 2 were examined, and the results shown in Table 2 were obtained.

TABLE 2

Anode active material particle: silicon (electron beam evaporation method)
Ten point height of roughness profile Rz = 3.5 μm
Oxygen content in the anode active material particle = 3 atomic %
Oxygen content in the metal material = 5 atomic %

| | Anode active material particle Number of layers (layer) | Metal material Type | Metal material Forming method | Molar ratio M2/M1 | Occupancy of metal material (atomic %) | Discharge capacity retention ratio (%) | Swollenness ratio (%) |
|---|---|---|---|---|---|---|---|
| Example 2-1  | 6 | Co | Electrolytic plating method | 1/15 | 1.5  | 83   | 8.1  |
| Example 2-2  |   |    |                             | 1/10 | 4.1  | 86   | 5.2  |
| Example 2-3  |   |    |                             | 1/5  | 6.3  | 88   | 3.3  |
| Example 2-4  |   |    |                             | 1/2  | 8.3  | 90   | 3    |
| Example 2-5  |   |    |                             | 1/1  | 10.3 | 90   | 3.1  |
| Example 2-6  |   |    |                             | 2/1  | 18   | 89   | 2.7  |
| Example 2-7  |   |    |                             | 3/1  | 26   | 88   | 2.7  |
| Example 2-8  |   |    |                             | 4/1  | 33   | 88   | 2.6  |
| Example 2-9  | 6 | Fe | Electrolytic plating method | 1/2  | 11.2 | 89   | 3.4  |
| Example 2-10 |   | Ni |                             |      | 9.5  | 88   | 3.4  |
| Example 2-11 |   | Zn |                             |      | 8.5  | 87   | 3.5  |
| Example 2-12 |   | Cu |                             |      | 8.9  | 85   | 3.6  |
| Example 2-13 | 6 | Fe | Electrolytic plating method | 1/1  | 10.4 | 90   | 3.3  |
| Example 2-14 |   | Ni |                             |      | 10.8 | 89   | 3.4  |
| Example 2-15 |   | Zn |                             |      | 9.9  | 88   | 3.6  |
| Example 2-16 |   | Cu |                             |      | 9.8  | 87.5 | 3.7  |
| Comparative example 2 | 6 | — | — | — | — | 42 | 21.3 |

As shown in Table 2, in Examples 2-1 to 2-8 in which the anode active material particle was formed into six-layer structure, the discharge capacity retention ratio was higher and the swollenness ratio was smaller than those of Comparative example 2 as in Examples 1-4 to 1-11 in which the anode active material particle was formed into a single layer structure. Further, in Examples 2-9 to 2-16 in which the material for forming the metal material was different, the discharge capacity retention ratio was higher and the swollenness ratio was smaller than those of Comparative example 2 as in Examples 2-4 and 2-5. Accordingly, it was confirmed that in the secondary battery of the invention, if the number of layers of the anode active material particle was changed, the cycle characteristics were improved as well. In addition, it was confirmed that if the material for forming the metal material was changed, as long as the material was one selected from the group consisting of cobalt, iron, nickel, zinc, and copper, the cycle characteristics and the swollenness characteristics were improved as well.

In particular, in Examples 2-4 and 2-9 to 2-12 in which the molar ratio M2/M1 was 1/2, there was a tendency that the discharge capacity retention ratio was increased in the order of copper, zinc, nickel, iron, and cobalt as the material for forming the metal material. Such a tendency was almost similarly observed in Examples 2-5 and 2-13 to 2-16 in which the molar ratio M2/M1 was 1/1. Accordingly, it was confirmed that to further improve the cycle characteristics, cobalt was preferably used as the material for forming the metal material.

Examples 3-1 to 3-4

A procedure was performed in the same manner as that of Examples 1-7 to 1-10, except that the metal material was formed by electroless plating method instead of electrolytic plating method. An electroless cobalt plating solution made by Japan Pure Chemical Co., Ltd. was used as the plating solution, and the plating time was 60 minutes.

The cycle characteristics, the swollenness characteristics and the like of the secondary batteries of Examples 3-1 to 3-4 were examined, and the results shown in Table 3 were obtained. Table 3 also shows the result of Comparative example 2.

As shown in Table 3, in Examples 3-1 to 3-4 in which the metal material was formed by electrodes plating method, the discharge capacity retention ratio was higher and the swollenness ratio was smaller than those of Comparative example 2 as in Examples 1-7 to 1-10 in which the metal material was formed by electrolytic plating method. Accordingly, it was confirmed that in the secondary battery of the invention, if electroless plating method was used as the method of forming the metal material, the cycle characteristics and the swollenness characteristics were improved as well.

Examples 4-1 to 4-5

A procedure was performed in the same manner as that of Example 3-2, except that the metal material was formed by electroless plating method to form the anode 54, and then the anode 54 was annealed in the reduced pressure atmosphere. The pressure was $10^{-2}$ Pa or less, and annealing time was 3 hours. The annealing temperature was 100 deg C. (Example 4-1), 150 deg C. (Example 4-2), 200 deg C. (Example 4-3), 250 deg C. (Example 4-4), and 300 deg C. (Example 4-5).

The cycle characteristics, the swollenness characteristics and the like of the secondary batteries of Examples 4-1 to 4-5 were examined, and the results shown in Table 4 were obtained. Table 4 also shows the results of Example 3-2 and Comparative example 2.

TABLE 3

Anode active material particle: silicon (electron beam evaporation method)
Ten point height of roughness profile Rz = 3.5 μm
Oxygen content in the anode active material particle = 3 atomic %
Oxygen content in the metal material = 5 atomic %

|  | Anode active material particle Number of layers (layer) | Metal material Type | Metal material Forming method | Molar ratio M2/M1 | Occupancy of metal material (atomic %) | Discharge capacity retention ratio (%) | Swollenness ratio (%) |
| --- | --- | --- | --- | --- | --- | --- | --- |
| Example 3-1 | 6 | Co | Electroless plating method | 1/2 | 7.8 | 72 | 9.5 |
| Example 3-2 |  |  |  | 1/1 | 9.5 | 73 | 9.2 |
| Example 3-3 |  |  |  | 2/1 | 16 | 72 | 9.6 |
| Example 3-4 |  |  |  | 3/1 | 22 | 72 | 9.9 |
| Comparative example 2 | 6 | — | — | — | — | 42 | 21.3 |

TABLE 4

Anode active material particle: silicon (electron beam evaporation method)
Ten point height of roughness profile Rz = 3.5 μm
Oxygen content in the anode active material particle = 3 atomic %
Oxygen content in the metal material = 5 atomic %

| | Anode active material particle Number of layers (layer) | Metal material Type | Metal material Forming method | Metal material Annealing temperature (deg C.) | Molar ratio M2/M1 | Occupancy of metal material (atomic %) | Discharge capacity retention ratio (%) | Swollenness ratio (%) |
|---|---|---|---|---|---|---|---|---|
| Example 3-2 | 6 | Co | Electroless plating method | — | 1/1 | 9.5 | 73 | 9.2 |
| Example 4-1 | | | | 100 | | | 81 | 8.5 |
| Example 4-2 | | | | 150 | | | 82 | 7.6 |
| Example 4-3 | | | | 200 | | | 84 | 6.5 |
| Example 4-4 | | | | 250 | | | 86 | 5.1 |
| Example 4-5 | | | | 300 | | | 89 | 4.6 |
| Comparative example 2 | 6 | — | — | — | — | — | 42 | 21.3 |

As shown in Table 4, in Examples 4-1 to 4-5 in which the anode 54 was annealed, the discharge capacity retention ratio was higher and the swollenness ratio was smaller than those of Comparative example 2 as in Example 3-2. Accordingly, it was confirmed that in the secondary battery of the invention, if the anode 54 was annealed, the cycle characteristics and the swollenness characteristics were improved as well.

In particular, in Examples 4-1 to 4-5, the discharge capacity retention ratio was higher and the swollenness ratio was smaller than those of Example 3-2. Further, in this case, there was a tendency that as the annealing temperature became higher, the discharge capacity retention ratio became higher and the swollenness ratio became smaller. The results showed that the crystallinity of the metal material was promoted by annealing the anode 54. Accordingly, it was confirmed that the cycle characteristics and the swollenness ratio were further improved by annealing the anode 54, and the both characteristics were improved by increasing the annealing temperature. No examples in which the anode 54 was annealed in the case that electrolytic plating method was used as a method of forming the metal material have not been disclosed. However, if the anode 54 was annealed and the cycle characteristics and the swollenness characteristics were similarly examined for the case using electrolytic plating method, it was also confirmed that the both characteristics were improved as well.

Examples 5-1 to 5-4

A procedure was performed in the same manner as that of Examples 1-7 to 1-10, except that the metal material was formed by electron beam evaporation method similar to the method of forming the anode active material particle instead of electrolytic plating method. Cobalt with the purity of 99.9% was used as the evaporation source, the deposition rate was 5 nm/sec. In particular, in forming the metal material, a step in which after the anode active material particle was formed so that the thickness per layer became 830 nm and then cobalt was evaporated in the same chamber was repeated, and the uppermost layer was made of the anode active material particle.

The cycle characteristics, the swollenness characteristics and the like of the secondary batteries of Examples 5-1 to 5-4 were examined, the results shown in Table 5 were obtained. Table 5 also shows the result of Comparative example 2 together.

TABLE 5

Anode active material particle: silicon (electron beam evaporation method)
Ten point height of roughness profile Rz = 3.5 μm
Oxygen content in the anode active material particle = 3 atomic %
Oxygen content in the metal material = 5 atomic %

| | Anode active material particle Number of layers (layer) | Metal material Type | Metal material Forming method | Molar ratio M2/M1 | Occupancy of metal material (atomic %) | Discharge capacity retention ratio (%) | Swollenness ratio (%) |
|---|---|---|---|---|---|---|---|
| Example 5-1 | 6 | Co | Electron beam evaporation method | 1/2 | 8.8 | 82 | 11.5 |
| Example 5-2 | | | | 1/1 | 10.5 | 83 | 10.9 |
| Example 5-3 | | | | 2/1 | 19.8 | 83 | 11.2 |
| Example 5-4 | | | | 3/1 | 28.6 | 81 | 11.6 |
| Comparative example 2 | 6 | — | — | — | — | 42 | 21.3 |

As shown in Table 5, in Examples 5-1 to 5-4 in which the metal material was formed by electron beam evaporation method, the discharge capacity retention ratio was higher and the swollenness ratio was smaller than those of Comparative example 2 as in Examples 1-7 to 1-10 in which the metal material was formed by electrolytic plating method. Accordingly, it was confirmed that in the secondary battery of the invention, if electron beam evaporation method was used as the method of forming the metal material, the cycle characteristics and the swollenness characteristics were improved as well.

Example 6-1

A procedure was performed in the same manner as that of Example 3-1, except that after the metal material was formed by electroless plating method to form the anode 54, the anode 54 was annealed at 300 deg C. in the reduced pressure atmosphere. The pressure and the annealing time were similar to those of Examples 4-1 to 4-5.

Example 6-2

A procedure was performed in the same manner as that of Example 2-4, except that the metal material was formed by RF magnetron sputtering method instead of electrolytic plating method. Cobalt with the purity of 99.9% was used as the target, and the deposition rate was 3 nm/sec.

Example 6-3

A procedure was performed in the same manner as that of Example 2-4, except that the metal material was formed by CVD method instead of electrolytic plating method. Silane ($SiH_4$) and argon (Ar) were respectively used as the raw material and the excitation gas. The deposition rate and the substrate temperature were respectively 1.5 nm/sec and 200 deg C.

The cycle characteristics, the swollenness characteristics and the like of the secondary batteries of Examples 6-1 to 6-3 were examined, the results shown in Table 6 were obtained. Table 6 also shows the results of Examples 2-4, 3-1, 5-1 and Comparative example 2.

TABLE 6

Anode active material particle: silicon (electron beam evaporation method)
Ten point height of roughness profile Rz = 3.5 μm
Oxygen content in the anode active material particle = 3 atomic %
Oxygen content in the metal material = 5 atomic %

| | Anode active material particle Number of layers (layer) | Metal material Type | Metal material Forming method | Molar ratio M2/M1 | Occupancy of metal material (atomic %) | Discharge capacity retention ratio (%) | Swollenness ratio (%) |
|---|---|---|---|---|---|---|---|
| Example 2-4 | 6 | Co | Electrolytic plating method | 1/2 | 8.3 | 90 | 3 |
| Example 3-1 | | | Electroless plating method (not annealed) | | 7.8 | 72 | 9.5 |
| Example 6-1 | | | Electroless plating method (annealed) | | 7.8 | 87 | 4.8 |
| Example 5-1 | | | Electron beam evaporation method | | 8.8 | 82 | 11.5 |
| Example 6-2 | | | Sputtering method | | 8.1 | 89 | 10.6 |
| Example 6-3 | | | CVD method | | 8.6 | 88 | 10.9 |
| Comparative Example 2 | 6 | — | — | — | — | 42 | 21.3 |

As shown in Table 6, in Example 6-1 in which the anode 54 was annealed, the discharge capacity retention ratio was higher and the swollenness ratio was smaller than those of Comparative example 2 as in Example 3-1. In this case, in particular, the discharge capacity retention ratio was higher and the swollenness ratio was smaller than those of Example 3-1 in which the anode 54 was not annealed. Further, in Examples 6-2 and in 6-3 in which the metal material was formed by sputtering method or CVD method, the discharge capacity retention ratio was higher and the swollenness ratio was smaller than those of Comparative example 2 as in Examples 2-4, 3-1, 5-1, and 6-1 in which the metal material was formed by electrolytic plating method and the like. Accordingly, it was confirmed that in the secondary battery of the invention, if the sputtering method or CVD method was used as a method of forming the metal material, the cycle characteristics and the swollenness ratio were improved as well. In addition, it was confirmed that if the anode 54 was annealed, higher effects were obtained.

In particular, in Examples 2-4, 3-1, 5-1, and 6-1 to 6-3, there was a tendency that the swollenness ratio in the case of using liquid-phase deposition method (electrolytic plating method or electroless plating method) as a method of forming the metal material was smaller than that in the case using vapor-phase deposition method (electron beam vapor evaporation method, sputtering method, or CVD method). In this case, further, the swollenness ratio in the case of using electrolytic plating method was smaller than that in the case of using electroless plating method. In the case where electroless plating method was used, as described above, the swollenness ratio in the case of using annealing was smaller than that in the case of not using annealing. Further, in Examples 2-4, 3-1, 5-1, and 6-1 to 6-3, there was a tendency that the discharge capacity retention ratio in the case of using liquid-phase deposition method (electrolytic plating method) was higher than that in the case of using the foregoing vapor-phase deposition methods. In the case where liquid-phase deposition method (electroless plating method) was used, in the case of not using annealing, the discharge capacity retention ratio was lower than that in the case of using vapor-phase deposition method; while in the case of using annealing, the discharge capacity retention ratio almost equal to that in the case of using vapor-phase deposition method was obtained. These results show the following. That is, if the metal material was formed by using vapor-phase deposition method, since the metal material was amorphous, advantages due to improvement of the binding characteristics of the anode active material layer 54B were obtained, while advantages due to improvement of the crystallinity of the metal material were not obtained. Meanwhile, if the metal material was formed by liquid-phase deposition method, since the metal material had the crystallinity, the advantages due to both improvement of the binding characteristics and improvement of the crystallinity of the metal material described above were obtained. Accordingly, it was confirmed that if liquid-phase deposition method was used as a method of forming the metal material, the cycle characteristics and the swollenness characteristics were further improved. In addition, it was also confirmed that to improve the both characteristics, electrolytic plating method was more preferably used than electroless plating method.

Examples 7-1 to 7-6

A procedure was performed in the same manner as that of Examples 4-1 to 4-5, except that the annealing temperature was changed to change the half bandwidth 2θ of the peak originated in (111) crystal plane of the metal material obtained by X-ray diffraction. The annealing temperature was 70 deg C. (Example 7-1), 80 deg C. (Example 7-2), 90 deg C. (Example 7-3), 125 deg C. (Example 7-4), 175 deg C. (Example 7-5), and 225 deg C. (Example 7-6).

Example 7-7

A procedure was performed in the same manner as those of Example 2-5, except that, to change the half bandwidth 2θ, after the metal material was formed by electrolytic plating method to form the anode 54, the anode 54 was annealed. The annealing temperature was 200 deg C., and the other conditions were similar to those of Examples 4-1 to 4-5.

Figure 13:
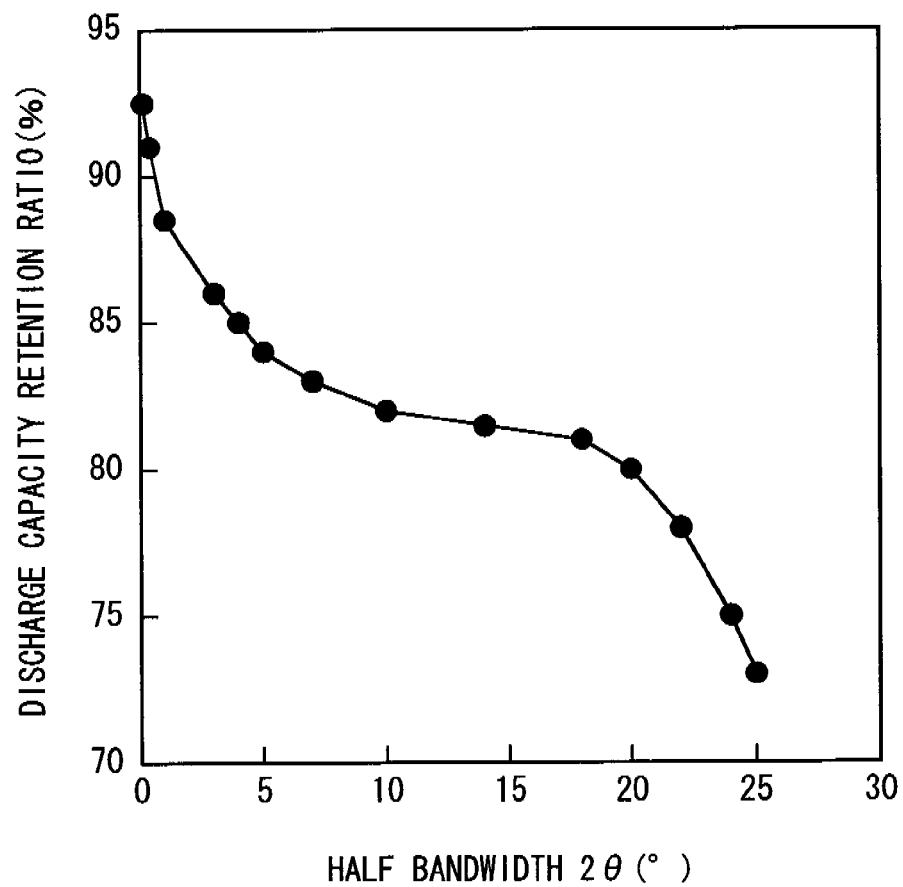
FIG. 13 is a diagram showing an interrelation between a half bandwidth and a discharge capacity retention ratio.

The cycle characteristics were examined for the secondary batteries of Examples 7-1 to 7-7, and the results shown in Table 7 and FIG. 13 were obtained. Table 7 also shows the results of Examples 2-5, 3-2, and 4-1 to 4-5.

TABLE 7

Anode active material particle: silicon (electron beam evaporation method)
Ten point height of roughness profile Rz = 3.5 μm
Oxygen content in the anode active material particle = 3 atomic %
Oxygen content in the metal material = 5 atomic %

|  | Anode active material particle | Metal material | | | | | Discharge capacity |
| --- | --- | --- | --- | --- | --- | --- | --- |
|  | Number of layers (layer) | Type | Forming method | Annealing temperature (deg C.) | Half bandwidth 2θ (deg) | Molar ratio M2/M1 | retention ratio (%) |
| Example 3-2 | 6 | Co | Electroless plating method | — | 25 | 1/1 | 73 |
| Example 7-1 |  |  |  | 70 | 24 |  | 75 |
| Example 7-2 |  |  |  | 80 | 22 |  | 78 |
| Example 7-3 |  |  |  | 90 | 20 |  | 80 |
| Example 4-1 |  |  |  | 100 | 18 |  | 81 |
| Example 7-4 |  |  |  | 125 | 14 |  | 82 |
| Example 4-2 |  |  |  | 150 | 10 |  | 82 |
| Example 7-5 |  |  |  | 175 | 7 |  | 83 |
| Example 4-3 |  |  |  | 200 | 5 |  | 84 |
| Example 7-6 |  |  |  | 225 | 4 |  | 85 |
| Example 4-4 |  |  |  | 250 | 3 |  | 86 |
| Example 4-5 |  |  |  | 300 | 1 |  | 89 |
| Example 2-5 |  |  |  | — | 0.4 |  | 90 |
| Example 7-7 |  |  | Electrolytic plating method | 200 | 0.1 |  | 93 |

As shown in Table 7 and FIG. 13, in Examples 2-5, 3-2, 4-1 to 4-5, and 7-1 to 7-7 in which liquid-phase deposition method (electroless plating method or electrolytic method) was used and the anode 54 was annealed if necessary, the metal material had the crystallinity, and the half bandwidth 2θ was changed in the range from 0.1 to 25. In this case, there was a tendency that as the half bandwidth 2θ became smaller, the discharge capacity retention ratio was increased, became almost constant, and then was increased again. If the half bandwidth 2θ became 20 degrees or less, a high discharge capacity retention ratio of 80% or more was obtained. Accordingly, it was confirmed that in the secondary battery of the invention, in the case that the metal material had the crystallinity, if the half bandwidth 2θ of the peak originated in (111) crystal plane of the metal material obtained by X-ray diffraction was 20 degrees or less, the cycle characteristics were further improved.

As a representative of the foregoing examples and comparative examples, a cross section of the anode 54 in the secondary batteries of Example 2-4 and Comparative example 2 was observed with the use of an SEM, the following results shown in FIG. 14A to FIG. 16B were obtained.

Figure 14A:
FIGS. 14A and 14B are SEM photographs showing a cross sectional structure of an anode (Comparative example 2 and Example 2-4) before a cycle test.
Figure 14B:
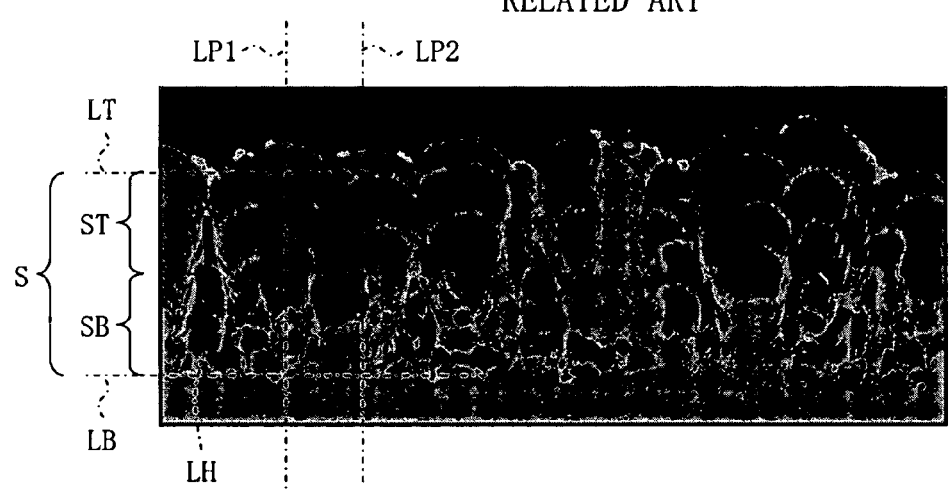

FIGS. 14A and 14B are SEM photographs showing a cross sectional structure of the anode 54 before a cycle test. FIG. 14A shows the observation result of Comparative example 2, and FIG. 14B shows the observation result of Example 2-4. FIG. 14B shows the lower region SB and the like shown in FIG. 6. As shown in FIGS. 14A and 14B, in both Comparative example 2 and Example 2-4, in the anode active material layer 54B formed on the surface of the roughened anode current collector 54A, it was observed that the anode active material particle was formed into six-layer structure on the surface thereof. However, in Comparative example 2, as shown in FIG. 14A, a gap was generated between adjacent anode active material particles and in the anode active material particle, and thus the anode active material layer 54B was not sufficiently bound. Meanwhile, in Example 2-4, as shown in FIG. 14B, the metal material filled in the foregoing gap, and the anode active material layer 54B was sufficiently bound through the metal material. In particular, in Example 2-4, part of the exposed face of the anode active material particle was covered with the metal material. Accordingly, it was confirmed that in the secondary battery of the invention, the binding characteristics of the anode active material layer 54B were improved by the metal material.

Figure 15A:
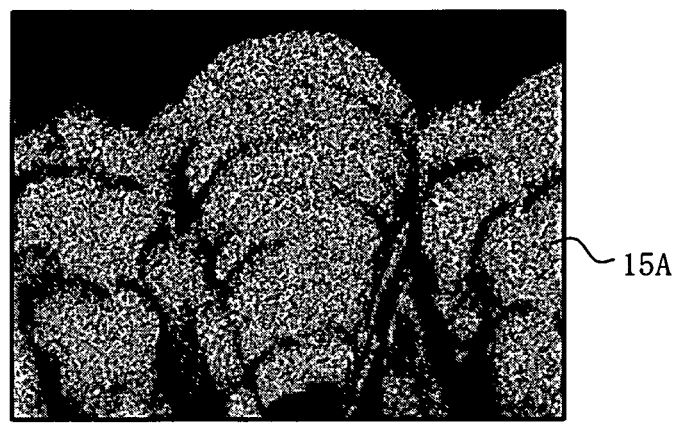
FIGS. 15A and 15B are EDX element distribution analysis results of a cross section of the anode (Example 2-4) shown in FIG. 14B.
Figure 15B:
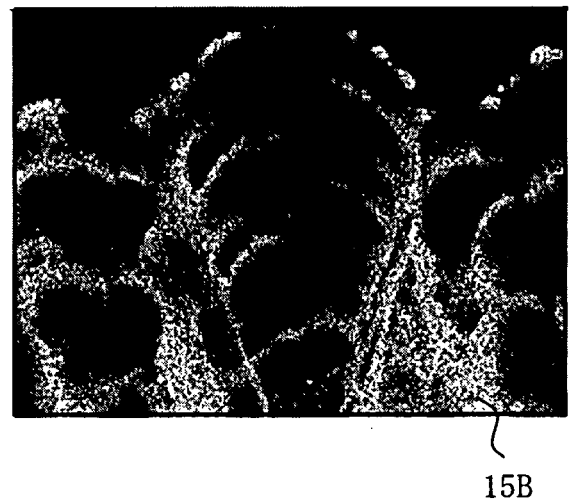

FIGS. 15A and 15B are results of element distribution analysis (so-called mapping of element distribution) with the use of EDX for the cross section of the anode 54 in Example 2-4 shown in FIG. 14B. In FIG. 15A, the light section indicated by 15A represents the silicon distribution range. In FIG. 15B, the light section indicated by 15B represents the cobalt distribution range. As shown in FIGS. 15A and 15B, the range in which silicon as the anode active material particle does not exist (the dark section surrounded by the section indicated by 15A in FIG. 15A) corresponds with the range in which cobalt as the metal material exists (the light section indicated by 15B in FIG. 15B). The range thereof is a gap between adjacent anode active material particles and a gap in the anode active material particle. In particular, in Example 2-4, the metal material was also dotted on the exposed face of the anode active material particle. Accordingly, it was confirmed that in the secondary battery of the invention, the metal material intruded into a gap between adjacent anode active material particles and a gap in the anode active material particle, and part of the exposed face of the anode active material particle was covered with the metal material.

Figure 16A:
FIGS. 16A and 16B are SEM photographs showing a cross sectional structure of the anode (Comparative example 2 and Example 2-4) after the cycle test.
Figure 16B:
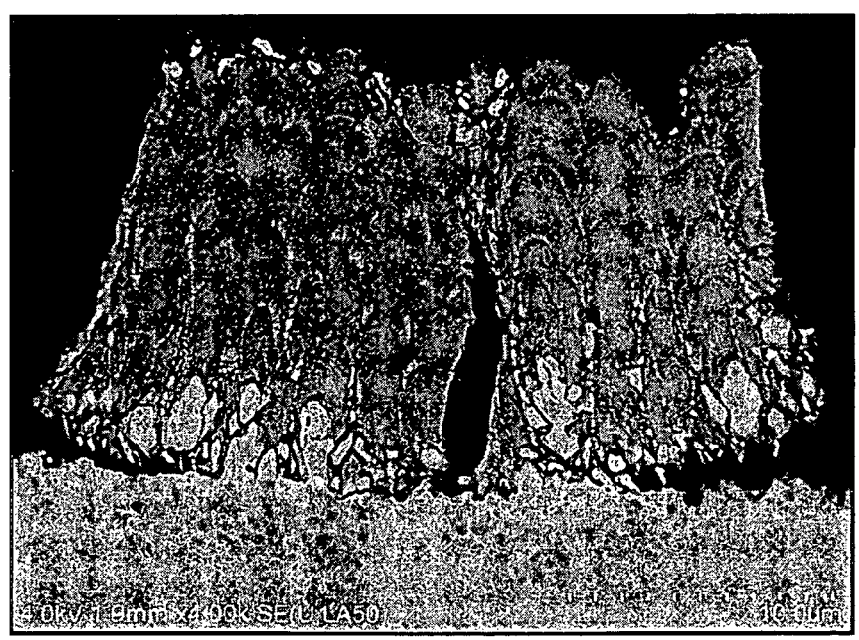

FIGS. 16A and 16B are SEM photographs showing a cross sectional structure of the anode 54 after the cycle test. FIG. 16A shows the observation result of Comparative example 2, and FIG. 16B shows the observation result of Example 2-4. As shown in FIGS. 16A and 16B, in both Comparative example 2 and Example 2-4, it was observed that the anode active material layer 54B was expanded and shrunk to be split through the plurality of charge and discharge steps. However, in Comparative example 2, as shown in FIG. 16A, the anode active material layer 54B was split at multiple locations and thereby was pulverized, and accordingly the anode active material layer 54B was easily fallen in part. Meanwhile, in Example 2-4, as shown in FIG. 16B, the anode active material layer 54B was hardly split, and thus the anode active material layer 54B was hardly fallen. Accordingly, it was confirmed that in the secondary battery of the invention, the binding characteristics of the anode active material layer 54B were improved by the metal, and therefore the anode active material layer 54B was hardly pulverized and fallen.

Examples 8-1 to 8-6

A procedure was performed in the same manner as that of Example 2-4, except that the oxygen content in the anode active material particle was 2 atomic % (Example 8-1), 10 atomic % (Example 8-2), 20 atomic % (Example 8-3), 30 atomic % (Example 8-4), 40 atomic % (Example 8-5), and 45 atomic % (Example 8-6) instead of 3 atomic %.

The cycle characteristics, the swollenness characteristics and the like of the secondary batteries of Examples 8-1 to 8-6 were examined, and the results shown in Table 8 were obtained. Table 8 also shows the results of Example 2-4 and Comparative example 2.

TABLE 8

Anode active material particle: silicon (electron beam evaporation method)
Ten point height of roughness profile Rz = 3.5 μm
Oxygen content in the metal element = 5 atomic %

| | Anode active material particle | | Metal material | | Molar ratio M2/M1 | Occupancy of metal material (atomic %) | Discharge capacity retention ratio (%) | Swollenness ratio (%) |
|---|---|---|---|---|---|---|---|---|
| | Number of layers (layer) | Oxygen content (atomic %) | Type | Forming method | | | | |
| Example 8-1 | 6 | 2 | Co | Electrolytic plating method | 1/2 | 8 | 82 | 4.3 |
| Example 2-4 | | 3 | | | | 8.3 | 90 | 3 |
| Example 8-2 | | 10 | | | | 8.5 | 92 | 2.9 |
| Example 8-3 | | 20 | | | | 8.4 | 93 | 2.7 |
| Example 8-4 | | 30 | | | | 8.2 | 92 | 2.6 |
| Example 8-5 | | 40 | | | | 8.3 | 91 | 2.5 |
| Example 8-6 | | 45 | | | | 8.2 | 88 | 2.3 |
| Comparative Example 2 | 6 | 3 | — | — | — | — | 42 | 21.3 |

As shown in Table 8, in Examples 8-1 to 8-6 in which the oxygen content in the anode active material particle was different, the discharge capacity retention ratio was higher and the swollenness ratio was smaller than those of Comparative example 2 as in Example 2-4. Accordingly, it was confirmed that in the secondary battery of the invention, if the oxygen content in the anode active material particle was changed, the cycle characteristics and the swollenness characteristics were improved as well.

In particular, in Examples 2-4 and 8-1 to 8-6, there was a tendency that as the oxygen content was increased, the discharge capacity retention ratio was increased and then decreased. In this case, if the oxygen content was smaller than 3 atomic %, the discharge capacity retention ratio was largely decreased. If the oxygen content was larger than 40 atomic %, sufficient discharge capacity retention ratio were obtained while the battery capacity was largely lowered, and thus it was not practical. Accordingly, it was confirmed that to further improve the cycle characteristics, the oxygen content in the anode active material particle was preferably in the range from 3 atomic % to 40 atomic %.

Examples 9-1 to 9-6

A procedure was performed in the same manner as that of Examples 8-1 to 8-6, except that the molar ratio M2/M1 was 1/1 instead of 1/2.

The cycle characteristics, the swollenness characteristics and the like of the secondary batteries of Examples 9-1 to 9-6 were examined, and the results shown in Table 9 were obtained. Table 9 also shows the results of Example 2-5 and Comparative example 2.

than those of Comparative example 2. In this case, if the oxygen content was from 3 atomic % to 40 atomic %, a higher discharge capacity retention ratio was obtained, and a sufficient battery capacity was obtained. Accordingly, it was confirmed that in the secondary battery of the invention, in the case that the oxygen content in the anode active material particle was changed, even when the molar ratio M2/M1 was changed, the cycle characteristics and the swollenness characteristics were improved.

Examples 10-1 to 10-6

A procedure was performed in the same manner as that of Example 2-4, except that the oxygen content in the metal material was 1 atomic % (Example 10-1), 1.5 atomic % (Example 10-2), 10 atomic % (Example 10-3), 20 atomic % (Example 10-4), 30 atomic % (Example 10-5), and 35 atomic % (Example 10-6) instead of 5 atomic %.

TABLE 9

Anode active material particle: silicon (electron beam evaporation method)
Ten point height of roughness profile Rz = 3.5 μm
Oxygen content in the metal material = 5 atomic %

| | Anode active material particle | | Metal material | | Molar ratio M2/M1 | Occupancy of metal material (atomic %) | Discharge capacity retention ratio (%) | Swollenness ratio (%) |
|---|---|---|---|---|---|---|---|---|
| | Number of layers (layer) | Oxygen content (atomic %) | Type | Forming method | | | | |
| Example 9-1 | 6 | 2 | Co | Electrolytic plating method | 1/1 | 10.5 | 83 | 3.1 |
| Example 2-5 | | 3 | | | | 10.3 | 90 | 3.1 |
| Example 9-2 | | 10 | | | | 10.1 | 92 | 3 |
| Example 9-3 | | 20 | | | | 10 | 93 | 3 |
| Example 9-4 | | 30 | | | | 10 | 92 | 2.9 |
| Example 9-5 | | 40 | | | | 10.1 | 91 | 2.9 |
| Example 9-6 | | 45 | | | | 10.2 | 83 | 2.8 |
| Comparative Example 2 | 6 | 3 | — | — | — | — | 42 | 21.3 |

As shown in Table 9, in Examples 2-5 and 9-1 to 9-6 in which the molar ratio M2/M1 was changed, results similar to those of Examples 2-4 and 8-1 to 8-6 were obtained. That is, in Examples 2-5 and 9-1 to 9-6, the discharge capacity retention ratio was higher and the swollenness ratio was smaller The cycle characteristics, the swollenness characteristics and the like of the secondary batteries of Examples 10-1 to 10-6 were examined, and the results shown in Table 10 were obtained. Table 10 also shows the results of Example 2-4 and Comparative example 2.

TABLE 10

Anode active material particle: silicon (electron beam evaporation method)
Ten point height of roughness profile Rz = 3.5 μm
Oxygen content in the anode active material particle = 3 atomic %

| | Anode active material particle | Metal material | | | Molar ratio M2/M1 | Occupancy of metal material (atomic %) | Discharge capacity retention ratio (%) | Swollenness ratio (%) |
|---|---|---|---|---|---|---|---|---|
| | Number of layers (layer) | Type | Oxygen content (atomic %) | Forming method | | | | |
| Example 10-1 | 6 | Co | 1 | Electrolytic plating method | 1/2 | 13.5 | 82 | 5.3 |
| Example 10-2 | | | 1.5 | | | 10.9 | 88 | 4.2 |
| Example 2-4 | | | 5 | | | 8.3 | 90 | 3 |
| Example 10-3 | | | 10 | | | 6.2 | 92 | 2.8 |
| Example 10-4 | | | 20 | | | 3.4 | 91 | 2.8 |

TABLE 10-continued

Anode active material particle: silicon (electron beam evaporation method)
Ten point height of roughness profile Rz = 3.5 μm
Oxygen content in the anode active material particle = 3 atomic %

| | Anode active material particle | Metal material | | | Occupancy | Discharge capacity | |
|---|---|---|---|---|---|---|---|
| | Number of layers (layer) | Type | Oxygen content (atomic %) | Forming method | Molar ratio M2/M1 | of metal material (atomic %) | retention ratio (%) | Swollenness ratio (%) |
| Example 10-5 | | | 30 | | | 2.1 | 91 | 2.9 |
| Example 10-6 | | | 35 | | | 1.8 | 84 | 3 |
| Comparative example 2 | 6 | — | — | — | — | — | 42 | 21.3 |

As shown in Table 10, in Examples 10-1 to 10-6 in which the oxygen content in the metal material was different, the discharge capacity retention ratio was higher and the swollenness ratio was smaller than those of Comparative example 2 as in Example 2-4. Accordingly, it was confirmed that in the secondary battery of the invention, if the oxygen content in the metal material was changed, the cycle characteristics and the swollenness characteristics were improved as well.

In particular, in Examples 2-4 and 10-1 to 10-6, there was a tendency that as the oxygen content was increased, the discharge capacity retention ratio was increased and then decreased. In this case, if the oxygen content was smaller than 1.5 atomic % or larger than 30 atomic %, the discharge capacity retention ratio was significantly decreased. Accordingly, it was confirmed that to further improve the cycle characteristics, the oxygen content in the metal material was preferably in the range from 3 atomic % to 30 atomic %.

Examples 11-1 to 11-3

A procedure was performed in the same manner as that of Example 2-4, except that a mixture containing silicon and a metal element was used as an evaporation source instead of silicon with the purity of 99% so that the anode active material particle containing such a mixture had the thickness of 6.5 μm for one side. Iron was used as a metal element, and the ratio (molar ratio) M2/M3/M1 among the number of moles M1 per unit area of the anode active material particle, the number of moles M2 per unit area of the metal material, and the number of moles M3 per unit area of the metal element contained in the anode active material particle was 1/0.1/2 (Example 11-1), 1/0.2/2 (Example 11-2), and 1/0.4/2 (Example 11-3). In this case, the thickness of the cathode active material layer 53B was adjusted so that the charge and discharge capacity of the anode 54 was larger than the charge and discharge capacity of the cathode 53, and thereby lithium metal was not precipitated on the anode 54 during the charge and discharge.

Examples 11-4 to 11-7

A procedure was performed in the same manner as that of Example 11-2, except that cobalt (Example 11-4), nickel (Example 11-5), titanium (Example 11-6), and chromium (Example 11-7) was used instead of iron as a metal element.

Comparative Example 11

A procedure was performed in the same manner as that of Example 11-4, except that the metal was not formed.

The cycle characteristics, the swollenness characteristics and the like of the secondary batteries of Examples 11-1 to 11-7 and Comparative example 11 were examined, and the results shown in Table 11 were obtained. Table 11 also shows the results of Example 2-4 and Comparative example 2.

TABLE 11

Anode active material particle: silicon (electron beam evaporation method)
Ten point height of roughness profile Rz = 3.5 μm
Oxygen content in the anode active material particle = 3 atomic %
Oxygen content in the metal material = 5 atomic %

| | Anode active material particle | | Metal material | | | Occupancy | Discharge capacity | |
|---|---|---|---|---|---|---|---|---|
| | Number of layers (layer) | Metal element Type | Type | Forming method | Molar ratio M2/M3/M1 | of metal material (atomic %) | retention ratio (%) | Swollenness ratio (%) |
| Example 2-4 | 6 | — | Co | Electrolytic plating method | 1/0/2 | 8.3 | 90 | 3 |
| Example 11-1 | | Fe | | | 1/0.1/2 | 8 | 92 | 3 |
| Example 11-2 | | | | | 1/0.2/2 | 7.9 | 94 | 2.9 |
| Example 11-3 | | | | | 1/0.4/2 | 7.5 | 93 | 2.8 |
| Example 11-4 | | Co | | | 1/0.2/2 | 10.5 | 95 | 2.8 |

TABLE 11-continued

Anode active material particle: silicon (electron beam evaporation method)
Ten point height of roughness profile Rz = 3.5 μm
Oxygen content in the anode active material particle = 3 atomic %
Oxygen content in the metal material = 5 atomic %

|  | Anode active material particle | | Metal material | | | Occupancy | Discharge capacity | |
| --- | --- | --- | --- | --- | --- | --- | --- | --- |
|  | Number of layers (layer) | Metal element Type | Type | Forming method | Molar ratio M2/M3/M1 | of metal material (atomic %) | retention ratio (%) | Swollenness ratio (%) |
| Example 11-5 |  | Ni |  |  |  | 8 | 94 | 3 |
| Example 11-6 |  | Ti |  |  |  | 7.8 | 94 | 3.1 |
| Example 11-7 |  | Cr |  |  |  | 8.1 | 93 | 3.2 |
| Comparative example 2 | 6 | — | — | — | — | — | 42 | 21.3 |
| Comparative example 11 | 6 | Co | — | — | 0/0.2/2 | — | 61 | 19 |

As shown in Table 11, in Examples 11-1 to 11-7 in which the anode active material particle had a metal element together with silicon, the discharge capacity retention ratio was higher and the swollenness ratio was smaller than those of Comparative example 2 as in Example 2-4. It is needless to say that in Example 11-4 in which the anode active material particle had cobalt together with silicon, the discharge capacity retention ratio was higher and the swollenness ratio was smaller than those of Comparative example 11. Accordingly, it was confirmed that in the secondary battery of the invention, if the anode active material particle contained a metal element, the cycle characteristics and the swollenness characteristics were improved as well. Though examples using molybdenum as a metal element have not been disclosed, when the cycle characteristics and the swollenness characteristics were similarly examined for the case using molybdenum, it was also confirmed that the both characteristics were improved.

In particular, in Examples 11-1 to 11-7, the discharge capacity retention ratio was higher and the swollenness ratio was smaller than those of Example 2-4. Accordingly, it was confirmed that in the secondary battery of the invention, the cycle characteristics and the swollenness characteristics were further improved if the anode active material particle contained a metal element.

Figure 17:
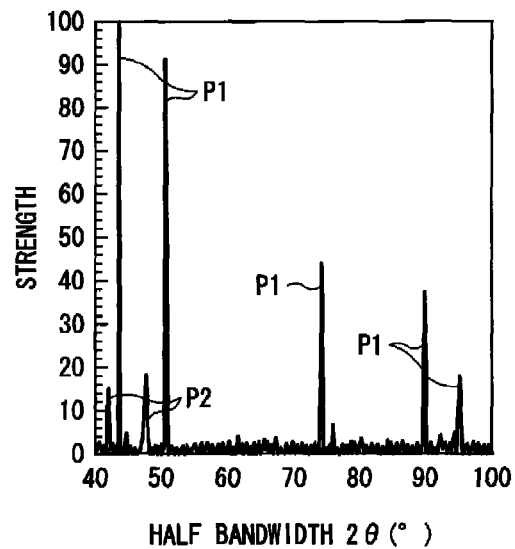
FIG. 17 is an XRD analysis result of an anode (Example 2-5)
Figure 18:
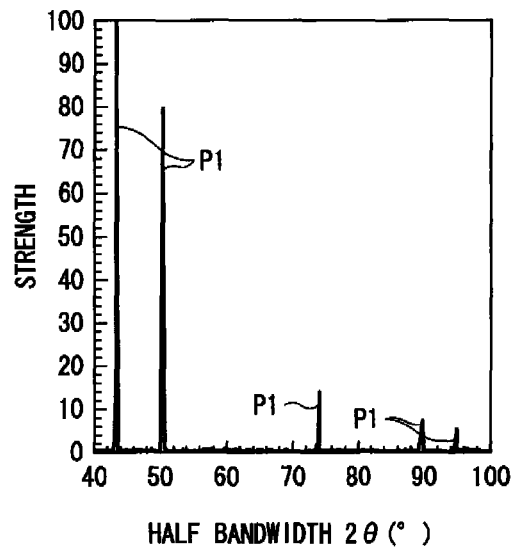
FIG. 18 is an XRD analysis result of an anode (Example 5-2)
Figure 19:
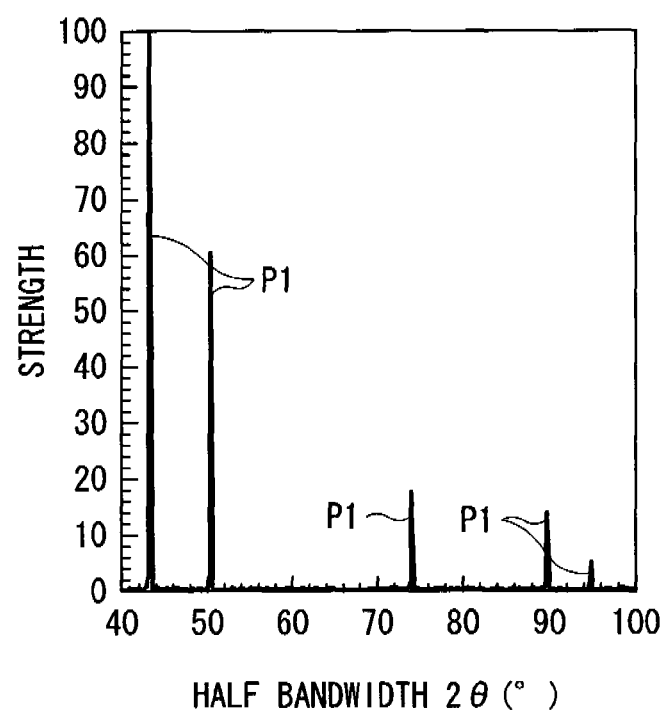
FIG. 19 is an XRD analysis result of an anode (Comparative example 11)

As a representative of the foregoing examples and comparative examples, the anode 54 in the secondary batteries of Examples 2-5, 5-2, and Comparative example 11 was analyzed by X-ray diffraction (XRD), and the results shown in FIG. 17 to FIG. 19 were obtained. The strength shown in the vertical axis of FIG. 17 to FIG. 19 is a normalized value of (011) crystal plane of copper as the anode current collector 54A.

In Example 2-5 in which the metal material (cobalt) was formed by electrolytic plating method, as shown in FIG. 17, peak P1 of copper as the anode current collector 54A and peak P2 of cobalt as the metal material were observed. In Example 5-2 in which the metal material (cobalt) was formed by electron beam evaporation method, as shown in FIG. 18, only peak P1 of copper was observed and peak P2 of cobalt was not observed. In Comparative example 11 in which the anode active material particle (silicon and cobalt) was co-evaporated and the metal material was not formed, as shown in FIG. 19, only peak P1 of copper was observed. From these analysis results with the use of XRD and the fact that the discharge capacity retention ratio was increased in the order of Comparative example 11, Example 5-2, and Example 2-5, the following is inferred.

That is, in Example 2-5, the metal material formed by electrolytic plating method had the crystallinity. Therefore, peak P2 of cobalt is observed in the analysis result with the use of XRD. In this case, the anode active material particles were sufficiently bound with each other through the metal material, and the resistance of the metal material was sufficiently low, and thus the discharge capacity retention ratio was higher than that of Example 5-2 and Comparative example 11. In Example 5-2, since the metal material formed by electron beam evaporation method was amorphous, peak P2 is not observed in the analysis result with the use of XRD. In this case, the resistance of the metal material was not low to the same degree as that of Example 2-5. However, in this case, since the anode active material particles are sufficiently bound through the metal material, the discharge capacity retention ratio was lower than that of Example 2-5, but was higher than that of Comparative example 11. In Comparative example 11, it is needless to say that peak P2 is not observed in the analysis result with the use of XRD since the metal material was not formed. In this case, since improvement of the biding characteristics of the anode active material particles through the metal material and lowering of the resistance were not obtained, the discharge capacity retention ratio was lower than that of Examples 2-5 and 5-2.

Accordingly, it was confirmed that presence of forming the metal material contributed to the cycle characteristics. Further, it was confirmed that to improve the cycle characteristics, liquid-phase deposition method such as electrolytic plating method was more preferably used than vapor-phase deposition method such as electron beam evaporation method based on the analysis result with the use of XRD.

Examples 12-1 to 12-3

A procedure was performed in the same manner as that of Example 2-4, except that the anode active material particle was formed so that the first oxygen-containing region and the second oxygen-containing region having the higher oxygen content than that of the first oxygen-containing region were alternately layered by depositing the anode active material while intermittently introducing oxygen gas or the like into a chamber, instead that oxygen was made to be contained in the anode active material particle by depositing the anode active material while continuously introducing oxygen gas or the like into the chamber. The oxygen content in the second oxygen-containing region was 3 atomic %, and the number of second oxygen-containing regions was 2 (Example 12-1), 4 (Example 12-2), and 6 (Example 12-3).

The cycle characteristics, the swollenness characteristics and the like of the secondary batteries of Examples 12-1 to 12-3 were examined, and the results shown in Table 12 were obtained. Table 12 also shows the results of Example 2-4 and Comparative example 2.

capacity retention ratio was increased in the order of Example 12-1 in which the number of the second oxygen-containing regions was 2, Example 12-2 in which the number of the second oxygen-containing regions was 4, and Example 12-3 in which the number of the second oxygen-containing regions was 6. Accordingly, it was confirmed that in the secondary battery of the invention, the cycle characteristics were further improved by forming the anode active material particle to have the first and the second oxygen-containing regions. Fur-

TABLE 12

Anode active material particle: silicon (electron beam evaporation method)
Ten point height of roughness profile Rz = 3.5 μm
Oxygen content in the anode active material particle = 3 atomic %
Oxygen content in the metal material = 5 atomic %

| | Anode active material particle | | Metal material | | | | Discharge capacity retention ratio (%) | Swollenness ratio (%) |
|---|---|---|---|---|---|---|---|---|
| | Number of layers (layer) | Number of second oxygen-containing regions | Type | Forming method | Molar ratio M2/M1 | Occupancy of metal material (atomic %) | | |
| Example 2-4 | 6 | — | Co | Electrolytic plating method | 1/2 | 8.3 | 90 | 3 |
| Example 12-1 | | 2 | | | | 8.3 | 91 | 2.8 |
| Example 12-2 | | 4 | | | | 8.2 | 93 | 2.6 |
| Example 12-3 | | 6 | | | | 8.6 | 94 | 2.1 |
| Comparative example 2 | 6 | — | — | — | — | — | 42 | 21.3 |

As shown in Table 12, in Examples 12-1 to 12-3 in which the anode active material particle had the first and the second oxygen-containing regions, the discharge capacity retention ratio was higher and the swollenness ratio was smaller than those of Comparative example 2 as in Example 2-4. Accordingly, it was confirmed that in the secondary battery of the invention, if the anode active material particle was formed to have the first and the second oxygen-containing regions, the cycle characteristics and the swollenness characteristics were improved as well.

In particular, in Examples 12-1 12-3, the discharge capacity retention ratio was higher than that of Example 2-4. Further, in this case, there was a tendency that the discharge ther, it was confirmed that if the number of the second oxygen-containing regions was increased, the both characteristics were further improved.

Examples 13-1 to 13-2

A procedure was performed in the same manner as that of Examples 12-1 to 12-3, except that the molar ratio M2/M1 was 1/1 instead of 1/2.

The cycle characteristics, the swollenness characteristics and the like of the secondary batteries of Examples 12-1 to 12-3 were examined, and the results shown in Table 13 were obtained. Table 13 also shows the results of Example 2-5 and Comparative example 2.

TABLE 13

Anode active material particle: silicon (electron beam evaporation method)
Ten point height of roughness profile Rz = 3.5 μm
Oxygen content in the anode active material particle = 3 atomic %
Oxygen content in the metal material = 5 atomic %

| | Anode active material particle | | Metal material | | | | Discharge capacity retention ratio (%) | Swollenness ratio (%) |
|---|---|---|---|---|---|---|---|---|
| | Number of layers (layer) | Number of second oxygen-containing regions | Type | Forming method | Molar ratio M2/M1 | Occupancy of metal material (atomic %) | | |
| Example 2-5 | 6 | — | Co | Electrolytic plating method | 1/1 | 10.3 | 90 | 3.1 |
| Example 13-1 | | 2 | | | | 10.1 | 92 | 3 |
| Example 13-2 | | 4 | | | | 10 | 94 | 2.9 |

TABLE 13-continued

Anode active material particle: silicon (electron beam evaporation method)
Ten point height of roughness profile Rz = 3.5 μm
Oxygen content in the anode active material particle = 3 atomic %
Oxygen content in the metal material = 5 atomic %

|  | Anode active material particle | | | | | Discharge | |
|---|---|---|---|---|---|---|---|
|  | Number of layers (layer) | Number of second oxygen-containing regions | Metal material Type | Metal material Forming method | Molar ratio M2/M1 | Occupancy of metal material (atomic %) | capacity retention ratio (%) | Swollenness ratio (%) |

| | Number of layers (layer) | Number of second oxygen-containing regions | Type | Forming method | Molar ratio M2/M1 | Occupancy of metal material (atomic %) | capacity retention ratio (%) | Swollenness ratio (%) |
|---|---|---|---|---|---|---|---|---|
| Example 13-3 | | 6 | | | | 9.8 | 95 | 2.8 |
| Comparative example 2 | 6 | — | — | — | — | — | 42 | 21.3 |

As shown in Table 13, in Examples 2-5 and 13-1 to 13-3 in which the molar ratio was changed, results similar to those of Examples 2-4 and 12-1 to 12-3 were obtained. That is, in Examples 2-5 and 13-1 to 13-3, the discharge capacity retention ratio was higher and the swollenness ratio was smaller than those of Comparative example 2. In this case, there was a tendency that is the number of the second oxygen-containing regions was increased, the discharge capacity retention ratio was increased. Accordingly, it was confirmed that in the secondary battery of the invention, in the case that the anode active material particle was formed to have the first and the second oxygen-containing regions, even when the molar ratio was changed, the cycle characteristics and the swollenness characteristics were improved.

Examples 14-1 to 14-8

A procedure was performed in the same manner as that of Example 2-4, except that the ten point height of roughness profile Rz of the surface of the anode current collector 54A was changed to 1 μm (Example 14-1), 1.5 μm (Example 14-2), 2.5 μm (Example 14-3), 4.5 μm (Example 14-4), 5 μm (Example 14-5), 5.5 μm (Example 14-6), 6.5 μm (Example 14-7), and 7 μm (Example 14-8) instead of 3.5 μm.

The cycle characteristics, the swollenness characteristics and the like of the secondary batteries of Examples 14-1 to 14-8 were examined, and the results shown in Table 14 were obtained. Table 14 also shows the results of Example 2-4 and Comparative example 2.

TABLE 14

Anode active material particle: silicon (electron beam evaporation method)
Oxygen content in the anode active material particle = 3 atomic %
Oxygen content in the metal material = 5 atomic %

| | Anode active material layer | | | | | Anode | | |
|---|---|---|---|---|---|---|---|---|
| | Anode active material particle Number of layers (layer) | Metal material Type | Metal material Forming method | Molar ratio M2/M1 | Occupancy of metal material (atomic %) | current collector Ten point height of roughness profile Rz (μm) | Discharge capacity retention ratio (%) | Swollenness ratio (%) |
| Example 14-1 | 6 | Co | Electrolytic plating method | 1/2 | 8.3 | 1 | 79 | 3.3 |
| Example 14-2 | | | | | | 1.5 | 85 | 3.3 |
| Example 14-3 | | | | | | 2.5 | 88 | 3.3 |
| Example 2-4 | | | | | | 3.5 | 90 | 3 |
| Example 14-4 | | | | | | 4.5 | 89 | 3.3 |
| Example 14-5 | | | | | | 5 | 88 | 3.3 |
| Example 14-6 | | | | | | 5.5 | 87 | 3.3 |
| Example 14-7 | | | | | | 6.5 | 86 | 3.3 |
| Example 14-8 | | | | | | 7 | 80 | 3.3 |
| Comparative example 2 | 6 | — | — | — | — | — | 42 | 21.3 |

As shown in Table 14, in Examples 14-1 to 14-8 in which the ten point height of roughness profile Rz was different, the discharge capacity retention ratio was higher and the swollenness ratio was smaller than those of Comparative example 2 as in Example 2-4. Accordingly, it was confirmed that in the secondary battery of the invention, if the ten point height of roughness profile Rz was changed, the cycle characteristics and the swollenness characteristics were improved as well.

In particular, in Examples 2-4 and 14-1 to 14-8, there was a tendency that as the ten point height of roughness profile Rz was increased, the discharge capacity retention ratio was increased and then decreased. In this case, if the ten point height of roughness profile Rz was smaller than 1.5 μm or larger than 6.5 μm, the discharge capacity retention ratio was significantly decreased. Accordingly, it was confirmed that to further improve the cycle characteristics, the ten point height of roughness profile Rz was preferably in the range from 1.5 µm to 6.5 µm.

Examples 15-1 to 15-7

A procedure was performed in the same manner as that of Examples 14-1 to 14-4 and 14-6 to 14-8, except that the molar ratio M2/M1 was 1/1 instead of 1/2.

The cycle characteristics, the swollenness characteristics and the like of the secondary batteries of Examples 15-1 to 15-7 were examined, and the results shown in Table 15 were obtained. Table 15 also shows the results of Example 2-5 and Comparative example 2.

TABLE 15

Anode active material particle: silicon (electron beam evaporation method)
Oxygen content in the anode active material particle = 3 atomic %
Oxygen content in the metal material = 5 atomic %

| | Anode active material layer | | | | Anode | | |
| --- | --- | --- | --- | --- | --- | --- | --- |
| | Anode active material particle Number of layers (layer) | Metal material Type | Metal material Forming method | Molar ratio M2/M1 | Occupancy of metal material (atomic %) | current collector Ten point height of roughness profile Rz (µm) | Discharge capacity retention ratio (%) | Swollenness ratio (%) |
| Example 15-1 | 6 | Co | Electrolytic plating method | 1/1 | 10.3 | 1 | 78 | 3.1 |
| Example 15-2 | | | | | | 1.5 | 84 | 3.1 |
| Example 15-3 | | | | | | 2.5 | 87 | 3.1 |
| Example 2-5 | | | | | | 3.5 | 90 | 3.1 |
| Example 15-4 | | | | | | 4.5 | 88 | 3.1 |
| Example 15-5 | | | | | | 5.5 | 90 | 3.1 |
| Example 15-6 | | | | | | 6.5 | 89 | 3.1 |
| Example 15-7 | | | | | | 7 | 77 | 3.1 |
| Comparative example 2 | 6 | — | — | — | — | — | 42 | 21.3 |

As shown in Table 15, in Examples 2-5 and 15-1 to 15-7 in which the molar ratio was changed, results similar to those of Examples 2-4, 14-1 to 14-4, and 14-6 to 14-8 were obtained. That is, in Examples 2-5 and 15-1 to 15-7, the discharge capacity retention ratio was higher and the swollenness ratio was smaller than those of Comparative example 2. In this case, there was a tendency that if the ten point of roughness profile Rz was in the range from 1.5 µm to 6.5 µm, the discharge capacity retention ratio was higher. Accordingly, it was confirmed that in the secondary battery of the invention, in the case that if the ten point height of roughness profile Rz of the surface of the anode current collector 54A was changed, even when the molar ratio was also changed, the cycle characteristics and the swollenness characteristics were improved.

Example 16-1

A procedure was performed in the same manner as that of Example 2-4, except that the anode active material particle was formed to have the thickness of 6.5 µm for one side by using RF magnetron sputtering method instead of electron beam evaporation method. Silicon with the purity of 99.99% was used as the target, and the deposition rate was 0.5 nm/sec. In this case, the thickness of the cathode active material layer 53B was adjusted so that the charge and discharge capacity of the anode 54 was larger than the charge and discharge capacity of the cathode 53, and thereby lithium metal was not precipitated on the anode 54 during the charge and discharge.

Example 16-2

A procedure was performed in the same manner as that of Example 2-4, except that the anode active material particle was formed to have the thickness of 6 µm for one side by using CVD method instead of electron beam evaporation method. Silane and argon were respectively used as the raw material and the excitation gas. The deposition rate and the substrate temperature were respectively 1.5 nm/sec and 200 deg C. In this case, in the same manner as that in Example 16-1, the charge and discharge capacity of the anode 54 and the charge and discharge capacity of the cathode 53 were adjusted, and thereby lithium metal was not precipitated on the anode 54 during the charge and discharge.

The cycle characteristics, the swollenness characteristics and the like of the secondary batteries of Examples 16-1 and 16-2 were examined, and the results shown in Table 16 were obtained.

Example 2-4 in which the method of forming the anode active material particle was electron beam evaporation method. Accordingly, it was confirmed that to further improve the cycle characteristics, evaporation method as the method of

TABLE 16

Anode active material particle: silicon
Ten point height of roughness profile Rz = 3.5 μm
Oxygen content in the anode active material particle = 3 atomic %
Oxygen content in the metal material = 5 atomic %

| | Anode active material particle | | Metal material | | Molar ratio M2/M1 | Occupancy of metal material (atomic %) | Discharge capacity retention ratio (%) | Swollenness ratio (%) |
|---|---|---|---|---|---|---|---|---|
| | Number of layers (layer) | Forming method | Type | Forming method | | | | |
| Example 2-4 | 6 | Electron beam evaporation method | Co | Electrolytic plating method | 1/2 | 8.3 | 90 | 3 |
| Example 16-1 | | Sputtering method | | | | | 89 | 3.5 |
| Example 16-2 | | CVD method | | | | | 88 | 3.8 |
| Comparative example 2 | 6 | Electron beam evaporation method | — | — | — | — | 42 | 21.3 |

As shown in Table 16, in Examples 16-1 and 16-2 in which the method of forming the anode active material particle was different, the discharge capacity retention ratio was higher and the swollenness ratio was smaller than those of Comparative example 2 as in Example 2-4. Accordingly, it was confirmed that in the secondary battery of the invention, if the method of forming the anode active material particle was changed, the cycle characteristics and the swollenness characteristics were improved as well.

In particular, in Examples 2-4, 16-1, and 16-2, there was a tendency that the discharge capacity retention ratio was increased in the order of Example 16-2 in which the method of forming the anode active material particle was CVD method, Example 16-1 in which the method of forming the anode active material particle was sputtering method, and forming the anode active material particle was preferably used.

Examples 17-1 and 17-2

A procedure was performed in the same manner as that of Examples 16-1 and 16-2, except that the molar ratio M2/M1 was 1/1 instead of 1/2.

The cycle characteristics, the swollenness characteristics and the like of the secondary batteries of Examples 17-1 and 17-2 were examined, and the results shown in Table 17 were obtained. Table 17 also shows the results of Example 2-5 and Comparative example 2.

TABLE 17

Anode active material particle: silicon
Ten point height of roughness profile Rz = 3.5 μm
Oxygen content in the anode active material particle = 3 atomic %
Oxygen content in the metal material = 5 atomic %

| | Anode active material particle | | Metal material | | Molar ratio M2/M1 | Occupancy of metal material (atomic %) | Discharge capacity retention ratio (%) | Swollenness ratio (%) |
|---|---|---|---|---|---|---|---|---|
| | Number of layers (layer) | Forming method | Type | Forming method | | | | |
| Example 2-5 | 6 | Electron beam evaporation method | Co | Electrolytic plating method | 1/1 | 10.3 | 90 | 3.1 |
| Example 17-1 | | Sputtering method | | | | | 89 | 3.3 |
| Example 17-2 | | CVD method | | | | | 88 | 3.5 |
| Comparative example 2 | 6 | Electron beam evaporation method | — | — | — | — | 42 | 21.3 |

As shown in Table 17, in Examples 2-5, 17-1, and 17-2 in which the molar ratio was changed, results similar to those of Examples 2-4, 16-1, and 16-2 were obtained. That is, in Examples 2-5, 17-1, and 17-2, the discharge capacity retention ratio was higher and the swollenness ratio was smaller than those of Comparative example 2. In this case, there was a tendency that the discharge capacity retention ratio was increased in the order of CVD method, sputtering method, and electron beam evaporation method as a method of forming the anode active material particle. Accordingly, it was confirmed that in the secondary battery of the invention, in the case that the method of forming the anode active material particle was changed, even when the molar ratio was changed, the cycle characteristics and the swollenness characteristics were improved.

Example 18-1

A procedure was performed in the same manner as that of Example 2-4, except that 4-fluoro-1,3-dioxolane-2-one (FEC) as fluorinated ester carbonate (monofluoroethylene carbonate) was used instead of EC as a solvent.

Example 18-2

A procedure was performed in the same manner as that of Example 2-4, except that 4,5-difluoro-1,3-dioxolane-2-one (DFEC) as fluorinated ester carbonate (difluoroethylene carbonate) was added as a solvent, and the composition of the mixed solvent (EC:DFEC:DEC) was 25:5:70 at a weight ratio.

Example 18-3

A procedure was performed in the same manner as that of Example 18-1, except that vinylene carbonate (VC) as cyclic ester carbonate having an unsaturated bond was added as a solvent to the electrolytic solution. The VC content in the electrolytic solution was 10 wt %.

Example 18-4

A procedure was performed in the same manner as that of Example 18-1, except that vinyl ethylene carbonate (VEC) as cyclic ester carbonate having an unsaturated bond was added as a solvent to the electrolytic solution. The VEC content in the electrolytic solution was 10 wt %.

Example 18-5

A procedure was performed in the same manner as that of Example 18-1, except that 1,3-propenesultone (PRS) as sultone was added as a solvent to the electrolytic solution. The PRS concentration in the electrolytic solution was 1 wt %.

Example 18-6

A procedure was performed in the same manner as that of Example 18-1, except that lithium borate tetrafluoride ($LiBF_4$) was added as an electrolyte salt to the electrolytic solution. The concentration of $LiBF_4$ in the electrolytic solution was 0.1 mol/kg.

The cycle characteristics, the swollenness characteristics and the like of the secondary batteries of Examples 18-1 to 18-6 were examined, the results shown in Table 18 were obtained. Table 18 also shows the results of Example 2-4 and Comparative example 2.

TABLE 18

Anode active material particle: silicon (electron beam evaporation method)
Ten point height of roughness profile Rz = 3.5 μm
Oxygen content in the anode active material particle = 3 atomic %
Oxygen content in the metal material = 5 atomic %

| | Anode active material particle Number of layers (layer) | Anode Metal material Type | Metal material Forming method | Molar ratio M2/M1 | Occupancy of metal material (atomic %) | Electrolytic solution Solvent (wt %) EC | FEC | DFEC | DEC | Others | Discharge capacity retention ratio (%) | Swollenness ratio (%) |
|---|---|---|---|---|---|---|---|---|---|---|---|---|
| Example 2-4 | 6 | Co | Electrolytic plating method | 1/2 | 8.3 | 50 | — | — | 50 | — | 90 | 3 |
| Example 18-1 | | | | | | — | 50 | — | 50 | — | 92 | 3.1 |
| Example 18-2 | | | | | | 25 | — | 5 | 70 | — | 93 | 3.1 |
| Example 18-3 | | | | | | — | 50 | — | 50 | VC | 94 | 3 |
| Example 18-4 | | | | | | | | | | VEC | 95 | 3.1 |
| Example 18-5 | | | | | | | | | | PRS | 93 | 0.4 |
| Example 18-6 | | | | | | | | | | $LiBF_4$ | 92 | 0.9 |
| Comparative example 2 | 6 | — | — | — | — | 50 | — | 50 | — | — | 42 | 21.3 |

As shown in Table 18, in Examples 18-1 to 18-6 in which the composition of solvent and the type of electrolyte salt were different, the discharge capacity retention ration was higher and the swollenness ratio was smaller than those of Comparative example 2 as in Example 2-4. Accordingly, it was confirmed that in the secondary battery of the invention, if the composition of solvent and the type of electrolyte salt were changed, the cycle characteristics and the swollenness characteristics were improved as well.

In particular, in Examples 18-1 and 18-2, there was a tendency that the discharge capacity retention ratio was higher than that of Example 2-4. Further, in this case, there was a tendency that in Example 18-2 in which the solvent contained DFEC, the discharge capacity retention ratio was higher than that of Example 18-1 in which the solvent contained FEC. Accordingly, it was confirmed that to further improve the cycle characteristics, the fluorinated ester carbonate was preferably contained in the solvent. In addition, it was confirmed that to still further improve the cycle characteristics, difluoroethylene carbonate was more preferably used than monofluoroethylene carbonate as the fluorinated ester carbonate.

Further, in Examples 18-3 to 18-6, the discharge capacity retention ratio was higher than that of Example 2-4. Further, in this case, there was a tendency that in Examples 18-3 and 18-4 in which the solvent contained VC or VEC, the discharge capacity retention ratio was higher than that of Examples 18-5 and 18-6 in which the solvent contained PRS or $LiBF_4$. Accordingly, it was confirmed that to more improve the cycle characteristics, the solvent preferably contained the cyclic ester carbonate having an unsaturated bond, sultone, or an electrolyte salt having boron and fluorine. In addition, it was confirmed that to still further improve the cycle characteristics, the cyclic ester carbonate having an unsaturated bond was preferably used.

In Examples 18-5 and 18-6 in which the solvent contained PRS or $LiBF_4$, the swollenness ratio was significantly decreased compared to that of Example 2-4 in which the solvent did not contain PRS or $LiBF_4$. In this case, there was a tendency that the swollenness ratio in the case of containing PRS was smaller than that in the case of containing $LiBF_4$. Accordingly, it was confirmed that in the secondary battery of the invention, if the solvent contained sultone or the like, the swollenness characteristics were improved. In addition, it was confirmed that higher effects were obtained if the solvent contained sultone.

Examples 19-1 to 19-6

A procedure was performed in the same manner as that of Examples 18-1 to 18-6, except that the molar ratio M2/M1 was 1/1 instead of 1/2.

The cycle characteristics, the swollenness characteristics and the like of the secondary batteries of Examples 19-1 to 19-6 were examined, and the results shown in Table 19 were obtained. Table 19 also shows the results of Example 2-5 and Comparative example 2.

TABLE 19

Anode active material particle: silicon (electron beam evaporation method)
Ten point height of roughness profile Rz = 3.5 μm
Oxygen content in the anode active material particle = 3 atomic %
Oxygen content in the metal material = 5 atomic %

| | Anode | | | | | | | | | | |
|---|---|---|---|---|---|---|---|---|---|---|---|
| | Anode active material particle Number of layers (layer) | Metal material Type | Metal material Forming method | Molar ratio M2/M1 | Occupancy of metal material (atomic %) | Electrolytic solution Solvent (wt %) EC | FEC | DFEC | DEC | Others | Discharge capacity retention ratio (%) | Swollenness ratio (%) |
| Example 2-5 | 6 | Co | Electrolytic plating method | 1/1 | 10.3 | 50 | — | — | 50 | — | 90 | 3.1 |
| Example 19-1 | | | | | | — | 50 | — | 50 | | 93 | 3.1 |
| Example 19-2 | | | | | | 25 | — | 5 | 70 | | 94 | 3 |
| Example 19-3 | | | | | | — | 50 | — | 50 | VC | 95 | 3 |
| Example 19-4 | | | | | | | | | | VEC | 96 | 3 |
| Example 19-5 | | | | | | | | | | PRS | 94 | 0.3 |
| Example 19-6 | | | | | | | | | | $LiBF_4$ | 93 | 2.8 |
| Comparative example 2 | 6 | — | — | — | — | 50 | — | 50 | — | — | 42 | 21.3 |

As shown in Table 19, in Examples 2-5 and 19-1 to 19-6 in which the molar ratio was changed, effects similar to those of Examples 2-4 and 18-1 to 18-6 were obtained. That is, in Examples 2-5 and 19-1 to 19-6, the discharge capacity retention ratio was higher and the swollenness ratio was smaller than those of Comparative example 2. In this case, there was a tendency that the discharge capacity retention ratio in the case of containing FEC or the like was higher. Specially, the discharge capacity retention ratio in the case of containing DFEC was higher than that in the case of containing FEC, or the discharge capacity retention ratio in the case of containing VC or VEC was higher than that in the case of containing PRS or $LiBF_4$. Further, there was a tendency that in the case of containing PRS or $LiBF_4$, the swollenness ratio was smaller. Accordingly, it was confirmed that in the secondary battery of the invention, in the case that the composition of solvent and the type of electrolyte salt were changed, even when the molar ratio was also changed, the cycle characteristics and the swollenness characteristics were improved.

Example 20-1

A procedure was performed in the same manner as that of Example 2-4, except that the square secondary battery shown in FIG. 7 to FIG. 8 was fabricated instead of the laminated film secondary battery by the following procedure.

First, the cathode 21 and the anode 22 were formed. After that, the cathode lead 24 made of aluminum and the anode lead 25 made of nickel were respectively welded to the cathode current collector 21A and the anode current collector 22A. Subsequently, the cathode 21, the separator 23, and the anode 22 were layered in this order, and spirally wound in the longitudinal direction, and formed in the flat shape. Thereby, the battery element 20 was formed. Subsequently, the battery element 20 was contained inside the battery can 11 made of aluminum. After that, the insulating plate 12 was arranged on the battery element 20. Subsequently, the cathode lead 24 and the anode lead 25 were respectively welded to the cathode pin 15 and the battery can 11. After that, the battery cover 13 was fixed to the open end of the battery can 11 by laser welding. Finally, the electrolytic solution was injected into the battery can 11 through the injection hole 19. After that, the injection hole 19 was sealed by the sealing member 19A, and thereby the square battery was completed. For the secondary battery, the thickness of the cathode active material layer 21B was adjusted so that the charge and discharge capacity of the anode 22 was larger than the charge and discharge capacity of the cathode 21, and thereby lithium metal was not precipitated on the anode 22 during the charge and discharge.

Example 20-2

A procedure was performed in the same manner as that of Example 20-1, except that the battery can 11 made of iron was used instead of the battery can 11 made of aluminum.

The cycle characteristics, the swollenness characteristics and the like of the secondary batteries of Examples 20-1 and 20-2 were examined, the results shown in Table 20 were obtained. Table 20 also shows the results of Example 2-4 and Comparative example 2.

smaller than those of Comparative example 2 as in Example 2-4. Accordingly, it was confirmed that in the secondary battery of the invention, if the battery structure was changed, the cycle characteristics and the swollenness characteristics were improved as well.

In particular, in Examples 20-1 and 20-2, the discharge capacity retention ratio was higher and the swollenness ratio was smaller than those of Example 2-4. Further, in this case, in Example 20-2 in which the battery can 11 was made of iron, the discharge capacity retention ratio was higher and the swollenness ratio was smaller than those of Example 20-1 in which the battery can 11 was made of aluminum. Accordingly, it was confirmed that to further improve the cycle characteristics and the swollenness characteristics, the square battery structure was more preferably used than the laminated film battery structure. In addition, it was confirmed that to more improve the both characteristics, the battery can 11 made of iron was preferably used. Though no specific examples for a cylindrical secondary battery in which the package member is made of a metal material have been herein disclosed, it is evident that similar effects can be obtained in such a cylindrical secondary battery since the cycle characteristics and the swollenness characteristics were improved in the square secondary battery in which the package member is made of the metal material rather than in the laminated film secondary battery.

Examples 21-1 and 21-2

A procedure was performed in the same manner as that of Examples 20-1 and 20-2, except that the molar ratio M2/M1 was 1/1 instead of 1/2.

The cycle characteristics, the swollenness characteristics and the like of the secondary batteries of Examples 21-1 and

TABLE 20

Anode active material particle: silicon (electron beam evaporation method)
Ten point height of roughness profile Rz = 3.5 μm
Oxygen content in the anode active material particle = 3 atomic %
Oxygen content in the metal material = 5 atomic %

| | Battery structure | Anode active material particle Number of layers (layer) | Metal material Type | Metal material Forming method | Molar ratio M2/M1 | Occupancy of metal material (atomic %) | Discharge capacity retention ratio (%) | Swollenness ratio (%) |
|---|---|---|---|---|---|---|---|---|
| Example 2-4 | Laminated film | 6 | Co | Electrolytic plating method | 1/2 | 8.3 | 90 | 3 |
| Example 20-1 | Square (aluminum) | | | | | | 92 | 1.1 |
| Example 20-2 | Square (iron) | | | | | | 94 | 0.2 |
| Comparative example 2 | Laminated film | 6 | — | — | — | — | 42 | 21.3 |

As shown in Table 20, in Examples 20-1 and 20-2 in which the battery structure was different, the discharge capacity retention ratio was higher and the swollenness ratio was 21-2 were examined, and the results shown in Table 21 were obtained. Table 21 also shows the results of Example 2-5 and Comparative example 2.

TABLE 21

Anode active material particle: silicon (electron beam evaporation method)
Ten point height of roughness profile Rz = 3.5 μm
Oxygen content in the anode active material particle = 3 atomic %
Oxygen content in the metal material = 5 atomic %

| | Battery structure | Anode active material particle Number of layers (layer) | Metal material Type | Metal material Forming method | Molar ratio M2/M1 | Occupancy of metal material (atomic %) | Discharge capacity retention ratio (%) | Swollenness ratio (%) |
|---|---|---|---|---|---|---|---|---|
| Example 2-5 | Laminated film | 6 | Co | Electrolytic plating method | 1/1 | 10.3 | 90 | 3.1 |
| Example 21-1 | Square (aluminum) | | | | | | 92 | 2.7 |
| Example 21-2 | Square (iron) | | | | | | 94 | 2.2 |
| Comparative example 2 | Laminated film | 6 | — | — | — | — | 42 | 21.3 |

As shown in Table 21, in Examples 2-5, 21-1, and 21-2 in which the molar ratio was changed, effects similar to those of Examples 2-4, 20-1, and 20-2 were obtained. That is, in Examples 2-5, 21-1, and 21-2, the discharge capacity retention ratio was higher and the swollenness ratio was smaller than those of Comparative example 2. In this case, there was a tendency that in the square secondary battery, the discharge capacity retention ratio was higher and the swollenness ratio was smaller than those in the laminated film secondary battery. In addition, among the square secondary battery, in the iron square secondary battery, the discharge capacity retention ratio was higher and the swollenness ratio was smaller than those in the aluminum square secondary battery. Accordingly, it was confirmed that in the secondary battery of the invention, in the case that the battery structure was changed, even when the molar ratio was also changed, the cycle characteristics and the swollenness characteristics were improved.

Examples 22-1 and 22-2

A procedure was performed in the same manner as that of Example 2-4, except that the deposition rate of the anode active material particle was changed to 40 nm/sec (Example 22-1) and 80 nm/sec (Example 22-2) instead of 100 nm/sec.

Examples 22-3 to 22-5

A procedure was performed in the same manner as that of Example 2-4, except that the deposition rate of the anode active material particle was changed to 15 nm/sec (Example 22-3), 25 nm/sec (Example 22-4), and 40 nm/sec (Example 22-5) instead of 100 nm/sec; and the anode active material particle was formed and then the resultant was provided with heat treatment at 400 deg C. in the reduced pressure atmosphere for 5 hours.

Comparative Examples 22-1 and 22-2

A procedure was performed in the same manner as that of Example 2-4, except that the deposition rate of the anode active material particle was changed to 15 nm/sec (Comparative example 22-1) and 25 nm/sec (Comparative example 22-2) instead of 100 nm/sec.

The cycle characteristics, the swollenness characteristics and the like of the secondary batteries of Examples 22-1 to 22-5 and Comparative examples 22-1 and 22-2 were examined, and the results shown in Table 22 were obtained. Table 22 also shows the results of Example 2-4 and Comparative example 2.

Figure 20A:
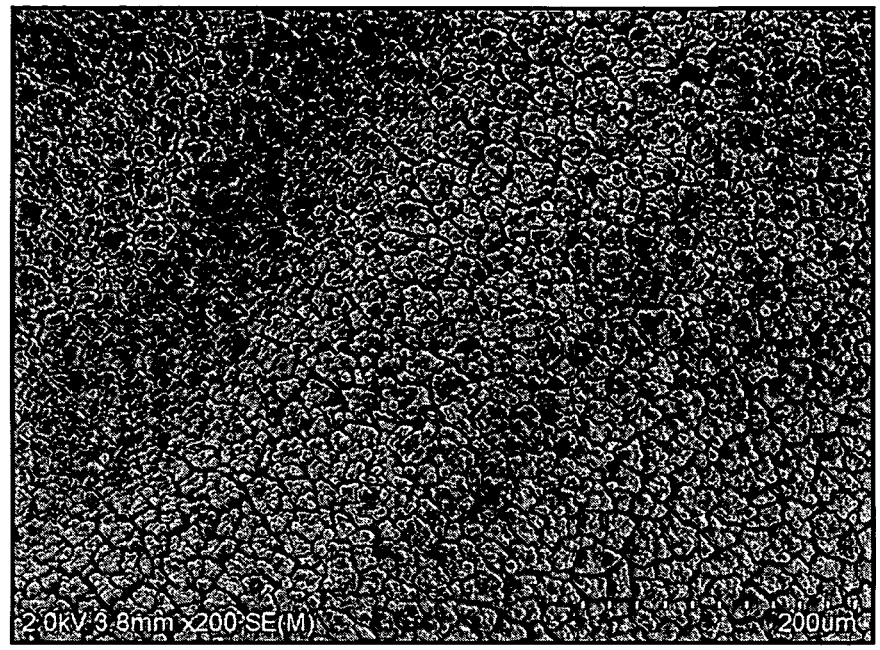
FIGS. 20A and 20B are SEM photographs showing a surface of the anode (Comparative example 2) after the cycle test.
Figure 20B:
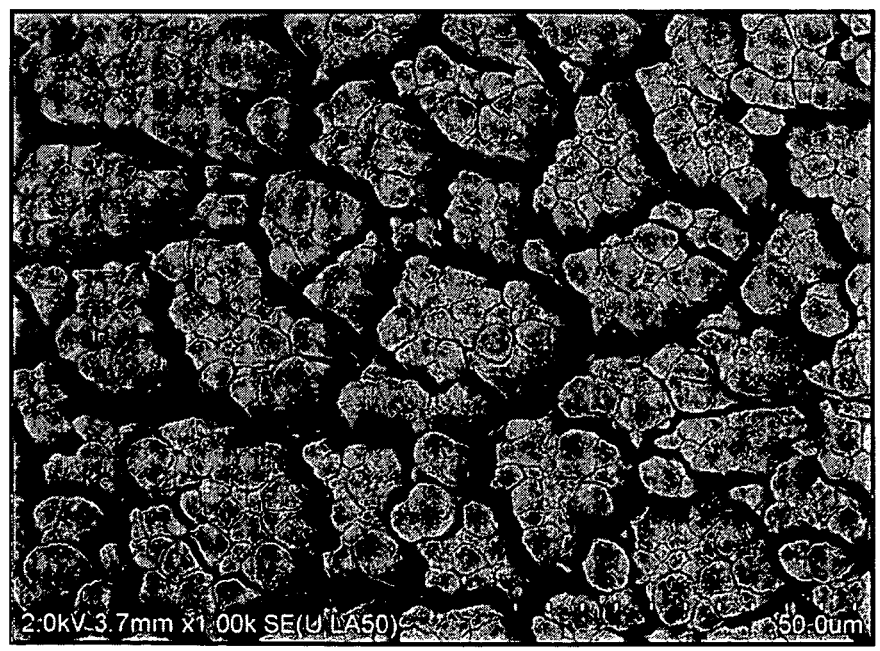
Figure 21A:
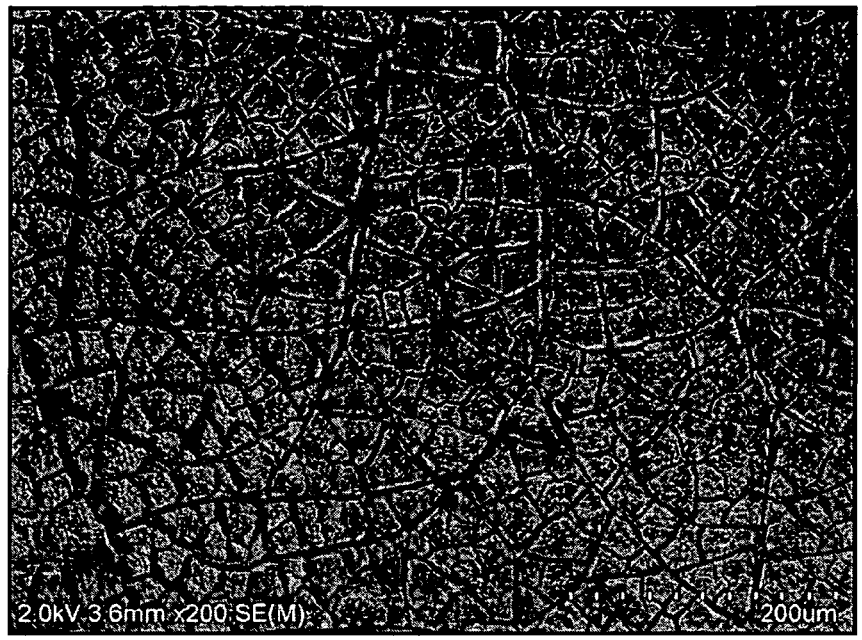
FIGS. 21A and 21B are SEM photographs showing a surface of the anode (Example 2-4) after the cycle test.
Figure 21B:

For the secondary batteries of Examples 2-4, 22-1 to 22-5, and Comparative examples 22-1 and 22-2, the particle state of the anode active material particle was also examined by the following procedure. First, after the secondary battery was charged and discharged 10 cycles, the secondary battery was deconstructed and the anode 54 in a discharging state was taken out. Subsequently, after the anode 54 was washed with dimethyl carbonate, the surface and a cross section of the central portion of the anode 54 were observed with the use of an SIM. The cross section of the anode 54 was exposed with the use of FIB. Finally, based on an SIM photograph, the average number of the split particles 206 per each secondary particle 205 out of adjacent five secondary particles 205; the average number of the secondary particles 205 per 1 line where eight lines with the respective lengths of 100 μm were drawn at intervals of 10 μm in the range of 100 μm×70 μm; the average number of primary particles 204 included in the secondary particle 205 per each secondary particle 205; and the ratio of the secondary particles 205 in which length T2 in the direction perpendicular to length T1 in the thickness direction was longer than the length T1 out of continuous ten secondary particles 205 were respectively examined. FIGS. 20A, 20B, 21A, and 21B are SEM photographs of the surface of the anode 54 after the cycle test, and respectively show observation results of Comparative example 2 and Example 2-4. FIG. 20B and FIG. 21B show part of the images shown in FIG. 20A and FIG. 21A.

TABLE 22

Anode active material particle: silicon (electron beam evaporation method)
Ten point height of roughness profile Rz = 3.5 μm
Oxygen content in the anode active material particle = 3 atomic %
Oxygen content in the metal material = 5 atomic %

| | Anode active material Number of layers (layer) | Metal material Type | Metal material Forming method | Molar ratio M2/M1 | Occupancy of metal material (atomic %) | Deposition rate (nm/s) | Heat treatment |
|---|---|---|---|---|---|---|---|
| Example 22-1 | 6 | Co | Electrolytic plating method | 1/2 | 8.3 | 40 | N/A |
| Example 22-2 | | | | | | 80 | N/A |
| Example 2-4 | | | | | | 100 | N/A |
| Example 22-3 | | | | | | 15 | Applicable |
| Example 22-4 | | | | | | 25 | Applicable |
| Example 22-5 | | | | | | 40 | Applicable |
| Comparative example 2 | 6 | — | — | — | — | 100 | N/A |
| Comparative example 22-1 | | | | | | 15 | N/A |
| Comparative example 22-2 | | | | | | 25 | N/A |

| | SEM/SIM observation | | | | | |
|---|---|---|---|---|---|---|
| | Average number of split particles | Average number of secondary particles | Average number of primary particles | T1 < T2: 50% or more | Discharge capacity retention ratio (%) | Swollenness ratio (%) |
| Example 22-1 | 16 | 6.5 | 40 | ○ | 87 | 3.5 |
| Example 22-2 | 15 | 6.1 | 37 | ○ | 89 | 3.3 |
| Example 2-4 | 13 | 5.9 | 35 | ○ | 90 | 3 |
| Example 22-3 | 19 | 7 | 38 | ○ | 85 | 3.2 |
| Example 22-4 | 18 | 6.7 | 34 | ○ | 86 | 3.4 |
| Example 22-5 | 15 | 6.4 | 33 | ○ | 87 | 3.6 |
| Comparative example 2 | — | — | — | — | 42 | 21.3 |
| Comparative example 22-1 | — | <5 | — | — | 72 | 17.3 |
| Comparative example 22-2 | — | <5 | — | — | 73 | 18.5 |

As shown in Table 22, in Examples 22-1 to 22-5 and Comparative examples 22-1 and 22-2 in which the deposition rate of the anode active material particle and presence of heat treatment were different, the discharge capacity retention ratio was higher and the swollenness ratio was smaller than those of Comparative example 2 as in Example 2-4. In this case, in Examples 2-4 and 22-1 to 22-5 in which the average number of the split particles 206 was ten or more, and the number ratio of the secondary particles 205 in which length T2 in the direction perpendicular to length T1 in the thickness direction was longer than the length T1 was 50% or more, the discharge capacity retention ratio was higher than that of Comparative examples 22-1 and 22-2 in which the foregoing conditions were not satisfied. In Examples 2-4 and 22-1 to 22-5, further, the average number of the secondary particles 205 was in the range from 5 to 11, and the average number of the primary particles 204 was 20 or more. In Comparative examples 22-1 and 22-2, the anode active material layer 54B was pulverized and fallen after charge and discharge, and therefore the particle state was not able to be observed. Accordingly, it was confirmed that in the secondary battery of the invention, as the particle state of the anode active material particle, if the average number of the split particles 206 was ten or more and the number ratio of the secondary particles 205 in which length T2 in the direction perpendicular to length T1 in the thickness direction was longer than the length T1 was 50% or more, the cycle characteristics were improved.

In particular, in the case that heat treatment was not provided, as evidenced by the results of Examples 2-4, 22-1 and 22-2, and Comparative examples 22-1 and 22-2, if the deposition rate of the anode active material particle was 40 nm/sec or more, the foregoing particle state was obtained. Meanwhile, in the case that heat treatment was performed, as evidenced by the results of Examples 22-3 to 22-5, the foregoing particle state was obtained not depending on the deposition rate of the anode active material particle. Accordingly, to obtain the particle state of the anode active material particle that contributes to improvement of the cycle characteristics, the following was confirmed. That is, if heat treatment was not performed after the anode active material particle was formed, the particle state was obtained not depending on the deposition rate. Meanwhile, if heat treatment was performed, the deposition rate was preferably 40 nm/sec or more.

Examples 23-1 to 23-9

A procedure was performed in the same manner as that of Example 1-1, except that the current density was changed when the metal material was formed by using electrolytic method, and the area ratio occupied by the metal material in the lower region SB shown in FIG. 6 (occupancy of the metal material in the lower region) was 15% (Example 23-1), 50% (Example 23-2), 55% (Example 23-3), 60% (Example 23-4), 65% (Example 23-5), 70% (Example 23-6), 76% (Example 23-7), 81% (Example 23-8), and 93% (Example 23-9). The ratio (molar ratio) M2/M1 between the number of moles M1 per unit area of the anode active material particle and the number of moles M2 per unit area of the metal material was 1/5.

Examples 23-10 to 23-14

A procedure was performed in the same manner as that of Example 23-7, except that an iron plating solution (Example 23-10), a nickel plating solution (Example 23-11), a copper plating solution (Example 23-12), a chromium plating solution (Example 23-13), and a titanium plating solution (Example 23-14) was used instead of the cobalt plating solution as a material for forming the metal material. The foregoing plating solutions are all made by Japan Pure Chemical Co., Ltd.

Comparative Example 23

A procedure was performed in the same manner as that of Examples 23-1 to 23-9, except that the metal material was not formed.

The cycle characteristics, the swollenness characteristics and the like of the secondary batteries of Examples 23-1 to 23-14 and Comparative example 23 were examined, and the results shown in Table 23 were obtained. In this case, to examine the rigidity (pliableness) of the anode 54 in the case that the anode active material layer 54B contained the metal material, the electrode state was also examined.

To examine the electrode state, the formed anode 54 was bent at about 90 deg C., and the rigidity of the anode 54 was evaluated with the use of tactile impression. A case that the anode 54 was flexible and easily bent was indicated by "very good", a case that the anode 54 was slightly rigid and showed slight resistance when it was bent was indicated by "good", and a case that the anode 54 was so rigid that the anode 54 was hardly bent was indicated by "poor". The procedure to examine the electrode state was similar to that of evaluating the same characteristics in the following examples and comparative examples.

TABLE 23

Anode active material particle: silicon (electron beam evaporation method)
Ten point height of roughness profile Rz = 3.5 μm
Oxygen content in the anode active material particle = 3 atomic %
Oxygen content in the metal material = 5 atomic %

|  | Anode active material particle Number of layers (layer) | Metal material Type | Metal material Forming method | Occupancy of metal material in lower region (atomic %) | Molar ratio M2/M1 | Electrode state | Discharge capacity retention ratio (%) | Swollenness ratio (%) |
|---|---|---|---|---|---|---|---|---|
| Example 23-1 | 1 | Co | Electrolytic plating method | 15 | 1/5 | Good | 55 | 5.5 |
| Example 23-2 |  |  |  | 50 |  | Very good | 58 | 5.3 |
| Example 23-3 |  |  |  | 55 |  | Very good | 61 | 5.1 |
| Example 23-4 |  |  |  | 60 |  | Very good | 72 | 4.9 |
| Example 23-5 |  |  |  | 65 |  | Very good | 75 | 4.3 |
| Example 23-6 |  |  |  | 70 |  | Very good | 80 | 4.1 |
| Example 23-7 |  |  |  | 76 |  | Very good | 83 | 3.9 |
| Example 23-8 |  |  |  | 81 |  | Very good | 86 | 3.7 |
| Example 23-9 |  |  |  | 93 |  | Very good | 88 | 3.5 |
| Example 23-10 | 1 | Fe | Electrolytic plating method | 76 | 1/5 | Very good | 78 | 3.9 |
| Example 23-11 |  | Ni |  |  |  | Very good | 81 | 3.8 |
| Example 23-12 |  | Cu |  |  |  | Very good | 80 | 4 |
| Example 23-13 |  | Cr |  |  |  | Very good | 82 | 4 |
| Example 23-14 |  | Ti |  |  |  | Very good | 80 | 4 |
| Comparative example 23 | 1 | — | — | — | — | Very good | 40 | 26.2 |

As shown in Table 23, in Examples 23-1 to 23-14 in which the metal material was formed by electrolytic plating method, the discharge capacity retention ratio was higher and the swollenness ratio was smaller than those of Comparative example 23 in which the metal material was not formed, without depending on the occupancy value of the metal material in the lower region. Accordingly, it was confirmed that in the secondary battery of the invention, the cycle characteristics and the swollenness characteristics were improved if the metal material having a metal element not being alloyed with the electrode reactant was contained together in the case that the anode active material layer 54B contained the plurality of anode active material particles having silicon.

In particular, in Examples 23-1 to 23-9, there was a tendency that as the occupancy of the metal material in the lower region was increased, the discharge capacity retention ratio was increased and the swollenness ratio was lowered. In this case, if the occupancy of the metal material was smaller than 60%, the discharge capacity retention ratio was largely decreased and the swollenness ratio was largely increased. Such a tendency was more significant if the occupancy was 70% or more. In Examples 23-1 to 23-9, a favorable electrode state almost similar to that of Comparative example 23 was obtained without the anode 54 largely hardened. Accordingly, it was confirmed that to further improve the cycle characteristics and the swollenness characteristics, the area ratio occupied by the metal material in the lower region was preferably 60% or more, and more preferably 70% or more.

Further, in Examples 23-10 to 23-14 in which the material for forming the metal material was different, the discharge capacity retention ratio was higher, the swollenness ratio was smaller than those of Comparative example 23, and a favorable electrode state was obtained as in Example 23-7. In this case, in Example 23-7 using cobalt, the discharge capacity retention ratio was higher than that in Example 23-10 using iron and the like. Accordingly, it was confirmed that if the metal material was changed, the cycle characteristics and the swollenness characteristics were improved as well. In addition, it was confirmed that to further improve the cycle characteristics, cobalt was preferably used as a material for forming the metal material.

Examples 24-1 to 24-7

A procedure was performed in the same manner as that of Example 23-7, except that the molar ratio M2/M1 was 1/200 (Example 24-1), 1/100 (Example 24-2), 1/50 (Example 24-3), 1/20 (Example 24-4), 1/2 (Example 24-5), 1/1 (Example 24-6), and 2/1 (Example 24-7) instead of 1/5, and the occupancy of the metal material in the lower region was in the appropriate range (60% or more) so that the molar ratio M2/M1 was each value shown above.

Example 24-8

A procedure was performed in the same manner as that of Example 24-6, except that the occupancy of the metal material in the lower region was 21% that is out of the foregoing appropriate range.

The electrode state, the cycle characteristics, swollenness characteristics and the like of the secondary batteries of Examples 24-1 to 24-8 were examined, and the results shown in Table 24 were obtained. Table 24 also shows the results of Example 23-7 and Comparative example 23.

TABLE 24

Anode active material particle: silicon (electron beam evaporation method)
Ten point height of roughness profile Rz = 3.5 µm
Oxygen content in the anode active material particle 3 = atomic %
Oxygen content in the metal material = 5 atomic %

| | Anode active material particle Number of layers (layer) | Metal material Type | Metal material Forming method | Occupancy of metal material in lower region (atomic %) | Molar ratio M2/M1 | Electrode state | Discharge capacity retention ratio (%) | Swollenness ratio (%) |
|---|---|---|---|---|---|---|---|---|
| Example 24-1 | 1 | Co | Electrolytic plating method | 85 | 1/200 | Very good | 59 | 8.6 |
| Example 24-2 | | | | 85 | 1/100 | Very good | 63 | 4.9 |
| Example 24-3 | | | | 83 | 1/50 | Very good | 69 | 4.5 |
| Example 24-4 | | | | 80 | 1/20 | Very good | 75 | 4.1 |
| Example 23-7 | | | | 76 | 1/5 | Very good | 83 | 3.9 |
| Example 24-5 | | | | 73 | 1/2 | Very good | 86 | 3.8 |
| Example 24-6 | | | | 73 | 1/1 | Good | 81 | 4 |
| Example 24-7 | | | | 72 | 2/1 | Good | 80 | 4 |
| Example 24-8 | 1 | Co | Electrolytic plating method | 21 | 1/1 | Poor | 63 | 3.5 |
| Comparative example 23 | 1 | — | — | — | — | Very good | 40 | 26.2 |

As shown in Table 24, in Examples 23-7 and 24-1 to 24-8, there was a tendency that as the molar ratio M2/M1 was increased, the discharge capacity retention ratio was increased and then decreased, and the swollenness ratio was lowered. In this case, if the molar ratio M2/M1 was from 1/100 to 1/1, a favorable discharge capacity retention ratio and a favorable swollenness ratio were obtained. Such favorable discharge capacity retention ratio and such a favorable swollenness ratio became more favorable if the molar ratio M2/M1 was from 1/50 to 1/2. In Examples 24-1 to 24-7, a favorable electrode state almost similar to that of Comparative example 2-3 was obtained without the anode 54 largely hardened. Accordingly, it was confirmed that to further improve the cycle characteristics and the swollenness characteristics, the molar ratio M2/M1 was preferably in the range from 1/100 to 1/1, and much more preferably from 1/50 to 1/2

Examples 25-3 and 25-4

A procedure was performed in the same manner as that of Example 23-7, except that the anode active material particle was formed by sputtering method (Example 25-3) or CVD method (Example 25-4) instead of electron beam evaporation method so that the anode active material particle had the thickness of 6 μm for one side. The details of sputtering method or CVD method are similar to those of Examples 16-1 and 16-2.

The electrode state, the cycle characteristics, and the swollenness characteristics of the secondary batteries of Examples 25-1 to 25-4 were examined, and the results shown in Table 25 were obtained. Table 25 also shows the results of Example 23-7 and Comparative example 23 together.

TABLE 25

Anode active material particle: silicon
Ten point height of roughness profile Rz = 3.5 μm
Oxygen content in the anode active material particle = 3 atomic %
Oxygen content in the metal material = 5 atomic %

| | Anode active material particle | | Metal material | | Occupancy of metal material in lower region (atomic %) | Molar ratio M2/M1 | Electrode state | Discharge capacity retention ratio (%) | Swollenness ratio (%) |
|---|---|---|---|---|---|---|---|---|---|
| | Number of layers (layer) | Forming method | Type | Forming method | | | | | |
| Example 23-7 | 1 | Electron beam evaporation method | Co | Electrolytic plating method | 76 | 1/5 | Very good | 83 | 3.9 |
| Example 25-1 | | | | Electron beam evaporation method | 71 | | Very good | 43 | 6.2 |
| Example 25-2 | | | | Sputtering method | 72 | | Very good | 41 | 6.5 |
| Example 25-3 | | Sputtering method | | Electrolytic plating method | 76 | | Very good | 77 | 4.3 |
| Example 25-4 | | CVD method | | method | 76 | | Very good | 75 | 4.2 |
| Comparative example 23 | 1 | Electron beam evaporation method | — | — | — | — | Very good | 40 | 26.2 |

In Example 24-8 in which the occupancy of the metal material in the lower region was out of the foregoing appropriate range, the discharge capacity retention ratio was higher and the swollenness characteristic were smaller than those of Comparative example 23, but in that case, the anode 54 was rigid and was hardly bent. Accordingly, it was confirmed that the area ratio occupied by the metal material in the lower region affected the electrode state, and a favorable electrode state was obtained if the area ratio was in the foregoing appropriate range (60% or more).

Examples 25-1 and 25-2

A procedure was performed in the same manner as that of Example 23-7, except that the metal material was formed by electron beam evaporation method (Example 25-1) or sputtering method (Example 25-2) instead of electrolytic plating method. The details of electron beam evaporation method or sputtering method are similar to those of Examples 5-1 to 5-4 or 6-2.

As shown in Table 25, in Examples 25-1 and 25-2 in which the metal material was formed by electron beam evaporation method or sputtering method, the discharge capacity retention ratio was higher and the swollenness ratio was smaller than those of Comparative example 23 as in Examples 23-7 in which the metal material was formed by electrolytic plating method. In particular, in Examples 23-7, 25-1, and 25-2, there was a tendency that in the case of using liquid-phase deposition method (electrolytic plating method) as a method of forming the metal material, the discharge capacity retention ratio was higher and the swollenness ratio was smaller than those in the case of using vapor-phase deposition method (electron beam vapor evaporation method or sputtering method) as a method of forming the metal material. In Examples 25-1 and 25-2, a favorable electrode state almost similar to that of Comparative example 23 was obtained without the anode 54 largely hardened. Accordingly, it was confirmed that if electron beam evaporation method or sputtering method were used as a method of forming the metal material, the cycle characteristics and the swollenness characteristics were improved as well. In addition, it was also confirmed that to further improve the cycle characteristics and the swollenness characteristics, liquid-phase deposition method was preferably used as a method of forming the metal material.

Further, in Examples 25-3 and 25-4 in which the anode active material particle was formed by sputtering method or CVD method, the discharge capacity retention ratio was higher and the swollenness ratio was smaller than those of Comparative example 23 as in Example 23-7 in which the metal material was formed by electron beam evaporation method. In particular, in Examples 23-7, 25-3, and 25-4, there was a tendency that in the case of using electron beam evaporation method as a method of forming the anode active material particle, the discharge capacity retention ratio was higher than that in the case of using sputtering method or CVD method as a method of forming the anode active material particle. In Examples 25-3 and 25-4, a favorable electrode state almost similar to that of Comparative example 23 was obtained without the anode 54 largely hardened. Accordingly, it was confirmed that if the method of forming the anode active material particle was changed, the cycle characteristics and the swollenness characteristics were improved as well. In addition, it was also confirmed that to further improve the cycle characteristics, evaporation method was preferably used as a method of forming the anode active material particle.

Examples 26-1 26-5

A procedure was performed in the same manner as that of Example 23-7, except that the oxygen content in the anode active material particle was 1 atomic % (Example 26-1), 10 atomic % (Example 26-2), 35 atomic % (Example 26-3), 40 atomic % (Example 26-4), and 50 atomic % (Example 26-5) instead of 3 atomic %.

The electrode state, the cycle characteristics, the swollenness characteristics and the like of the secondary batteries of Examples 26-1 to 26-5 were examined, and the results shown in Table 26 were obtained. Table 26 also shows the results of Example 23-7 and Comparative example 23.

As shown in Table 26, in Examples 26-1 to 26-5 in which the oxygen content in the anode active particle was different, the discharge capacity retention ratio was higher and the swollenness ratio was smaller than those of Comparative example 23 as in Example 23-7. In particular, in Examples 23-7 and 26-1 to 26-5, there was a tendency that as the oxygen content was increased, the discharge capacity retention ratio was increased and then decreased. In this case, if the oxygen content was smaller than 3 atomic % or larger than 40 atomic %, the discharge capacity retention ratio was largely decreased. In Examples 26-1 to 26-5, a favorable electrode state almost similar to that of Comparative example 23 was obtained without the anode 54 largely hardened. Accordingly, it was confirmed that if the oxygen content in the anode active material particle was changed, the cycle characteristics and the swollenness characteristics were improved as well. In addition, it was also confirmed that to further improve the cycle characteristics, the oxygen content in the anode active material particle was preferably in the range from 3 atomic % to 40 atomic %.

Examples 27-1 to 27-5

A procedure was performed in the same manner as that of Example 23-7, except that an anode active material particle having iron (Example 27-1), cobalt (Example 27-2), nickel (Example 27-3), titanium (Example 27-4), and chromium (Example 27-5) together with silicon was formed so that the anode active material had the thickness of 6.5 μm for one side. The details of method in which iron is contained in the anode active material particle are similar to those of Examples 11-1 to 11-7.

The electrode state, the cycle characteristics, and the swollenness characteristics of the secondary batteries of Examples 27-1 to 27-5 were examined, and the results shown in Table 27 were obtained. Table 27 also shows the results of Example 23-7 and Comparative example 23.

TABLE 26

Anode active material particle: silicon (electron beam evaporation method)
Ten point height of roughness profile Rz = 3.5 μm
Oxygen content in the metal material = 5 atomic %

| | Anode active material particle | | Metal material | | Occupancy of metal material in lower region (atomic %) | Molar ratio M2/M1 | Electrode state | Discharge capacity retention ratio (%) | Swollenness ratio (%) |
|---|---|---|---|---|---|---|---|---|---|
| | Number of layers (layer) | Oxygen content (atomic %) | Type | Forming method | | | | | |
| Example 26-1 | 1 | 1 | Co | Electrolytic plating method | 76 | 1/5 | Very good | 72 | 4 |
| Example 23-7 | | 3 | | | | | Very good | 83 | 3.9 |
| Example 26-2 | | 10 | | | | | Very good | 85 | 3.8 |
| Example 26-3 | | 35 | | | | | Very good | 86 | 3.7 |
| Example 26-4 | | 40 | | | | | Very good | 80 | 4 |
| Example 26-5 | | 50 | | | | | Very good | 70 | 4 |
| Comparative example 23 | 1 | 3 | — | — | — | — | Very good | 40 | 26.2 |

TABLE 27

Anode active material particle: silicon (electron beam evaporation method)
Ten point height of roughness profile Rz = 3.5 μm
Oxygen content in the anode active material particle = 3 atomic %
Oxygen content in the metal material = 5 atomic %

| | Anode active material particle | | Metal material | | Occupancy of metal material in lower region (atomic %) | Molar ratio M2/M1 | Discharge capacity | | Swollenness ratio (%) |
|---|---|---|---|---|---|---|---|---|---|
| | Number of layers (layer) | Metal element | Type | Forming method | | | Electrode state | retention ratio (%) | |
| Example 23-7 | 1 | — | Co | Electrolytic plating method | 76 | 1/5 | Very good | 83 | 3.9 |
| Example 27-1 | | Fe | | | | | Very good | 85 | 3.5 |
| Example 27-2 | | Co | | | | | Very good | 85 | 3.4 |
| Example 27-3 | | Ni | | | | | Very good | 84 | 3.4 |
| Example 27-4 | | Ti | | | | | Very good | 84 | 3.4 |
| Example 27-5 | | Cr | | | | | Very good | 84 | 3.5 |
| Comparative example 23 | 1 | — | — | — | — | — | Very good | 40 | 26.2 |

As shown in Table 27, in Examples 27-1 to 27-5 in which the anode active material particle had a metal element together with silicon, the discharge capacity retention ratio was higher and the swollenness ratio was smaller than those of Comparative example 23 as in Example 23-7. In particular, in Examples 27-1 to 27-5, the discharge capacity retention ratio was higher and the swollenness ratio was smaller than those of Example 23-7. In Examples 27-1 to 27-5, a favorable electrode state almost similar to that of Comparative example 23 was obtained without the anode 54 largely hardened. Accordingly, it was confirmed that when the anode active material particle contained a metal element, the cycle characteristics and the swollenness characteristics were improved as well.

Example 28-1

A procedure was performed in the same manner as that of Example 23-7, except that FEC was used instead of EC as a solvent.

Example 28-2

A procedure was performed in the same manner as that of Example 23-7, except that DFEC was added as a solvent, and the composition of the mixed solvent (EC:DFEC:DEC) was 25:5:70 at a weight ratio.

Examples 28-3 to 28-6

A procedure was performed in the same manner as that of Example 28-1, except that VC (Example 28-3), VEC (Example 28-4), PRS (Example 28-5), or $LiBF_4$ (Example 28-6) was added as a solvent to the electrolytic solution. The addition amount of VC and the like was similar to that of Examples 18-3 to 18-6.

The electrode state, the cycle characteristics, the swollenness characteristics and the like of the secondary batteries of Examples 28-1 to 28-6 were examined, and the results shown in Table 28 were obtained. Table 28 also shows the results of Example 23-7 and Comparative example 23.

TABLE 28

Anode active material particle: silicon (electron beam evaporation method)
Ten point height of roughness profile Rz = 3.5 μm
Oxygen content in the anode active material particle = 3 atomic %
Oxygen content in the metal material = 5 atomic %

| | Anode | | | | | | | | | | | | |
|---|---|---|---|---|---|---|---|---|---|---|---|---|---|
| | Anode active material particle | Metal material | | Occupancy of metal material in lower region (%) | Molar ratio M2/M1 | Electrolytic solution | | | | | Electrode state | Discharge capacity retention ratio (%) | Swollenness ratio (%) |
| | | | | | | Solvent (wt %) | | | | | | | |
| | Number of layers (layer) | Type | Forming method | | | EC | FEC | DFEC | DEC | Others | | | |
| Example 23-7 | 1 | Co | Electrolytic plating method | 76 | 1/5 | 50 | — | — | 50 | — | Very good | 83 | 3.9 |
| Example 28-1 | | | | | | — | 50 | — | 50 | — | Very good | 90 | 3.8 |

TABLE 28-continued

Anode active material particle: silicon (electron beam evaporation method)
Ten point height of roughness profile Rz = 3.5 μm
Oxygen content in the anode active material particle = 3 atomic %
Oxygen content in the metal material = 5 atomic %

| | Anode | | | | | | | | | | | | |
|---|---|---|---|---|---|---|---|---|---|---|---|---|---|
| | Anod active material particle | Metal material | | Occupancy of metal material in lower region | Molar ratio | Electrolytic solution Solvent (wt %) | | | | | | Discharge capacity retention | Swollenness ratio |
| | Number of layers (layer) | Type | Forming method | (%) | M2/M1 | EC | FEC | DFEC | DEC | Others | Electrode state | ratio (%) | (%) |
| Example 28-2 | | | | | | 25 | — | 5 | 70 | | Very good | 91 | 3.8 |
| Example 28-3 | | | | | | — | 50 | — | 50 | VC | Very good | 90 | 3.8 |
| Example 28-4 | | | | | | | | | | VEC | Very good | 90 | 3.8 |
| Example 28-5 | | | | | | | | | | PRS | Very good | 91 | 3.7 |
| Example 28-6 | | | | | | | | | | LiBF$_4$ | Very good | 90 | 3.8 |
| Comparative example 23 | 1 | — | — | — | — | 50 | — | 50 | — | — | Very good | 40 | 26.2 |

As shown in Table 28, in Examples 28-1 to 28-6 in which the composition of solvent and the type of electrolyte salt were different, the discharge capacity retention ratio was higher and the swollenness ratio was smaller than those of Comparative example 23 as in Example 23-7. In particular, there was a tendency that in Examples 28-1 and 28-2 in which the solvent contained FEC or DFEC, the discharge capacity retention ratio was higher than that of Example 23-7. Specially, in the case that the solvent contained DFEC, there was a tendency that the discharge capacity retention ratio was still higher. There was a tendency that in Examples 28-3 to 28-6 in which the electrolytic solution contained VC or the like, the discharge capacity retention ratio was higher than that of Example 23-7. There was a tendency that in Examples 28-5 and 28-6 in which the electrolytic solution contained PRS or LiBF$_4$, the swollenness ratio was smaller than that of Example 23-7 in which the electrolytic solution did not contain PRS or LiBF$_4$. In Examples 28-1 to 28-6, a favorable electrode state almost similar to that of Comparative example 23 was obtained without the anode 54 largely hardened. Accordingly, it was confirmed that if the composition of solvent and the type of electrolyte salt were changed, the cycle characteristics and the swollenness characteristics were improved as well. In particular, it was confirmed that to further improve the cycle characteristics, it was preferable that the solvent contained the fluorinated ester carbonate or the cyclic ester carbonate having an unsaturated bond, or the electrolytic solution contained sultone or an electrolyte salt having boron and fluorine. In addition, it was confirmed that to further improve the swollenness characteristics, it was preferable that the electrolytic solution contained sultone or an electrolyte salt having boron and fluorine.

The invention has been described with reference to the embodiment and the examples. However, the invention is not limited to the aspects described in the foregoing embodiment and the foregoing examples, and various modifications may be made. For example, in the foregoing embodiment and the foregoing examples, the descriptions have been given of the lithium ion secondary battery in which the anode capacity is expressed as the capacity component based on insertion and extraction of lithium as a battery type. However, the battery of the invention is not limited thereto. The invention can be similarly applied to a secondary battery in which the anode capacity includes the capacity component based on insertion and extraction of lithium and the capacity component based on precipitation and dissolution of lithium, and the anode capacity is expressed as the sum of these capacity components, by setting the charge capacity of the anode material capable of inserting and extracting lithium to a smaller value than that of the charge capacity of the cathode.

Further, in the foregoing embodiment or the foregoing examples, the description has been given with the specific examples of the square, cylindrical, or laminated film secondary battery as a battery structure, and with the specific example of the battery in which the battery element has the spirally wound structure. However, the invention can be similarly applied to a battery having other structure such as a coin type battery and a button type battery, or a battery in which the battery element has other structure such as a lamination structure.

Further, in the foregoing embodiment and the foregoing examples, the description has been given of the case using lithium as an electrode reactant. However, as an electrode reactant, other Group 1A element such as sodium (Na) and potassium (K), a Group 2A element such as magnesium (Mg) and calcium (Ca), or other light metal such as aluminum may be used. In this case, the anode material described in the foregoing embodiment can be used as an anode active material as well.

Further, in the foregoing embodiment and the foregoing examples, regarding the ratio (molar ratio) between the number of moles per unit area of the anode active material particle and the number of moles per unit area of the metal material in the anode and the battery of the invention, the appropriate numerical value range thereof derived from the results of the examples has been described. However, such a description does not totally eliminate the possibility that the molar ratio may be out of the foregoing range. That is, the foregoing appropriate range is the range particularly preferable for obtaining the effects of the invention. Therefore, as long as effects of the invention can be obtained, the molar ratio may be out of the foregoing range in some degrees. The same is applied to the atomicity ratio occupied by the metal material on the surface of the anode active material layer, the average number of split particles, the oxygen content in the anode active material particle, the oxygen content in the metal material, ten point height of roughness profile Rz of the surface of the anode current collector, the half bandwidth 2θ of the peak originated in (111) crystal plane of the metal material obtained by X-ray diffraction, the area ratio occupied by the metal material in the lower region and the like, in addition to the foregoing molar ratio.

It should be understood by those skilled in the art that various modifications, combinations, sub-combinations and alternations may occur depending on design requirements and other factors insofar as they are within the scope of the appended claims or the equivalents thereof.

What is claimed is:

1. An anode comprising:
    an anode current collector;
    an anode active material layer provided on the anode current collector, and
    a plurality of anode active material particles comprising the anode active material layer, the anode active material particles having a gap in-between adjacent anode active material particles,
    wherein,
        the anode active material particles comprise silicon (Si), and
        a metal material fills at least a portion of the gap in-between adjacent anode active material particles, the metal element not being alloyed with an electrode reactant in the gap between the anode active material particles, and
        in a cross section of the anode active material layer along an arrangement direction of the plurality of anode active material particles, where (1) a region surrounded by two straight lines that extend in a direction crossing the surface of the anode current collector and pass through apexes of two adjacent anode active material particles, and (2) two straight lines that extend in a direction along the surface of the anode current collector and pass through an upper end point and a lower end point of the metal material is divided in half vertically into an upper region and a lower region, a ratio of an area occupied by the metal material in the lower region is 60% or more.

2. The anode according to claim 1, wherein the gap between the anode active material particles is filled with the metal material.

3. The anode according to claim 1, wherein the anode active material particle is linked to the anode current collector.

4. The anode according to claim 1, wherein the anode active material particle is alloyed with the anode current collector.

5. The anode according to claim 1, wherein the metal material covers at least part of a face of the anode active material particle.

6. The anode according to claim 1, wherein the anode active material particle has a multilayer structure in the particle, and the anode active material layer contains the metal material in a gap in the anode active material particle.

7. The anode according to claim 6, wherein the gap in the anode active material particle is filled with the metal material.

8. The anode according to claim 1, wherein the metal material is at least one selected from the group consisting of iron (Fe), cobalt (Co), nickel (Ni), zinc (Zn), copper (Cu), chromium (Cr), and titanium (Ti).

9. The anode according to claim 1, wherein a molar ratio M2/M1 between the number of moles M1 per unit area of the anode active material particles and the number of moles M2 per unit area of the metal material is in a range from 1/15 to 7/1.

10. The anode according to claim 1, wherein a ratio of atomicity occupied by the metal material on the surface of the anode active material layer is in a range from 2 atomic % to 82 atomic %.

11. The anode according to claim 1, wherein the anode active material particle further has oxygen (O), and an oxygen content in the anode active material particle is in a range from 3 atomic % to 40 atomic %.

12. The anode according to claim 1, wherein the anode active material particle further has at least one metal element selected from the group consisting of iron, cobalt, nickel, chromium, titanium, and molybdenum (Mo).

13. The anode according to claim 1, wherein the metal material further has oxygen, and an oxygen content in the metal material is in a range from 1.5 atomic % to 30 atomic %.

14. The anode according to claim 1, wherein
    the anode active material particle has an oxygen-containing region in which the anode active material particle further has oxygen in a thickness direction, and
    an oxygen content in the oxygen-containing region is higher than an oxygen content in other regions.

15. The anode according to claim 1, wherein
    the anode active material layer has a secondary particle formed by an aggregate including the anode active material particle as primary particles,
    each of the secondary particles is separated in the in-plane direction of the anode active material layer by a groove having a depth in the thickness direction of the anode active material layer,
    part of the primary particles is a split particle that is split by the groove, and
    ten or more pieces of the split particle exist on the average per each of the secondary particles out of adjacent five or more pieces of the secondary particle at least in part of the anode active material layer.

16. The anode according to claim 15, wherein as the secondary particle, a number ratio of secondary particles in which a length in the direction perpendicular to a length in the thickness direction is longer than the length in the thickness direction is 50% or more out of continuous 10 pieces of the secondary particles in at least part of the thickness direction of the anode active material layer.

17. The anode according to claim 1, wherein ten point height of roughness profile Rz of the surface of the anode current collector is in the range from 1.5 μm to 6.5 μm.

18. The anode according to claim 1, wherein the anode active material particle is formed by vapor-phase deposition method.

19. The anode according to claim 1, wherein the metal material is formed by vapor-phase deposition method or liquid-phase deposition method.

20. The anode according to claim 1, wherein the metal material is formed by electrolytic plating method.

21. The anode according to claim 1, wherein the metal material has crystallinity.

22. The anode according to claim 21, wherein a half bandwidth 2θ of a peak originated in (111) crystal plane of the metal material obtained by X-ray diffraction is 20 degrees or less.

23. The anode according to claim 1, wherein the ratio of the area occupied by the metal material in the lower region is 70% or more.

24. The anode according to claim 1, wherein a molar ratio M2/M1 between the number of moles M1 per unit area of the anode active material particles and the number of moles M2 per unit area of the metal material is in a range from 1/100 to 1/1.

25. The anode according to claim 24, wherein the molar ratio M2/M1 is in a range from 1/50 to 1/2.

26. A method of forming an anode having an anode current collector and an anode active material layer provided thereon, comprising steps of:
forming a plurality of anode active material particles on the anode current collector, the anode active material particles having a gap in-between adjacent anode active material particles; and
filling at least a portion of the gap in-between adjacent anode active material particles, with a metal material, wherein,
the anode active materials particles comprise silicon,
the metal material not being alloyed with an electrode reactant in the gap between the anode active material particles, and
in a cross section of the anode active material layer along an arrangement direction of the plurality of anode active material particles, where (1) a region surrounded by two straight lines that extend in a direction crossing the surface of the anode current collector and pass through apexes of two adjacent anode active material particles, and (2) two straight lines that extend in a direction along the surface of the anode current collector and pass through an upper end point and a lower end point of the metal material is divided in half vertically into an upper region and a lower region, a ratio of an area occupied by the metal material in the lower region is 60% or more.

27. The method of forming an anode according to claim 26, wherein the anode active material particle is formed by using vapor-phase deposition method.

28. The method of forming an anode according to claim 26, wherein the gap is filled with the metal material by using vapor-phase deposition method or liquid-phase deposition method.

29. The method of forming an anode according to claim 26, wherein the gap is filled with the metal material by using electrolytic plating method.

30. A battery comprising:
a cathode;
an anode; and
an electrolytic solution,
wherein,
the anode has an anode current collector and an anode active material layer thereon,
the anode active material layer contains a plurality of anode active material particles, the anode active material particles having a gap in-between adjacent anode active material particles,
the anode active particle materials comprise silicon,
a metal material fills at least a portion of the gap in-between adjacent anode active material particles, the metal material not being alloyed with an electrode reactant in the gap between the anode active material particles, and
in a cross section of the anode active material layer along an arrangement direction of the plurality of anode active material particles, where (1) a region surrounded by two straight lines that extend in a direction crossing the surface of the anode current collector and pass through apexes of two adjacent anode active material particles, and (2) two straight lines that extend in a direction along the surface of the anode current collector and pass through an upper end point and a lower end point of the metal material is divided in half vertically into an upper region and a lower region, a ratio of an area occupied by the metal material in the lower region is 60% or more.

31. The battery according to claim 30, wherein the gap between the anode active material particles is filled with the metal material.

32. The battery according to claim 30, wherein the anode active material particle is linked to the anode current collector.

33. The battery according to claim 30, wherein the anode active material particle is alloyed with the anode current collector.

34. The battery according to claim 30, wherein the metal material covers at least part of a face of the anode active material particle.

35. The battery according to claim 30, wherein the anode active material particle has a multilayer structure in the particle, and the anode active material layer contains the metal material in a gap in the anode active material particle.

36. The battery according to claim 35, wherein the gap in the anode active material particle is filled with the metal material.

37. The battery according to claim 30, wherein the metal material is at least one selected from the group consisting of iron, cobalt, nickel, zinc, copper, chromium, and titanium.

38. The battery according to claim 30, wherein a molar ratio M2/M1 between the number of moles M1 per unit area of the anode active material particles and the number of moles M2 per unit area of the metal material is in a range from 1/15 to 7/1.

39. The battery according to claim 30, wherein a ratio of atomicity occupied by the metal material on the surface of the anode active material layer is in a range from 2 atomic % to 82 atomic %.

40. The battery according to claim 30, wherein the anode active material particle further has oxygen, and an oxygen content in the anode active material particle is in a range from 3 atomic % to 40 atomic %.

41. The battery according to claim 30, wherein the anode active material particle further has at least one metal element selected from the group consisting of iron, cobalt, nickel, chromium, titanium, and molybdenum.

42. The battery according to claim 30, wherein the metal material further has oxygen, and an oxygen content in the metal material is in a range from 1.5 atomic % to 30 atomic %.

43. The battery according to claim 30, wherein
the anode active material particle has an oxygen-containing region in which the anode active material particle further has oxygen in a thickness direction, and
an oxygen content in the oxygen-containing region is higher than an oxygen content in other regions.

44. The battery according to claim 30, wherein
the anode active material layer has a secondary particle formed by an aggregate including the anode active material particle as primary particles,
each of the secondary particles is separated in the in-plane direction of the anode active material layer by a groove having a depth in the thickness direction of the anode active material layer,
part of the primary particles is a split particle that is split by the groove, and
ten or more pieces of the split particle exist on the average per each of the secondary particles out of adjacent five or more pieces of the secondary particle at least in part of the anode active material layer.

45. The battery according to claim 44, wherein a r ratio of secondary particles in which a length in the direction perpendicular to a length in the thickness direction is longer than the length in the thickness direction is 50% or more out of continuous 10 pieces of the secondary particles in at least part of the thickness direction of the anode active material layer.

46. The battery according to claim 30, wherein ten point height of roughness profile Rz of the surface of the anode current collector is in the range from 1.5 μm to 6.5 μm.

47. The battery according to claim 30, wherein the anode active material particle is formed by vapor-phase deposition method.

48. The battery according to claim 30, wherein the metal material is formed by vapor-phase deposition method or liquid-phase deposition method.

49. The battery according to claim 30, wherein the metal material is formed by electrolytic plating method.

50. The battery according to claim 30, wherein the metal material has crystallinity.

51. The battery according to claim 50, wherein a half bandwidth 2θ of a peak originated in (111) crystal plane of the metal material obtained by X-ray diffraction is 20 degrees or less.

52. The battery according to claim 30, wherein the ratio of the area occupied by the metal material in the lower region is 70% or more.

53. The battery according to claim 30, wherein a molar ratio M2/M1 between the number of moles M1 per unit area of the anode active material particles and the number of moles M2 per unit area of the metal material is in a range from 1/100 to 1/1.

54. The battery according to claim 53, wherein the molar ratio M2/M1 is in a range from 1/50 to 1/2.

55. The battery according to claim 30, wherein the electrolytic solution contains a solvent containing sultone.

56. The battery according to claim 55, wherein the sultone is 1,3-propanesultone.

57. The battery according to claim 30, wherein the electrolytic solution contains a solvent containing a cyclic ester carbonate having an unsaturated bond.

58. The battery according to claim 57, wherein the cyclic ester carbonate having an unsaturated bond is vinylene carbonate or vinyl ethylene carbonate.

59. The battery according to claim 30, wherein the electrolytic solution contains a solvent containing fluorinated ester carbonate.

60. The battery according to claim 59, wherein the fluorinated ester carbonate is difluoroethylene carbonate.

61. The battery according to claim 30, wherein the electrolytic solution contains an electrolyte salt having boron (B) and fluorine (F).

62. The battery according to claim 61, wherein the electrolyte salt is lithium borate tetrafluoride ($LiBF_4$).

63. The battery according to claim 30, wherein the cathode, the anode, and the electrolytic solution are contained in a cylindrical or square package member.

64. The battery according to claim 63, wherein the package member contains iron or an iron alloy.

65. A method of manufacturing a battery comprising a cathode, an anode, and an electrolytic solution, the anode comprising an anode current collector and an anode active material layer thereon, the method of manufacturing the anode comprising the steps of:
forming a plurality of anode active material particles comprising silicon on the anode current collector, the anode active material particles having a gap in-between adjacent anode active material particles; and
filling at least a portion of the gap in-between adjacent anode active material particles, with a metal material, the metal material not being alloyed with an electrode reactant in a gap between the anode active material particles,
wherein,
the plurality of anode active material particles are arranged on the anode current collector; and
in a cross section of the anode active material layer along an arrangement direction of the plurality of anode active material particles, where (1) a region surrounded by two straight lines that extend in a direction crossing the surface of the anode current collector and pass through apexes of two adjacent anode active material particles, and (2) two straight lines that extend in a direction along the surface of the anode current collector and pass through an upper end point and a lower end point of the metal material is divided in half vertically into an upper region and a lower region, a ratio of an area occupied by the metal material in the lower region is 60% or more.

66. The method of manufacturing a battery according to claim 65, wherein the anode active material particle is formed by vapor-phase deposition method.

67. The method of manufacturing a battery according to claim 65, wherein the gap is filled with the metal material by vapor-phase deposition method or liquid-phase deposition method.

68. The method of manufacturing a battery according to claim 65, wherein the gap is filled with the metal material by electrolytic plating method.

* * * * *